US012475697B2

(12) United States Patent
Lim et al.

(10) Patent No.: US 12,475,697 B2
(45) Date of Patent: Nov. 18, 2025

(54) METHOD AND SYSTEM FOR TRAINING A NEURAL NETWORK

(71) Applicant: NATIONAL UNIVERSITY OF SINGAPORE, Singapore (SG)

(72) Inventors: Brian Youliang Lim, Singapore (SG); Wencan Zhang, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 309 days.

(21) Appl. No.: 18/253,082

(22) PCT Filed: Dec. 3, 2021

(86) PCT No.: PCT/SG2021/050748
§ 371 (c)(1),
(2) Date: May 16, 2023

(87) PCT Pub. No.: WO2022/119506
PCT Pub. Date: Jun. 9, 2022

(65) Prior Publication Data
US 2024/0013525 A1 Jan. 11, 2024

(30) Foreign Application Priority Data
Dec. 3, 2020 (SG) .............................. 10202012093P

(51) Int. Cl.
G06V 10/82 (2022.01)
G06V 10/774 (2022.01)

(52) U.S. Cl.
CPC ............ G06V 10/82 (2022.01); G06V 10/774 (2022.01)

(58) Field of Classification Search
None
See application file for complete search history.

(56) References Cited

U.S. PATENT DOCUMENTS

2020/0327407 A1* 10/2020 Poon ...................... G06N 3/084
2020/0327409 A1* 10/2020 Kim ......................... G06N 3/08
2021/0142106 A1* 5/2021 Quader .................. G06N 3/045

OTHER PUBLICATIONS

European Patent Application No. 21901153.3, Search Report dated Sep. 5, 2024, 5 pages.

(Continued)

Primary Examiner — Leon Flores
(74) Attorney, Agent, or Firm — Kilpatrick Townsend & Stockton LLP

(57) ABSTRACT

A method and a system for training a neural network. The method includes receiving, by a processing device, a training image, a reference label and a reference class activation map, the reference label and the reference class activation map associated with a corresponding unbiased image of the training image and generating, using the processing device, a class label and a class activation map based on the training image using the neural network. The method also includes calculating, using the processing device, a classification loss value based on differences between the reference label and the class label, and a class activation map loss value based on differences between the reference class activation map and the class activation map and updating, using the processing device, the neural network to minimise the classification loss value and the class activation map loss value to improve accuracy of the neural network in generation of the class label and the class activation map.

12 Claims, 51 Drawing Sheets

(56) References Cited

OTHER PUBLICATIONS

Yang, et al., "SGDNet an End-to-End Saliency-Guided Deep Neural Network for No-Reference Image Quality Assessment", Proceedings of the 28th ACM Joint Meeting on European Software Engineering Conference and Symposium on the Foundations of Software Engineering, ACM, New York, NY, USA, Oct. 15, 2019 (Oct. 15, 2019), pp. 1383-1391.
Selvaraju, et al., "Grad-CAM: 1-12 Visual Explanations from Deep Networks via Gradient-Based Localization", arxiv.org, Cornell University Library, 201 Olin Library Cornell University Ithaca, NY 14853, vol. 128, No. 2, Oct. 11, 2019 (Oct. 11, 2019), pp. 336-359.
International Search Report for PCT/SG2021/050748, dated Mar. 2, 2023, 4 pages.

\* cited by examiner

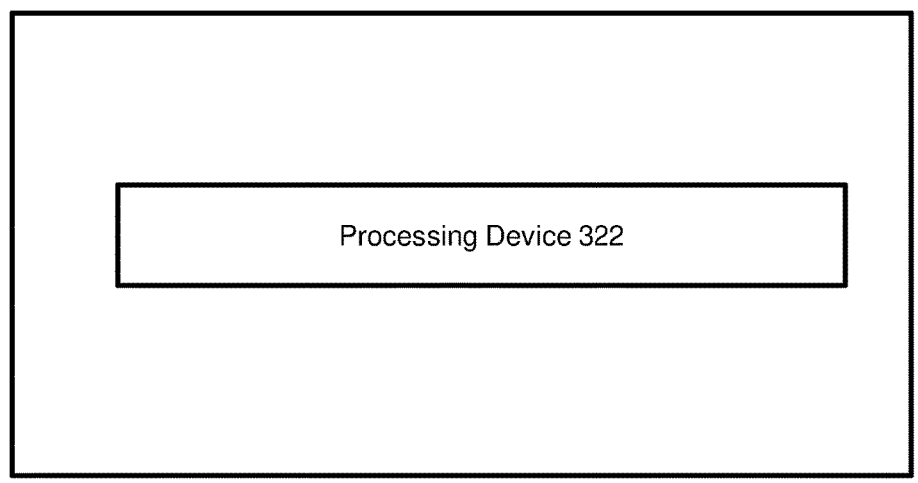
FIG. 3d

| Model Variant | Training Loss Function | Training Set Bias Levels |
|---|---|---|
| ······ RegularCNN | $L(w) = L_y(y, \hat{y}(w))$ | $b = 0$ |
| - - - FineTunedCNN (sb, st) | $L(w) = L_y(y, \hat{y}(w))$ | $b \in (0, b_{max}]$ |
| ——— FineTunedCNN (mb, st) | $L(w) = L_y(y, \hat{y}(w))$ | $b \in B_{rand} \sim U([0, b_{max}])$ |
| − − DebiasedCNN (sb, st) | $L(w) = L_y(y, \hat{y}(w)) + \omega_M L_M(\widetilde{M}, \widehat{M}(w))$ | $b \in (0, b_{max}]$ |
| ▬▬▬ DebiasedCNN (mb, st) | $L(w) = \begin{pmatrix} L_y(y, \hat{y}(w)) + \omega_M L_M(\widetilde{M}, \widehat{M}(w)) \\ \omega_b L_b(b, \hat{b}(w)) \end{pmatrix}$ | $b \in B_{rand}$ |
| − ▬ DebiasedCNN (sb, mt) | $\boldsymbol{L(w)} = \begin{pmatrix} L_y(y, \hat{y}(w)) \\ \omega_M L_M(\widetilde{M}, \widehat{M}(w)) \end{pmatrix}$ | $b \in (0, b_{max}]$ |
| ▬▬▬ DebiasedCNN (mb, mt) | $\boldsymbol{L(w)} = \begin{pmatrix} L_y(y, \hat{y}(w)) \\ \omega_M L_M(\widetilde{M}, \widehat{M}(w)) \\ \omega_b L_b(b, \hat{b}(w)) \end{pmatrix}$ | $b \in B_{rand}$ |

FIG. 5

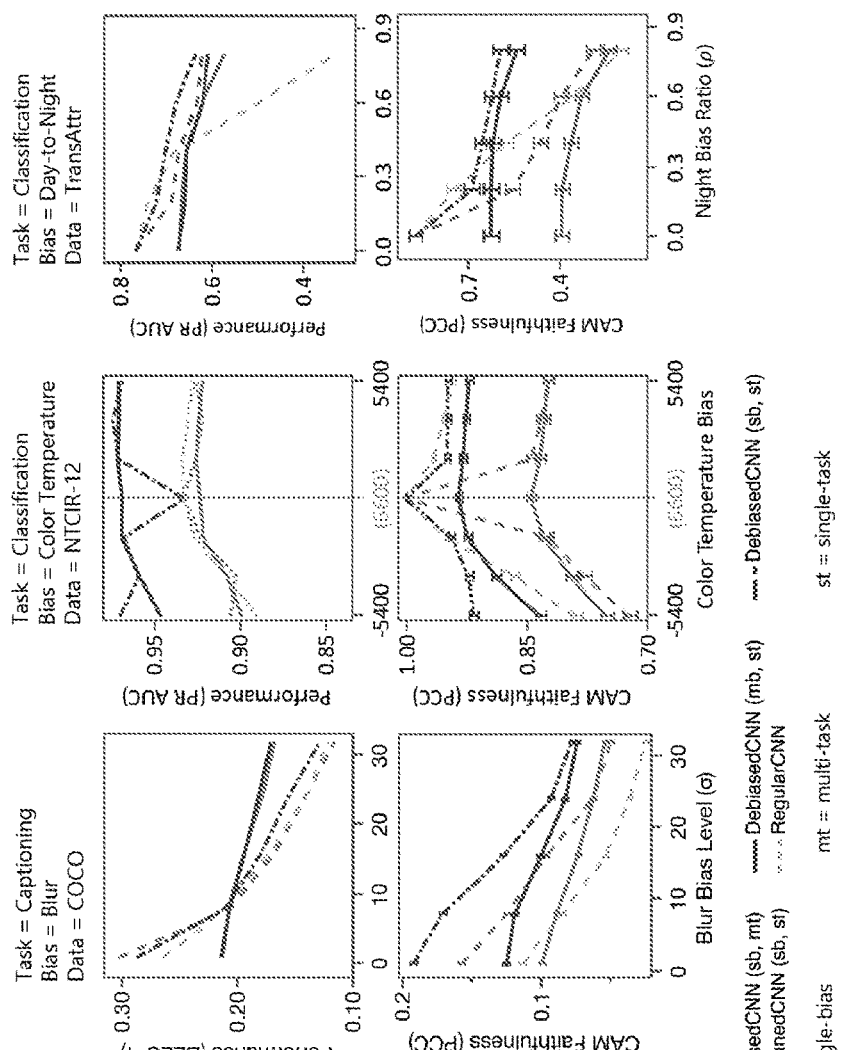

| Exp | Task | Model | Re-trained Dataset | Dataset Size | Train-Test Ratio |
|---|---|---|---|---|---|
| 1 | Classify | Inception v3 CNN | ImageNette | 13,395 images | 70.0% / 30.0% |
| 2 | Classify | Inception v3 CNN | NTCIR-12 | 44,902 images | 80.0% / 20.0% |
| 3 | Caption | Neural Image Captioner (Inception v3 + LSTM) | COCO | 123,287 images, 616,435 captions | 66.7% / 33.3% |
| 4 | Classify | Inception v3 CNN | NTCIR-12 | 44,902 images | 80.0% / 20.0% |
| 5 | Classify | Inception v3 CNN | TransAttr | 4,584 images | 80.0% / 20.0% | a Simulation Study 1: Task = Classification, Bias = Blur, Data = ImageNette

| Performance (PR AUC) | Blur Bias Level (σ) | | | | | CAM Faithfulness (PCC) | Blur Bias Level (σ) | | | | |
|---|---|---|---|---|---|---|---|---|---|---|---|
| | 0 | 8 | 16 | 24 | 32 | | 0 | 8 | 16 | 24 | 32 |
| DebiasedCNN (nb, nt) | 0% | 1% | 9% | 26% | 45% | DebiasedCNN (nb, nt) | -3% | 5% | 19% | 39% | 63% |
| DebiasedCNN (sb, nt) | 0% | 1% | 9% | 27% | 49% | DebiasedCNN (sb, nt) | 0% | 0% | 21% | 42% | 71% |
| DebiasedCNN (nb, st) | 0% | 1% | 8% | 18% | 33% | DebiasedCNN (nb, st) | -3% | 4% | 14% | 26% | 42% |
| DebiasedCNN (sb, st) | 0% | 1% | 5% | 14% | 19% | DebiasedCNN (sb, st) | 0% | 10% | 15% | 27% | 42% |
| FineTunedCNN (nb, st) | 0% | 0% | 0% | 18% | 29% | FineTunedCNN (nb, st) | -3% | 0% | 0% | 11% | 20% |
| FineTunedCNN (sb, st) | 0% | 0% | 4% | 12% | 21% | FineTunedCNN (sb, st) | 0% | 1% | 6% | 7% | 21% | b Simulation Study 2: Task = Classification, Bias = Blur, Data = NTCIR-12

| Performance (PR AUC) | Blur Bias Level (σ) | | | | | CAM Faithfulness (PCC) | Blur Bias Level (σ) | | | | |
|---|---|---|---|---|---|---|---|---|---|---|---|
| | 0 | 8 | 16 | 24 | 32 | | 0 | 8 | 16 | 24 | 32 |
| DebiasedCNN (nb, nt) | -4% | 8% | 42% | 118% | 180% | DebiasedCNN (nb, nt) | -14% | 10% | 50% | 127% | 181% |
| DebiasedCNN (sb, nt) | 0% | 5% | 36% | 109% | 183% | DebiasedCNN (sb, nt) | 0% | 20% | 73% | 148% | 198% |
| DebiasedCNN (nb, st) | -8% | 3% | 27% | 119% | 175% | DebiasedCNN (nb, st) | -19% | 5% | 31% | 72% | 101% |
| DebiasedCNN (sb, st) | 0% | 6% | 13% | 62% | 41% | DebiasedCNN (sb, st) | 0% | 9% | 16% | 40% | 60% |
| FineTunedCNN (nb, st) | -10% | 1% | 22% | 107% | 160% | FineTunedCNN (nb, st) | -23% | -7% | 0% | 30% | 44% |
| FineTunedCNN (sb, st) | 0% | 2% | 6% | 45% | 22% | FineTunedCNN (sb, st) | 0% | -6% | 1% | 19% | 15% | c Simulation Study 3: Task = Captioning, Bias = Blur, Data = COCO

| Performance (BLEU-4) | Blur Bias Level (σ) | | | | | CAM Faithfulness (PCC) | Blur Bias Level (σ) | | | | |
|---|---|---|---|---|---|---|---|---|---|---|---|
| | 1 | 8 | 16 | 24 | 32 | | 1 | 8 | 16 | 24 | 32 |
| DebiasedCNN (nb, nt) | -19% | -2% | 13% | 29% | 41% | DebiasedCNN (nb, nt) | 10% | 40% | 89% | 128% | 185% |
| DebiasedCNN (sb, nt) | 9% | 9% | 9% | 11% | 5% | DebiasedCNN (sb, nt) | 69% | 113% | 130% | 157% | 182% |
| FineTunedCNN (nb, st) | -20% | -1% | 13% | 27% | 38% | FineTunedCNN (nb, st) | -13% | 5% | 39% | 72% | 124% |
| FineTunedCNN (sb, st) | 15% | -2% | -3% | 0% | -6% | FineTunedCNN (sb, st) | 38% | 47% | 63% | 73% | 113% | d Simulation Study 4: Task = Classification, Bias = Color Temperature, Data = NTCIR-12

| Performance (PR AUC) | Color Temperature Bias (Δτ) | | | | | | | CAM Faithfulness (PCC) | Color Temperature Bias (Δτ) | | | | | | |
|---|---|---|---|---|---|---|---|---|---|---|---|---|---|---|---|
| | -5400 | -3600 | -1800 | 0 | 1800 | 3600 | 5400 | | -5400 | -3600 | -1800 | 0 | 1800 | 3600 | 5400 |
| DebiasedCNN (nb, nt) | 7% | 6% | 5% | 4% | 4% | 4% | 5% | DebiasedCNN (nb, nt) | 0% | 3% | -3% | -7% | -4% | -3% | -2% |
| DebiasedCNN (sb, nt) | 10% | 6% | 5% | 0% | 4% | 5% | 4% | DebiasedCNN (sb, nt) | 10% | 0% | -1% | 0% | -2% | -1% | 1% |
| FineTunedCNN (nb, st) | 1% | 0% | -1% | -1% | -1% | -1% | -1% | FineTunedCNN (nb, st) | -5% | -8% | -13% | -10% | -14% | -13% | -12% |
| FineTunedCNN (sb, st) | 2% | -1% | 0% | 0% | -1% | -1% | 0% | FineTunedCNN (sb, st) | -8% | -10% | -12% | 0% | -13% | -13% | -12% | e Simulation Study 5: Task = Classification, Bias = Day-to-Night, Data = TransAttr

| Performance (PR AUC) | Night Bias Ratio (ρ) | | | | | CAM Faithfulness (PCC) | Night Bias Ratio (ρ) | | | | |
|---|---|---|---|---|---|---|---|---|---|---|---|
| | 0 | 0.2 | 0.4 | 0.6 | 0.8 | | 0 | 0.2 | 0.4 | 0.6 | 0.8 |
| DebiasedCNN (nb, nt) | -12% | -11% | -4% | 24% | 84% | DebiasedCNN (nb, nt) | -37% | -16% | 7% | 66% | 169% |
| DebiasedCNN (sb, nt) | 0% | -3% | 3% | 36% | 92% | DebiasedCNN (sb, nt) | 0% | -8% | 13% | 74% | 106% |
| FineTunedCNN (nb, st) | -12% | -10% | -4% | 25% | 73% | FineTunedCNN (nb, st) | -61% | -48% | -37% | -8% | 18% |
| FineTunedCNN (sb, st) | 0% | -7% | -2% | 27% | 88% | FineTunedCNN (sb, st) | 0% | -26% | -20% | 10% | 45% |

FIG. 15

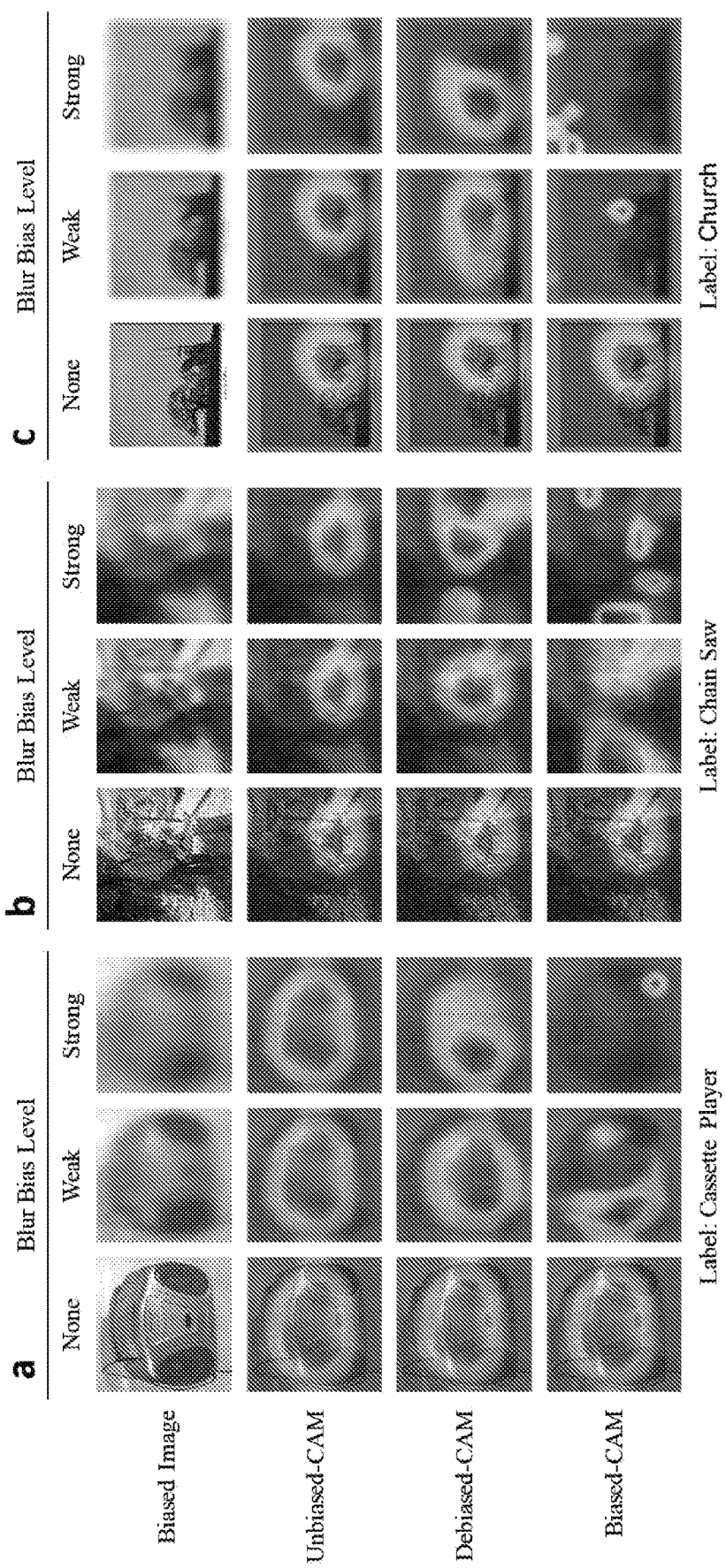
Figs. 20a-c

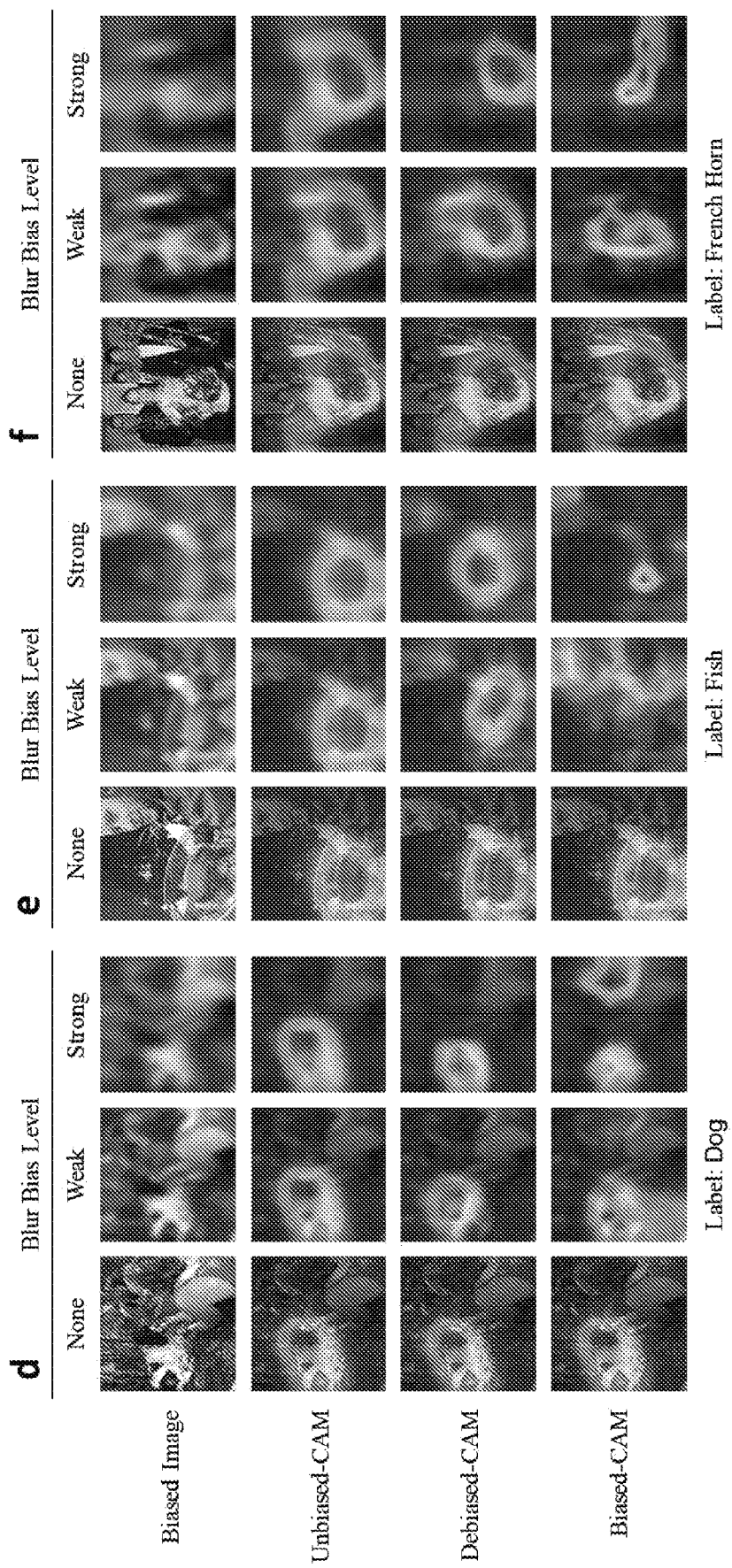
Figs. 20d-f

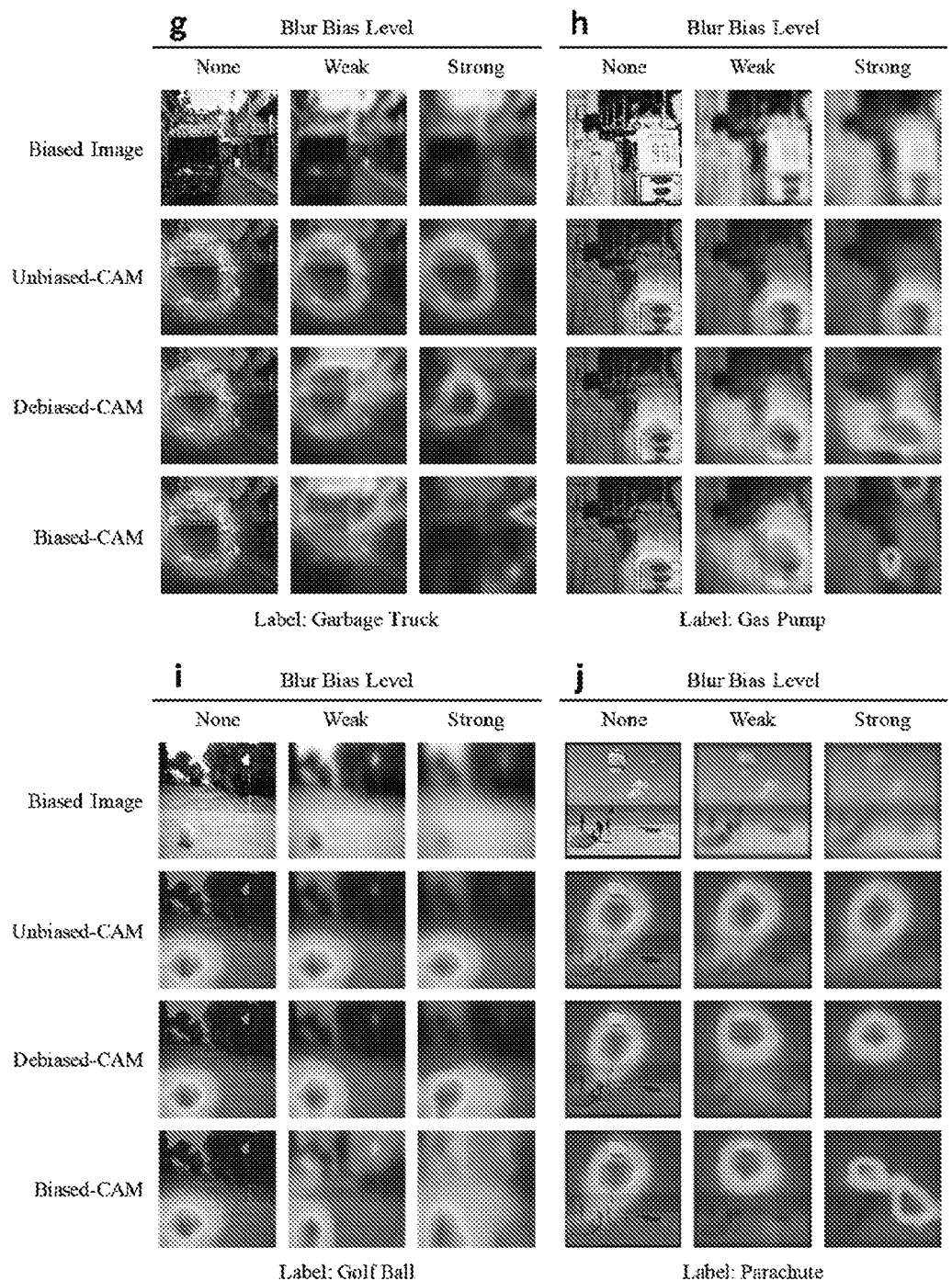
Figs. 20g-j

Congratulations! On to main survey

Congratulations! You have correctly completed the tutorial questions.

Please tell us a little about yourself.

Do you agree or disagree with the following statements?

|  | Strongly disagree | Disagree | Somewhat disagree | Neither agree nor disagree | Somewhat agree | Agree | Strongly agree |
|---|---|---|---|---|---|---|---|
| I consider myself as a technology-savvy person. | ○ | ○ | ○ | ○ | ○ | ○ | ○ |
| I have no problem understanding photographs. | ○ | ○ | ○ | ○ | ○ | ○ | ○ |

Next, you will see a series 10 of images and answer several questions for each image.

*Important: Please answer questions carefully. We may have to reject your work if you fail any attention test, or give inconsistent, repeatedly identical or seemingly random answers.*

FIG. 23

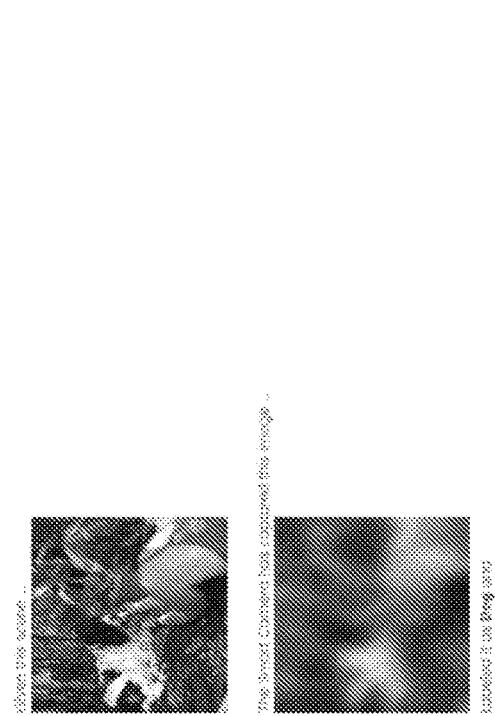
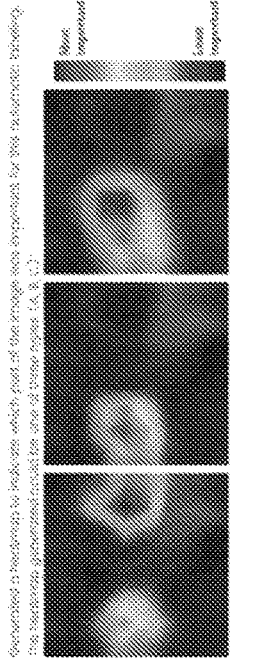
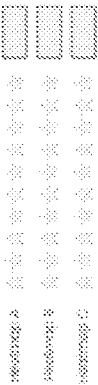
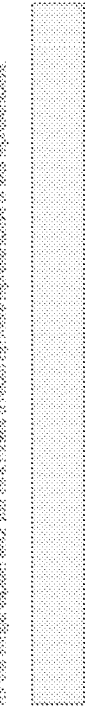
FIG. 24b
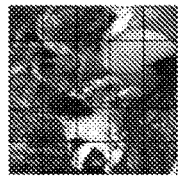
FIG. 24a a

| # | Response | Linear Effects Model (Participant as random effect) | F | p>F | $R^2$ |
|---|---|---|---|---|---|
| q1 | CAM Truthfulness Selection (PCC) | Blur Bias Level + | 55.2 | <.0001 | .554 |
| | | CAM Type + | 87.4 | <.0001 | |
| | | Blur Bias Level × CAM Type | 23.9 | <.0001 | |
| | | Trial Number | 66.4 | <.0001 | |
| q2 | CAM Truthfulness Rating | Blur Bias Level + | 121.9 | <.0001 | .532 |
| | | CAM Type + | 181.0 | <.0001 | |
| | | Blur Bias Level × CAM Type | 55.7 | <.0001 | |
| | | Trial Number | 7.1 | <.0001 | | b

| # | Response | Linear Effects Model (Participant as random effect) | F | p>F | $R^2$ |
|---|---|---|---|---|---|
| q1a | Labeling Confidence | Blur Bias Level + | 134.4 | <.0001 | .487 |
| | | CAM Type + | 3.5 | .0301 | |
| | | Bias Level × CAM Type | 1.7 | n.s | |
| | | Trial Number | 0.9 | n.s | |
| q1b | Labeling Correctness | Blur Bias Level + | 44.0 | <.0001 | .308 |
| | | CAM Type + | 3.3 | .0392 | |
| | | Bias Level × CAM Type | 1.6 | n.s | |
| | | Trial Number | 0.9 | n.s | |
| q2,3 | CAM Truthfulness Rating | Blur Bias Level + | 247.2 | <.0001 | .460 |
| | | CAM Type + | 128.9 | <.0001 | |
| | | Blur Bias Level × CAM Type | 25.2 | <.0001 | |
| | | Unblurred Disclosure | 10.4 | .0013 | |
| | | Unblurred Disclosure × Blur Bias Level | 5.1 | .0062 | |
| | | Unblurred Disclosure × CAM Type | 3.8 | .0230 | |
| | | Unblurred Disclosure × Blur Bias Level × CAM Type | 3.2 | .0118 | |
| | | Trial Number | 0.8 | n.s | |
| q5,6 | CAM Helpfulness Rating | Blur Blur Bias Level + | 137.6 | <.0001 | .391 |
| | | CAM Type + | 91.7 | <.0001 | |
| | | Blur Bias Level × CAM Type | 23.9 | <.0001 | |
| | | Unblurred Disclosure | 3.1 | n.s | |
| | | Unblurred Disclosure × Blur Bias Level | 3.4 | .0226 | |
| | | Unblurred Disclosure × CAM Type | 1.3 | n.s | |
| | | Unblurred Disclosure × Blur Bias Level × CAM Type | 2.2 | n.s | |
| | | Trial Number | 1.6 | n.s | |

FIG. 26

METHOD AND SYSTEM FOR TRAINING A NEURAL NETWORK

TECHNICAL FIELD

The present invention generally relates to a method and system for training a neural network.

BACKGROUND ART

With the growing availability of data, Convolutional Neural Networks (CNN) and other deep neural networks are increasingly capable to achieve impressive performance in many prediction tasks, such as image scene understanding, medical image diagnosis, captioning and dialog systems. Despite their superior performance, deep learning models are complex and unintelligible, and this limits user trust and understanding. This has driven the development of a wide variety of explainable artificial intelligence (XAI) and interpretable machine learning methods. Saliency maps are commonly used to provide intuitive explanations for CNN-based image prediction tasks by indicating which pixels or neurons were used for model inference. Amongst these, Class activation map (CAM), Grad-CAM and extensions are particularly useful by identifying pixels relevant to specific class labels. Users can verify the correctness of each prediction by checking whether expected pixels are highlighted with the CAM. Models would be considered more trustworthy if their CAMs matched what users identify as salient.

Despite the fidelity of CAMs on clean images, real-world images are typically subjected to biases, such as color-distortion or image blurring, and these can affect what CAMs highlight. Blurring can be due to accidental motion, defocus blur or done deliberately to obfuscate details for privacy protection. Images may also be biased with shifted color temperature due to mis-set white balance. These biases decrease model prediction performance and can lead to deviated or biased CAM explanations that are less faithful to the original scenes. For different bias types (e.g., image blur and color temperature shift), CAMs are found to deviate more as image bias increased (see FIG. 1 and FIG. 2: Biased-CAMs from RegularCNN for $\sigma>0$). Although Biased-CAM represents what the CNN considers important in a biased image, it is misaligned with people's expectations, misleads users to irrelevant targets, and impedes human verification and trust of the model prediction. For example, when explaining the inference of the "Fish" label for an image prediction task, Biased-CAMs select pixels of the man instead of the fish (FIG. 1).

To align with user expectations, models should not only have the right predictions but also have the right reasons; current approaches, however, face challenges in achieving this goal. First, while retraining the model by fine-tuning on biased images can improve its performance, this does not seek to improve explanation faithfulness. Indeed, CAMs remain deviated, unfaithful, and biased (FIG. 1, Biased-CAMs from FineTunedCNN for $\sigma>0$). Conversely, retraining the model with attention transfer or loss only improves explanation faithfulness for clean images, but cannot handle biased images. Finally, evaluating human interpretability of explanations requires deep enquiry into user perception and usage, but typical evaluations of explainable AI methods involve only data simulations or simple surveys with ratings of explanation trust. Hence, existing methods on image explanation remain lacking for biased images due to unspecific training to mitigate explanation deviation, and limited evaluation of human interpretability.

SUMMARY OF INVENTION

In an embodiment, there is provided a method for training a neural network. The method includes receiving, by a processing device, a training image, a reference label and a reference class activation map, the reference label and the reference class activation map associated with a corresponding unbiased image of the training image and generating, using the processing device, a class label and a class activation map based on the training image using the neural network. The method also includes calculating, using the processing device, a classification loss value based on differences between the reference label and the class label, and a class activation map loss value based on differences between the reference class activation map and the class activation map and updating, using the processing device, the neural network to minimise the classification loss value and the class activation map loss value to improve accuracy of the neural network in generation of the class label and the class activation map.

In another embodiment, there is provided a system for training a neural network. The system includes a processing device configured to receive a training image, a reference label and a reference class activation map, the reference label and the reference class activation map associated with a corresponding unbiased image of the training image and generate a class label and a class activation map based on the training image using the neural network. The processing device is also configured to calculate a classification loss value based on differences between the reference label and the class label, and a class activation map loss value based on differences between the reference class activation map and the class activation map and update the neural network to minimise the classification loss value and the class activation map loss value to improve accuracy of the neural network in generation of the class label and the class activation map.

BRIEF DESCRIPTION OF DRAWINGS

Embodiments of the invention will be better understood and readily apparent to one of ordinary skill in the art from the following written description, by way of example only, and in conjunction with the drawings, in which:

FIG. 3d shows a schematic diagram illustrating an example of a system for training a neural network, in accordance with embodiments of the disclosure.

FIG. 5 shows loss functions and bias levels of CNN model variants with single-task (st) or multi-task (mt) architectures trained on a specific (sb) or multiple (mb) bias levels.

FIGS. 7a-7d show evaluation of Task Performance and CAM Faithfulness in ablation studies across increasing bias levels for different prediction tasks and datasets.

FIG. 15 shows the percent improvement in Task Performance and CAM Faithfulness of CNN models compared to RegularCNN at each bias level.

FIGS. 20a-j show CAMs generated by different base CNN models at various blur levels.

FIGS. 21 to 25 show key sections in the questionnaire for the CAM Truthfulness User Study 1 and CAM Helpfulness User Study 2.

FIG. 26 shows statistical analysis of responses due to effects as linear mixed effects models.

Figure 1A:
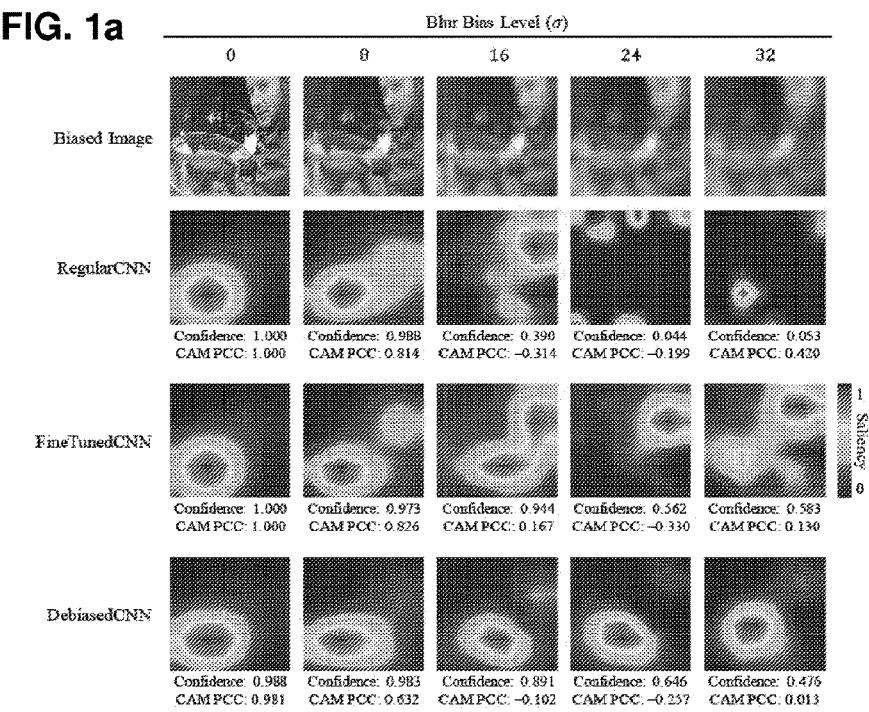
FIGS. 1a-1c show deviated and debiased CAM explanations.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DESCRIPTION OF EMBODIMENTS

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "associating", "calculating", "comparing", "determining", "forwarding", "generating", "identifying", "including", "inserting", "modifying", "receiving", "replacing", "scanning", "transmitting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may include a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on a computer effectively results in an apparatus that implements the steps of the preferred method.

In embodiments of the present invention, use of the term 'server' may mean a single computing device or at least a computer network of interconnected computing devices which operate together to perform a particular function. In other words, the server may be contained within a single hardware unit or be distributed among several or many different hardware units.

The term "configured to" is used in the specification in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Overview

Machine learning models are increasingly capable to achieve impressive performance in many prediction tasks, such as image recognition, medical image diagnosis, captioning and dialog systems. Despite their superior performance, deep learning models are complex and unintelligible, and this limits user trust and understanding. This has driven the development of a wide variety of explainable artificial intelligence (XAI) and interpretable machine learning methods. Saliency maps are commonly used to provide intuitive explanations for image prediction tasks by indicating which pixels or neurons were used for model inference. Amongst these, class activation map (CAM), Grad-CAM and extensions are particularly useful by identifying pixels relevant to specific class labels. Users can verify the correctness of each prediction by checking whether expected pixels are highlighted. Models would be considered more trustworthy if their CAMs matched what users identify as salient.

Despite the fidelity of CAMs on clean images, real-world images are typically subjected to biases, such as image blurring or color-distortion, and these can affect what CAMs highlight. Blurring can be due to accidental motion or defocus blur or done deliberately to obfuscate details for privacy protection. Images may also be biased with shifted color temperature due to mis-set white balance. These biases decrease model prediction performance and lead to deviated or biased CAM explanations that are less faithful to the original scenes. For different bias types (e.g., image blur and color temperature shift), CAMs are found more deviated as image bias increased (FIG. 1 and FIG. 2: Biased-CAMs from RegularCNN for $\sigma>0$). Although Biased-CAM represents what the CNN considers important in a biased image, it is misaligned with people's expectations, misleads users to irrelevant targets, and impedes human verification and trust of the model prediction. For example, when explaining the inference of the "Fish" label for an image prediction task, Biased-CAMs select pixels of the man instead of the fish (FIG. 1).

To align with user expectations, models should not only have the right predictions but also have the right reasons; however, current approaches face challenges in achieving this goal, particularly for biased data. First, while fine-tuning the model on biased data can improve its performance, this does not necessarily produce explanations aligned with human's understanding. Indeed, explanations were found to remain deviated, unfaithful, and biased (FIG. 1, Fine-TunedCNN Biased-CAMs). Conversely, retraining the model with attention transfer only improves explanation faithfulness for clean images, but cannot handle biased images. Finally, evaluating the human interpretability of explanations requires deep inquiry into user perception, understanding and usage, but typical evaluations of XAI involve only data simulations or simple surveys.

Accordingly, what is needed is a debiasing approach that train models to faithfully explain the event despite biased sources. Using Convolutional Neural Networks (CNN) with Grad-CAM saliency map explanations, a multi-task model (DebiasedCNN) is developed and the multi-task model can interpret biased images as if predicting on the unbiased form of images and generates explanations that are more human-relatable and robust under bias. The approach has a modular design: 1) it can be self-supervised and does not require additional human annotation for training; 2) it can produce explanations as a secondary prediction task, so that they are retrainable to be debiased, 3) it can model the bias level as a tertiary task to support bias-aware predictions. The approach not only enhances prediction performance on biased data, but also generates highly faithful explanations about these predictions as if the data were unbiased (FIG. 1: DebiasedCNN CAMs across bias levels σ).

Figure 1B:
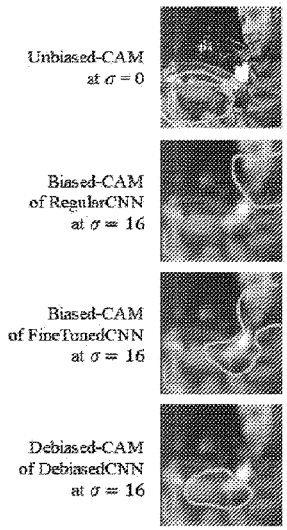
Figure 1C:
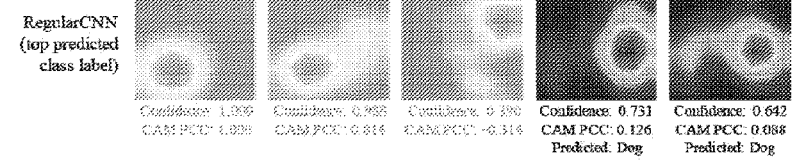

FIGS. 1a-1d show deviated and debiased CAM explanations. FIG. 1a shows that Debiased-CAMs (from DebiasedCNN) were most faithful to the Unbiased-CAM (from RegularCNN at σ=0) as blur bias increased. In contrast, Biased-CAMs from RegularCNN and FineTunedCNN became significantly deviated with a much lower CAM Pearson Correlation Coefficient (PCC). FIG. 1b shows that debiased-CAM selected similar important pixels of the Fish as Unbiased-CAM, while Biased-CAMs selected irrelevant pixels of the person or background instead. Important pixels shown within contour lines were overlaid on the actual unblurred scene (σ=0) for reference and the blurred input image at σ=16. FIG. 1c shows that CAM of the top predicted class label with only RegularCNN at σ=24 or 32 predicting the wrong prediction label "Dog". In these cases, the CAMs also do not highlight the fish and are similar to the Biased-CAM of FineTunedCNN, indicating that wrong CAMs may suggest wrong classification, even though FineTunedCNN predicted correctly.

To evaluate the developed model, simulation and user studies are also conducted to address the research questions on 1) how bias decreases explanation faithfulness and how well debiasing mitigates this, and 2) how sensitive people are to perceiving explanation deviations and how well debiasing improves perceived explanation truthfulness and helpfulness. For generality, the simulation studies spanned different image prediction tasks object recognition, activity recognition with egocentric cameras, image captioning, and scene understanding), bias types (blur, color shift, and night vision interpolation) and various datasets. Across all studies, it is found that while increasing bias led to poorer prediction performance and worse explanation deviation, Debiased-CAM showed the best improvement in task performance as well as explanation faithfulness. Instead of trading off task performance for explanation faithfulness, debiasing training can improve both. Usability and usefulness of Debiased-CAMs is also demonstrated in two controlled user studies. Quantitative statistical and qualitative thematic analyses validated that users can perceive the improved truthfulness and helpfulness of Debiased-CAMs on biased images.

In the present disclosure, deviations in model explanations due to bias in data across different bias types and levels are assessed. A technical approach to accurately predict and faithfully explain inferences under data bias is also disclosed. Moreover, the improvements in perceived truthfulness and helpfulness of debiased explanations are validated.

Explainable AI for image-based CNN models is discussed in this paragraph. Many explainable AI (XAI) techniques have been proposed to understand the predictions of CNNs. These include saliency maps, feature visualization, and activations of neurons and concept variables. Saliency maps are an intuitive approach to interpret deep CNN models, where important pixels are highlighted to indicate their importance towards the model prediction. Computing the gradient of the prediction with respect to input is one approach that can highlight sensitivity. Another approach can divide the prediction outcome across features by Taylor series approximation or by Shapley values. Specific to CNNs, coarser saliency maps can be generated by aggregating activation maps as a weighted sum across convolutional kernels. While CAM requires model retraining, Grad-CAM can be read from any CNN without retraining. Extensions can improve Grad-CAM for robustness and multiple objects. Embodiments of the present disclosure use the original Grad-CAM approach. Nonetheless, it can be appreciated that it would be apparent to the person skilled in the art that it can be generalize to its extensions. CAM saliency maps are intuitive for lay end-users to interpret with basic perception skills and Grad-CAM can allow users to perceive truthful, biased, or debiased explanations.

User studies of model explanations aim to show that explanations can improve user understanding and trust. These studies tend to use cases where the model predicts correctly and explanations are pre-selected to be good. This measures the upper bound of how well explanations can help. In contrast, models are not perfect and can make prediction errors or may not be confident in their decisions. Studies have explored how this may lead to distrust, mistrust and over-trust. For such cases, explanations can be avoided when there is a high chance of model error. However, explanations can still be wrong despite the model predicting correctly. For example, explanations may highlight spurious pixels, be adversarially manipulated, or subject to input error. These cases are harder to detect, pose a serious risk to decrease user trust, or mislead users. The present disclosure also provides how slight data variations can affect user performance and trust. It should be noted that the data bias referred herein is due to sensory perceptual error or statistical variance (e.g., noise, lighting), and not societal bias or discrimination (e.g., racism, sexism). Since data bias and corruption are prevalent in the real-world, it is tantamount to identify the severity of the problem and mitigate it with more robust explanations. In the present disclosure, the extent of explanation deviation due to data bias are quantified and users' sensitively to these deviations are evaluated.

EXEMPLARY EMBODIMENTS

Embodiments of the present disclosure provide a self-supervised model training approach to transfer explanations from an unbiased source to the model predicting on biased data. Baseline RegularCNN and FineTunedCNN approaches to predict on unbiased and biased image data is first discussed below, followed by DebiasedCNN architectures to predict on biased image data with debiased explanations.

A regularly trained CNN model (RegularCNN) can generate a truthful CAM $\tilde{M}$ (Unbiased-CAM) of an unbiased image x, but will produce a deviated CAM $\tilde{M}$ (Biased-CAM) for the image under bias $x_b$, i.e., $\tilde{M}(x) \neq \tilde{M}(x_b)$, due to the model not training on any biased images and learning spurious correlations with blurred pixels. A fine-tuned model trained on biased images can improve the prediction performance on biased images, but will still generate a deviated CAM Si for each biased image (FIG. 1a and FIG. 2a-d: CAMs of FineTunedCNN), as it was only trained with the classification loss and not explanation loss. While these models can be explained with Grad-CAM, they are not retrainable to improve their CAM faithfulness.

Embodiments of the present disclosure provide a trainable CAM as a secondary prediction task. CAM retraining is enabled by redefining Grad-CAM as a prediction task. Grad-CAM computes a saliency map explanation of an image prediction with regards to class c as the weighted sum of activation maps in the final convolutional layer of a CNN. Each activation map $A^k$ indicates the activation $A_{ij}^k$ for each grid cell (i,j) of the kth convolution filter $k \in K$. The importance weight $\alpha_k^c$ for the kth activation map is calculated by back-propagating gradients from the output $\hat{y}$ to the convolution filter, i.e., $$\alpha_k^c = \frac{1}{HW} \sum_{i=1}^{H} \sum_{j=1}^{W} \frac{\partial \hat{y}^c}{\partial A_{ij}^k} \equiv GAP_{ij}\left(\frac{\partial \hat{y}^c}{\partial A^k}\right)$$

where H and W are the height and width of activation maps, respectively; $y^c$ is a one-hot vector indicating only the probability of class c. Grad-CAM obtains the class activation map by computing a weighted combination of feature maps, followed by a ReLU transform to only show positive activation towards class c, i.e., $$M^c = ReLU\left(\sum_k \alpha_k^c A^k\right) \equiv \hat{M} = ReLU(\alpha^c A^T)$$

which is rewritten as a matrix multiplication of all K importance weights $\alpha^c = \{\alpha_k^c\}^K$ and the transpose of activation maps A along the kth axis, i.e., $A^T = \{A_{ij}^k\}^{K \times H \times W}$.

Figure 3A:
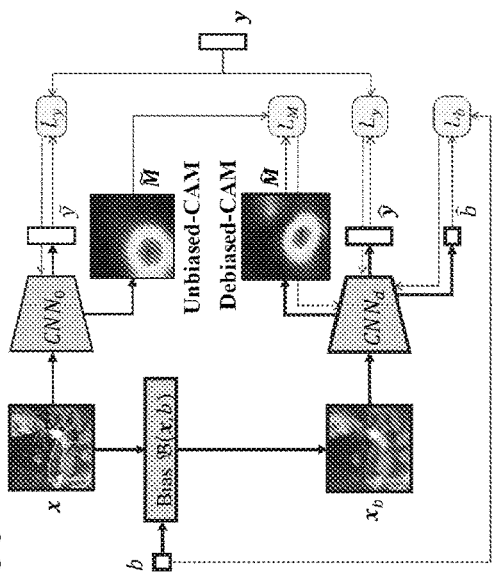
FIG. 3a shows a neural network in accordance with embodiments of the disclosure.

Therefore, the CAM prediction task can be redefined as three non-trainable layers (computational graph) in the neural network (FIG. 3a, 302) to compute $$\frac{\partial \hat{y}^c}{\partial A^k},$$

$\alpha_k^c$, and $\hat{M}$, respectively. By reformulating Grad-CAM as a secondary prediction task, the model can be trained with faithful CAM based on differentiable CAM loss by back-propagating through this task. This task takes $e_c$ as the second input to the CNN architecture to specify the target class label for the CAM. c is set as the ground truth class label at training time, and chosen by the user at run time. The aforementioned approach can be termed Multi-Task DebiasedCNN, and the conventional use of Grad-CAM can be termed as Single-Task DebiasedCNN. For single-task DebiasedCNN, the loss is backpropagated through the primary classification task, i.e., CAM loss is calculated as conventionally as weighted sum number than predicted with secondary task. This will limit its learning since weights are not updated with gradient descent.

Figures 2A, 2B, 2C, 2D:
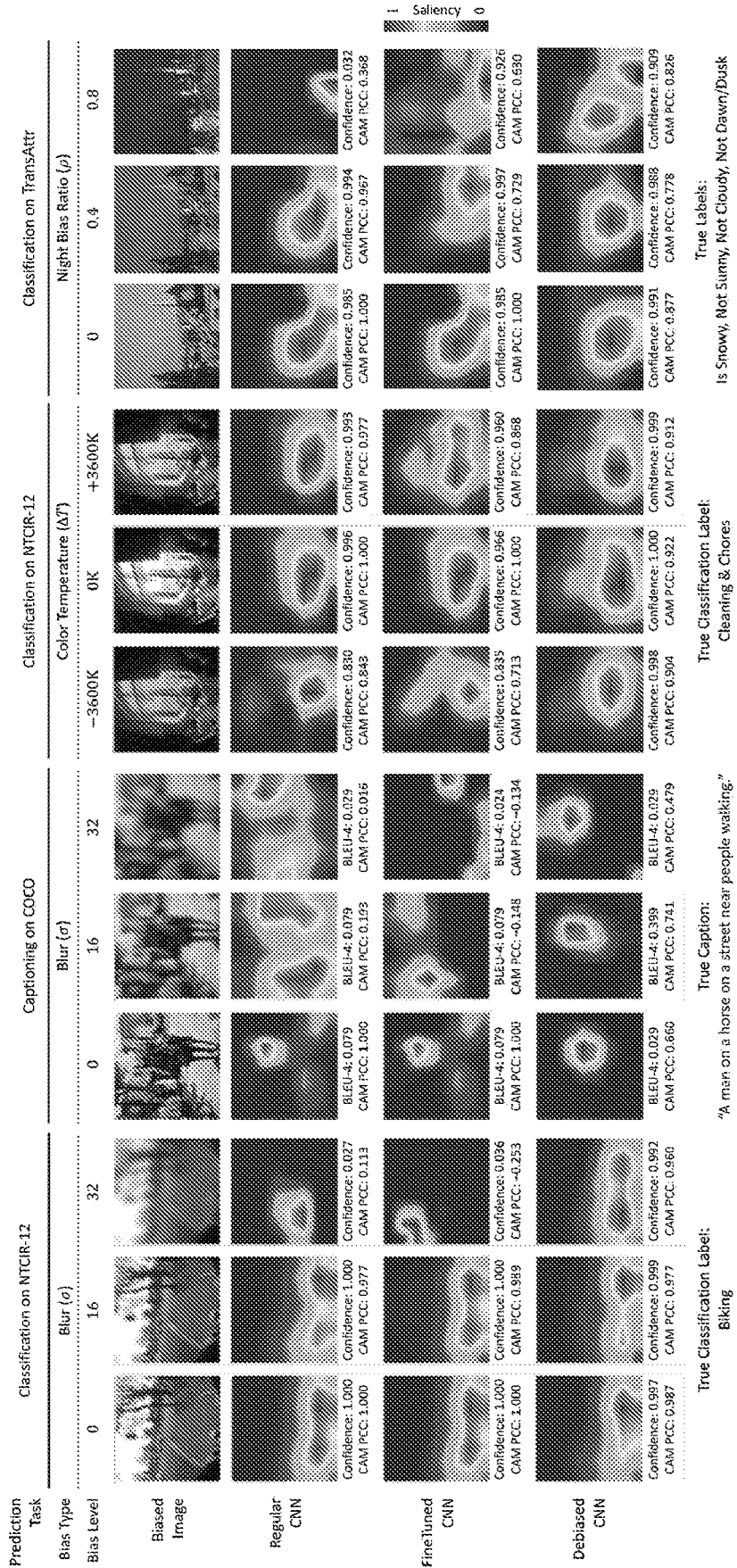
FIGS. 2a-2d show deviated and debiased CAM explanations.
Figure 3B:
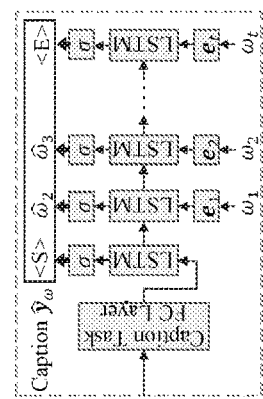
FIG. 3b shows Recurrent Neural Network (Long Short Term Memory, LSTM) model for image captioning.
Figure 3C:
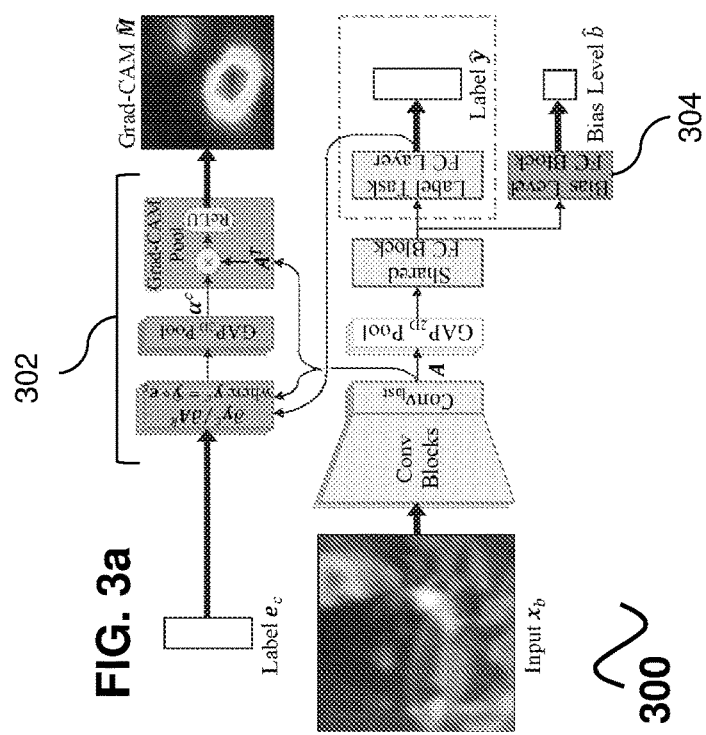
FIG. 3c shows a system for training a neural network accordance with embodiments of the disclosure.
Figure 6:
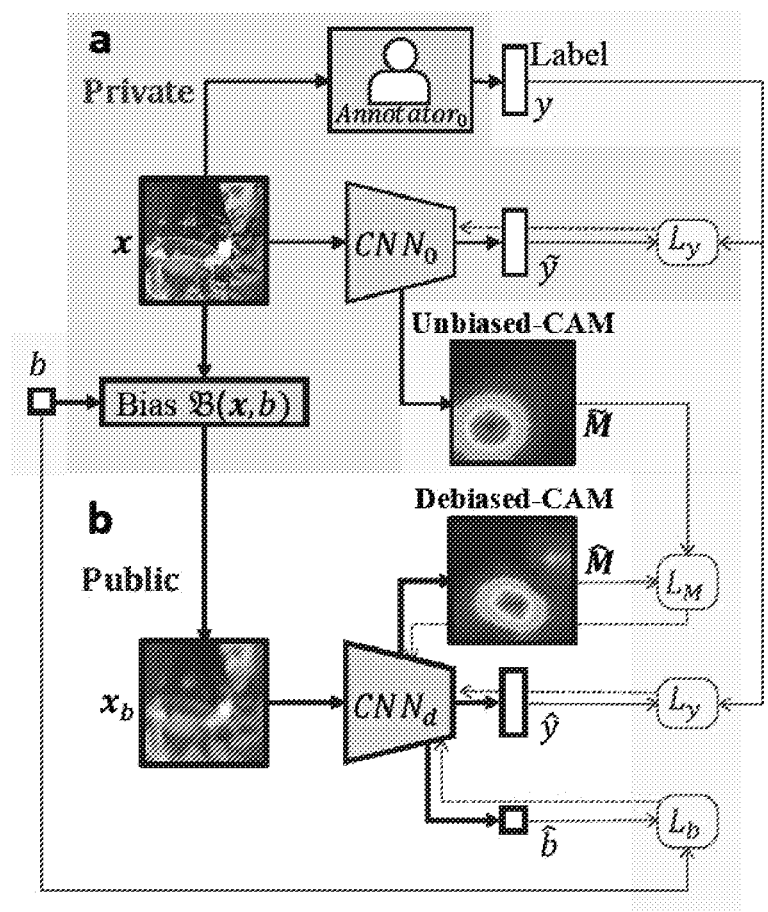
FIGS. 6a and 6b show an architecture of multi-task debiased CNN model for self-supervised learning from private training data for privacy-preserving prediction.

Embodiments of the present disclosure also provide a method of training CAM debiasing with self-supervised learning. To debias CAMs $\hat{M}$ of biased images $x_b$ toward truthful Unbiased-CAMs $\tilde{M}$ of clean images x, i.e., $\hat{M}(x_b) \approx \tilde{M}(x)$, DebiasedCNN is trained with self-supervised learning to transfer knowledge of corresponding unbiased images in RegularCNN into DebiasedCNN, with the aim to minimize the difference between Unbiased-CAM $\tilde{M}$ and Debiased-CAM $\hat{M}$. The training involves the following steps (see FIGS. 3c-d): 1) Given a training dataset with clean images $x \in X$ and labels y, apply a bias transformation (e.g., blur) on the images to create blur variants of each image $x_b \in X_b$. 2) Train a RegularCNN to predict label $\tilde{y}$ on clean image x. It is understood that its Grad-CAM explanations $\tilde{M}$ are correct and serve as a good oracle for Unbiased-CAMs. 3) Train a DebiasedCNN to predict label $\hat{y}$ on corresponding biased image $x_b$, and explain with CAM $\hat{M}$. DebiasedCNN is trained with loss function:

$$L(w) = \underbrace{L_y(y, \hat{y}(w))}_{\text{prediction loss}} + \omega_M \underbrace{L_M(\tilde{M}, \hat{M})}_{\text{CAM loss}}$$

where the classification loss $L_y$ and CAM loss $L_M$ are differentiable with respect to their corresponding prediction tasks and $\omega_M$ is a hyperparameter. $L_y$ with cross-entropy loss and $L_M$ with mean square error (MSE) loss are computed. The training can be interpreted as attention transfer from an unbiased model to a model subject to bias. DebiasedCNN is a generalizable training framework and can be extended to other image prediction tasks (e.g., image captioning: FIG. 3b), other bias types (e.g., color temperature, lighting: FIG. 2c, 2d), different base CNN models (e.g., VGG16, Inception v3, ResNet50, Xception), and for privacy-preserving machine learning (FIG. 6). FIG. 6 shows architecture of multi-task debiased CNN model for self-supervised learning from private training data for privacy-preserving prediction. In portion a of FIG. 6, RegularCNN $CNN_0$ is trained on a private unbiased dataset with unblurred image x to generate Unbiased-CAM $\tilde{M}$. In portion b of FIG. 6, DebiasedCNN $CNN_d$ is trained on a public (non-private) biased dataset with blurred image $x_b$ and self-supervised with Unbiased-CAM $\tilde{M}$ to generate Debiased-CAM $\hat{M}$. During model training, $CNN_d$ has access to the bias level of each training image $x_b$, Unbiased-CAM $\tilde{M}$, and actual label y, but has no access to them during model inference. $CNN_d$ never has access to any unblurred image x. At inference time, DebiasedCNN can generate relevant and faithful Debiased-CAMs from privacy-protected blurred images. Thus, the DebiasedCNN can debias spurious explanations of a privacy-preserving AI.

Embodiments of the present disclosure also provide a DebiasedCNN capable of bias-agnostic, multi-bias predictions with tertiary task. Image biasing can happen sporadically at run time, so the image bias level b may be unknown at training time. Instead of training on specific bias levels or fine-tuning with data augmentation on multiple bias levels, a tertiary prediction task—bias level regression—is added to DebiasedCNN to leverage supervised learning (FIG. 3, 304). This enables DebiasedCNN to be bias-aware (can predict bias level) and bias-agnostic (predict under any bias level). With the bias level prediction task, the training loss function for multi-bias, multi-task DebiasedCNN is:

$$L = L_y(y,\hat{y}) + \omega_M L_M(\tilde{M},\hat{M}) + \omega_b L_b(b,\hat{b})$$

where the classification loss $L_y$, CAM loss $L_M$ and bias prediction loss $L_b$ are differentiable with respect to corresponding tasks, $\omega_M$, $\omega_b$ are hyperparameters.

The training loss terms are defined as follows: primary task loss $L_y$ as cross-entropy loss for standard classification tasks, and as the sum of negative log likelihood for each caption word in image captioning tasks; bias level loss $L_b$ as the mean squared error (MSE), common for regression tasks; CAM loss $L_M$ as the mean squared error (MSE), since CAM prediction can be considered a 2D regression task, and this is common for visual attention tasks. Other suitable metrics for the CAM loss include: mean absolute error (MAE) which penalizes large differences less than MSE; Kullback-Leibler Divergence (KLD) or Jensen-Shannon Distance (JSD) which compare the distribution of pixel saliency between CAMs, but are more expensive to calculate; and Pearson's Correlation Coefficient (PCC) which compares the pixel-wise correlation between CAMs, but is also computationally expensive for training.

Figure 3E:
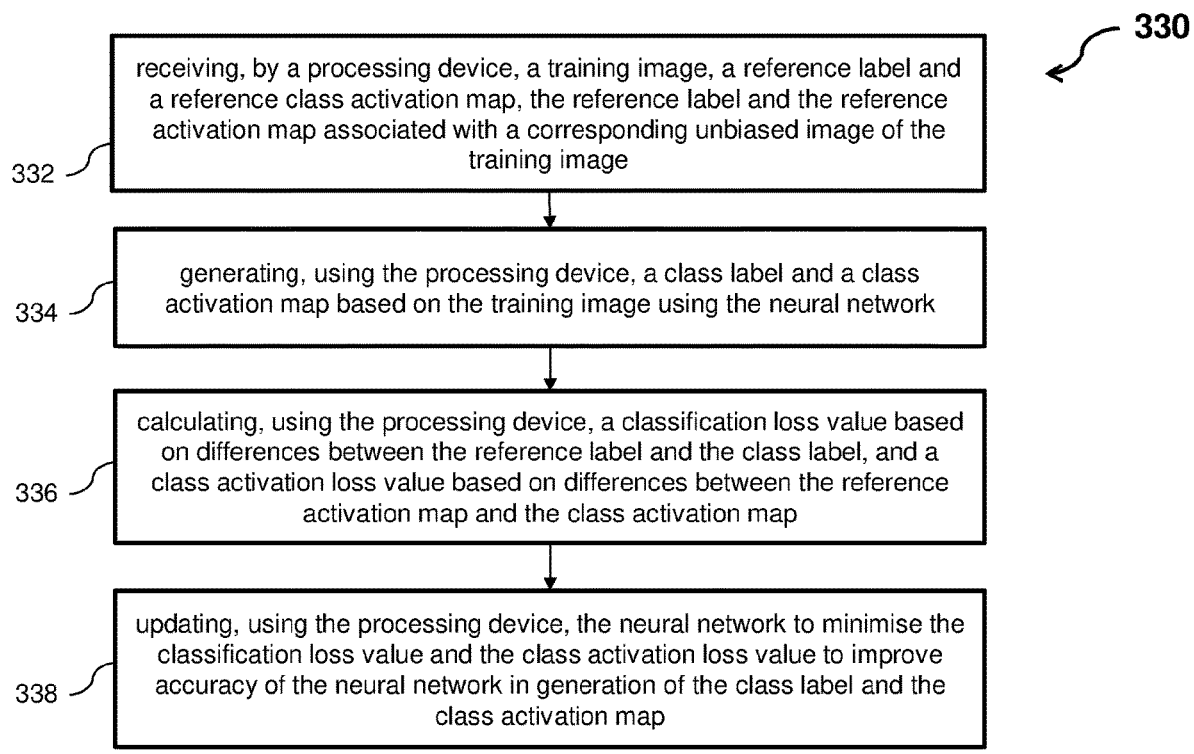
FIG. 3e shows a method for training a neural network in accordance with embodiments of the disclosure.
Figure 3F:
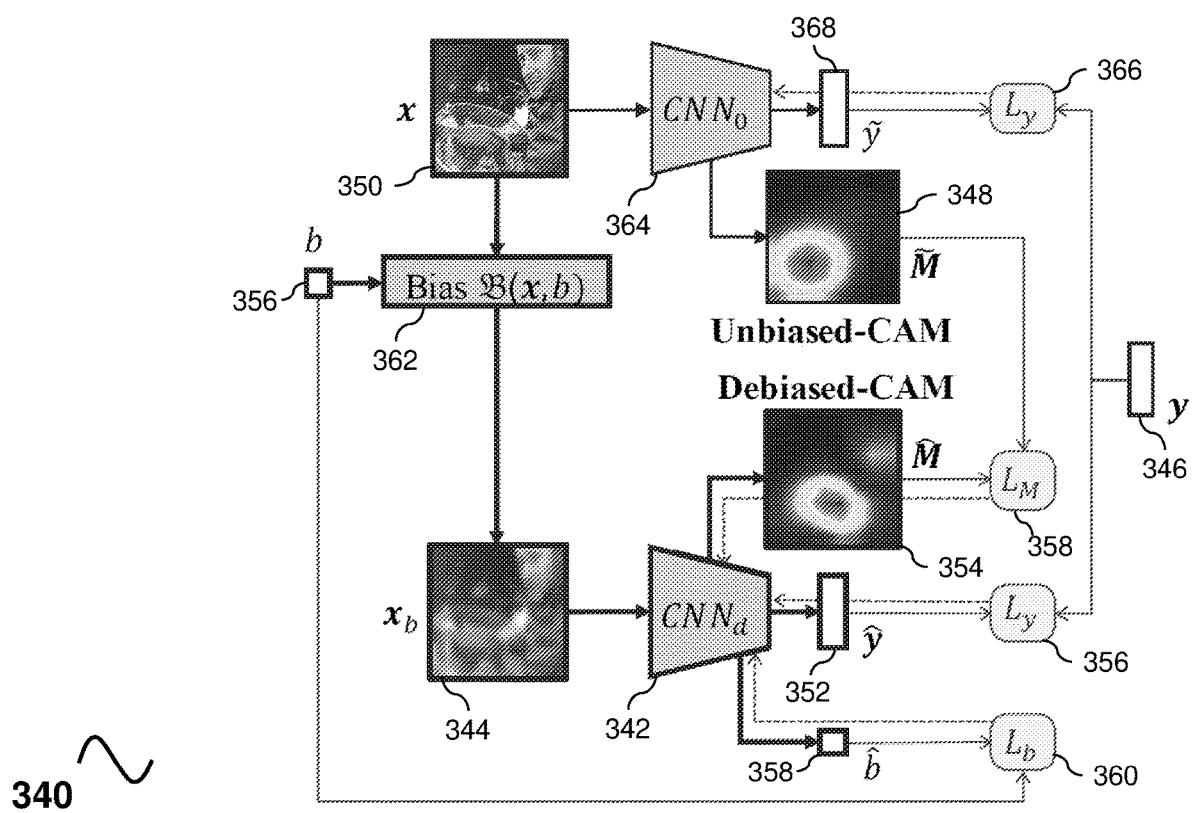
FIG. 3f shows a system for training a neural network accordance with embodiments of the disclosure.

In other words, embodiments of the present disclosure provide a system for training a neural network 342 ($CNN_d$) (FIG. 3f). The system can be system 320 shown in FIG. 3d, which includes a processing device 322. The system 320 can implement method 330 as shown in FIG. 3e and described in conjunction with schematic diagram 340 shown in FIG. 3f. The method 330 broadly includes step 332 of receiving, by the processing device 322, a training image 344 ($x_b$), a reference label 346 ($y$) and a reference class activation map 348 ($\tilde{M}$), the reference label 346 ($y$) and the reference class activation map 348 ($\tilde{M}$) associated with a corresponding unbiased image 350 ($x$) of the training image 344 ($x_b$). The method 330 also includes step 334 of generating, using the processing device 322, a class label 352 ($\hat{y}$) and a class activation map 354 ($\hat{M}$) based on the training image 344 ($x_b$), using the neural network 342 ($CNN_d$). The method 330 further includes the step 336 of calculating, using the processing device 322, a classification loss value 356 ($L_y$) based on differences between the reference label 346 ($y$) and the class label 352 ($\hat{y}$), and a class activation map loss value 358 ($L_M$) based on differences between the reference class activation map 348 ($\tilde{M}$) and the class activation map 354 ($\hat{M}$). The method 330 further includes the step 338 of updating, using the processing device 322, the neural network 342 ($CNN_d$) to minimise the classification loss value 356 ($L_y$) and the class activation map loss value 358 ($L_M$) to improve accuracy of the neural network 342 ($CNN_d$) in generation of the class label 352 ($\hat{y}$) and the class activation map 354 ($\hat{M}$).

In embodiments, the step of updating the neural network 342 ($CNN_d$) to minimise the classification loss value 356 ($L_y$) and the class activation map loss value 358 ($L_M$) can include updating, using the processing device 322, the neural network 342 ($CNN_d$) to minimise a sum $L(w)$ of the classification loss value 356 ($L_y$) and the class activation map loss value 358 ($L_M$).

In embodiments, the method 330 can further include receiving, by the processing device 322, a reference bias value 356 ($b$) associated with the training image 344 ($x_b$) and generating, using the processing device 322, a bias label 358 ($\hat{b}$) based on the training image 344 ($x_b$) using the neural network 342 ($CNN_d$). The method 330 can further include calculating, using the processing device 322, a bias loss value 360 ($L_b$) based on differences between the reference bias value 356 ($b$) and the bias label 358 ($\hat{b}$) and updating, using the processing device 322, the neural network 342 ($CNN_d$) to minimise the bias loss value 360 ($L_b$).

In embodiments, the step of receiving, by the processing device 322, the training image 344 ($x_b$) can include generating, using the processing device 322, the processing device 322 based on a bias transformation 362 of the corresponding unbiased image 350 ($x$). In embodiments, the bias transformation can include one or more of a change in blur level, color temperature and day-night lighting of the unbiased image 350 ($x$).

In embodiments, the step of receiving the reference label 346 ($y$) and the reference class activation map 348 ($\tilde{M}$) can include receiving, by a processing device 322, the corresponding unbiased image 350 ($x$) and generating, using the processing device 322, the reference class activation map 348 ($\tilde{M}$) based on the corresponding unbiased image 350 ($x$) using a pre-trained neural network 364 ($CNN_0$). The pre-trained neural network 364 (CNN) is trained to minimise an unbiased classification loss 366 based on differences between the reference label 346 ($y$) and an unbiased class label 368 ($\tilde{y}$).

Figure 4:
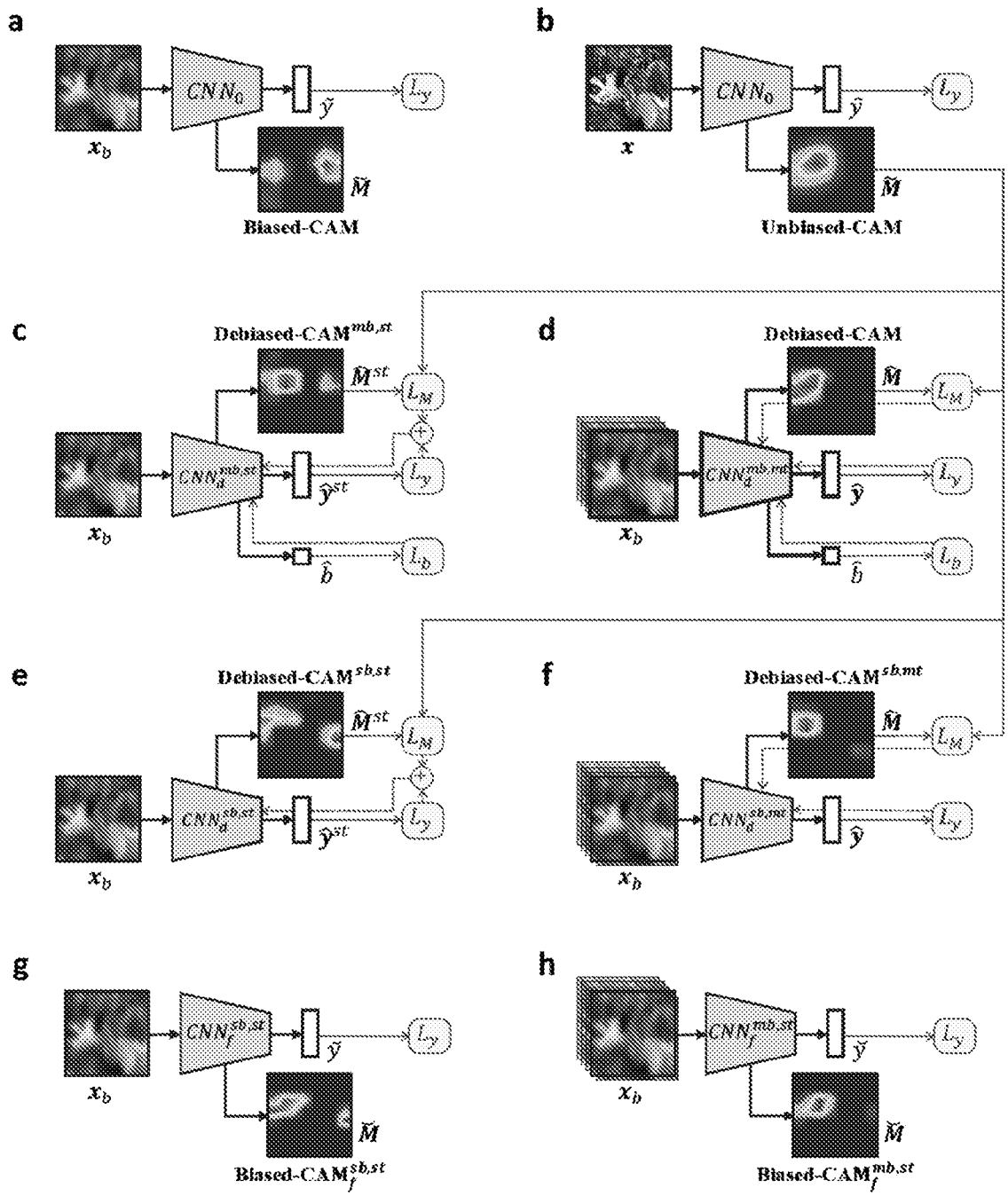
FIGS. 4a-4h show various architectures of self-supervised DebiasedCNN variants and of baseline CNN models and their CAM explanations from a biased "Dog" image blurred at $\sigma=24$.

DebiasedCNN has a modular design: 1) single-task (st) or multi-task (mt) to improve model training; and 2) single-bias (sb) or multi-bias (mb) to support bias-aware and bias-agnostic predictions. The four DebiasedCNN variants are denoted as (sb, st), (mb, st), (sb, mt), (mb, mt), and ablation studies are conducted to compare between them. FIGS. 4 and 5 show details of the model variant architectures and training losses.

FIG. 4 shows various architectures of self-supervised DebiasedCNN variants and of baseline CNN models and their CAM explanations from a biased "Dog" image blurred at σ=24. FIG. 4a shows a RegularCNN on biased image. FIG. 4b shows a RegularCNN on unbiased image. FIG. 4c shows a DebiasedCNN (mb, st) with single-task loss as a sum of classification and CAM losses for the classification task, trained on multi-bias images with auxiliary bias level prediction task. FIG. 4d shows a DebiasedCNN (sb, mt) with multi-task for CAM prediction trained with differentiable CAM loss, and trained on multi-bias images with auxiliary bias level prediction task. FIG. 4e shows a DebiasedCNN (sb, st) with single-task loss as a sum of classification and CAM losses for the classification task. FIG. 4f shows a DebiasedCNN (sb, mt) with multi-task for the CAM prediction and differentiable CAM loss. FIG. 4g shows a FineTunedCNN (sb,st) retrained on images biased at a single-bias level. FIG. 4h shows a FineTunedCNN (mb,st) retrained on images biased variously at multi-bias levels.

FIG. 5 shows CNN model variants with single-task (st) or multi-task (mt) architectures trained on a specific (sb) or multiple (mb) bias levels. Each training set image $x \in X$ is preprocessed by a bias operator $\mathcal{B}$ at a selected level b, i.e., $x_b = \mathcal{B}(x, |b|>0)$, $\forall x \in X$. $\mathcal{B}$ depends on the bias type (e.g., blur, color temperature, day-night lighting). For DebiasedCNN, mt refers to including a CAM task with differentiable CAM loss separate from the primary prediction task, while st refers to the primary prediction task with non-differentiable CAM loss. Models trained for single-bias (sb) used training set images biased at a single level b>0, while models trained for multi-bias levels (mb) used training datasets with data augmentation where each image is biased to a level that is randomly selected from a uniform probability distribution $B_{rand} \sim U([0, b_{max}])$. Multi-bias DebiasedCNN also adds a task for bias level prediction. Loss functions in vector form specify one loss function per task in a multi-task architecture.

To evaluate how much CAMs deviate with biased images and how well DebiasedCNN recovers CAM Faithfulness, five simulation studies are conducted with varying datasets, prediction tasks (classification, captioning), bias types (blur, color temperature, lighting), and bias levels. These studies inform which applications explanation biasing is problematic, and show that debiased training can successfully mitigate these deviations. Prediction performance and CAM explanation faithfulness are evaluated to compare between model variants. For classification tasks, the area under the precision-recall curve (PR AUC) is measured as it is robust against imbalanced data, and the class-weighted macro average is calculated to aggregate across multiple classes. For image captioning tasks, the BLEU-4 score that measures how closely 4-grams in the predicted caption and actual captions matched is calculated. For bias level regression, accuracy with $R^2$ is calculated (see FIG. 14). The correctness of CAM explanations is defined by their similarity or faithfulness to the original Unbiased-CAMs from RegularCNN that infers on unbiased data. To better compare CAMs beyond simple residual differences (e.g., MAE, MSE), CAM Faithfulness is calculated as the Pearson's Correlation Coefficient (PCC) of pixel-wise saliency as it closely matches human perception to favor compact locations and match the number of salient locations, and it fairly weights between false positive and false negatives. See paragraph [0124] and FIG. 13 for CAM faithfulness calculated with another saliency metric, Jensen-Shannon Divergence (JSD).

In general, CAMs deviate more from Unbiased-CAMs as bias levels increased, but DebiasedCNN reduces this deviation. Debiased retraining is found to also improve model prediction performance, which suggests that DebiasedCNN indeed "sees through the bias". FIG. 7 shows evaluation of Task Performance and CAM Faithfulness in ablation studies across increasing bias levels for different prediction tasks and datasets (FIG. 11 which shows baseline CNN models trained on training datasets for four Simulation Studies). All models were pre-trained on ImageNet ILSVRC-2012 and retrained to fine-tune on respective datasets. Train-test ratios were determined from the original literature of the models as referenced). FIG. 15 shows in detail these improvements. Particularly, FIG. 15 shows the percent improvement in Task Performance and CAM Faithfulness of CNN models compared to RegularCNN at each bias level. See FIG. 7 for graphical comparison. FIG. 2 shows some examples of deviated and debiased CAMs. FIG. 2 shows deviated and debiased CAM explanations from models trained on different prediction tasks with varying bias levels. FIG. 2a shows RegularCNN and FineTunedCNN generated significantly deviated CAMs unlike DebiasedCNN, where bicycle handlebars became less salient. FIG. 2b shows RegularCNN and FineTunedCNN generated wildly deviated CAMs as blur bias increased, where background people and other areas were highlighted; whereas DebiasedCNN produced less deviated CAMs that still selected the horse and rider. FIG. 2c shows RegularCNN and FineTunedCNN generated CAMs which were more deviated for orange-bias than for blue-bias; whereas DebiasedCNN produced less deviated CAMs, highlighting the kitchen sink. FIG. 2d shows RegularCNN and FineTunedCNN generated CAMs which deviated to not highlight snowy regions on the scene; whereas DebiasedCNN produced less deviated CAMs, still highlighting that region. FIGS. 2a-d show that at no bias, all CAMs from RegularCNN and FineTunedCNN are unbiased.

The experiment method and results for each simulation study are described below.

Figures 11, 12:
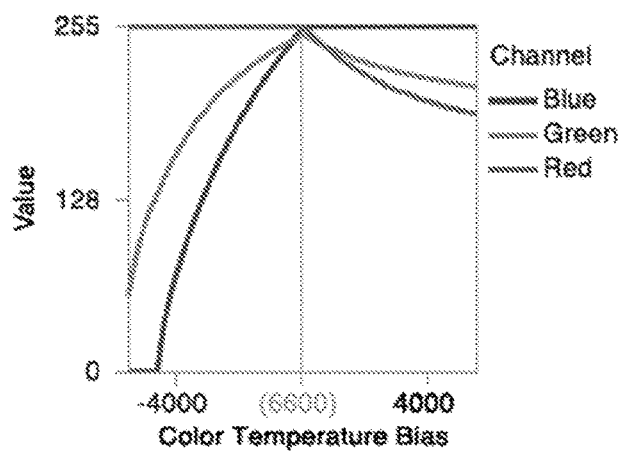
FIG. 11 shows datasets and model implementation details.
FIG. 12 shows color mapping function to bias color temperature of images in Simulation Study 4.
Figure 16:
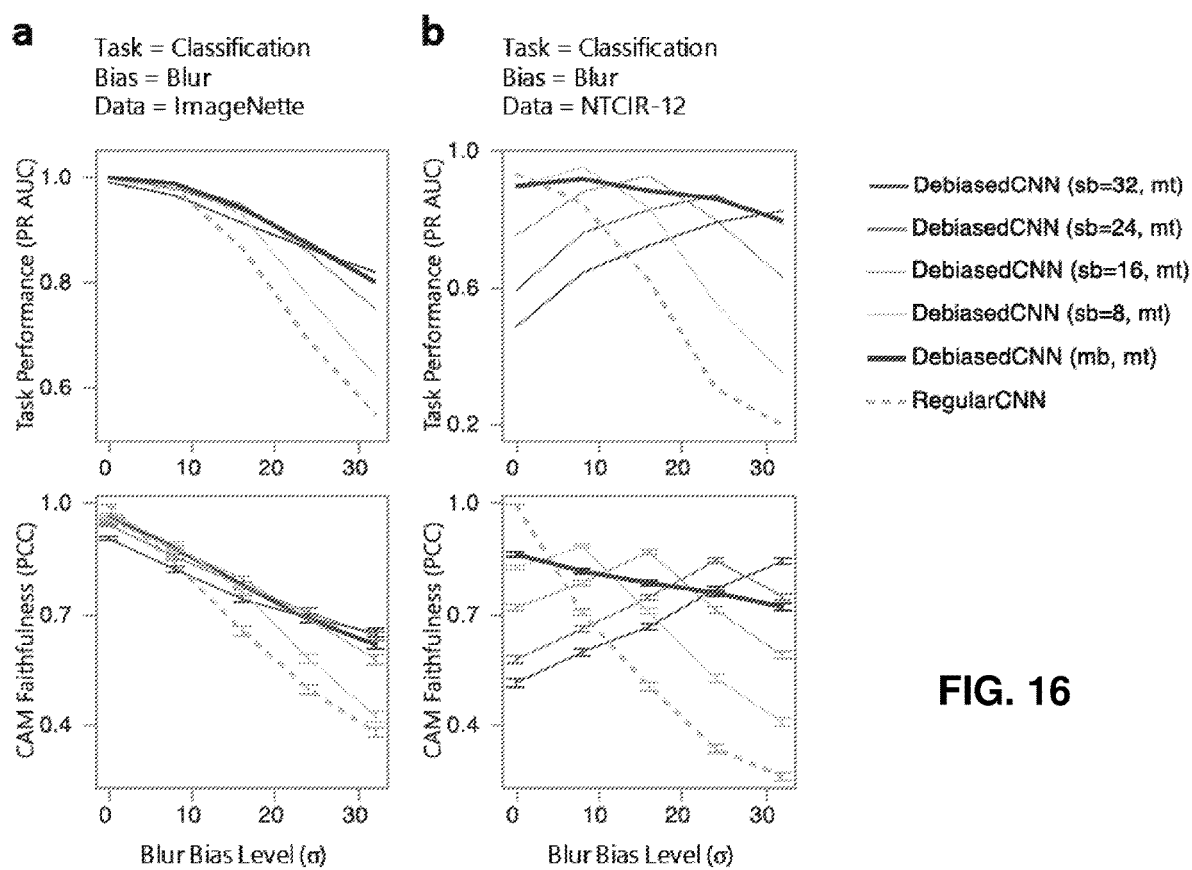
FIG. 16 shows comparison of model Task Performance and CAM Faithfulness for single-bias (sb) and multi-bias (mb) DebiasedCNN variants evaluated across multiple bias levels.
Figure 17:
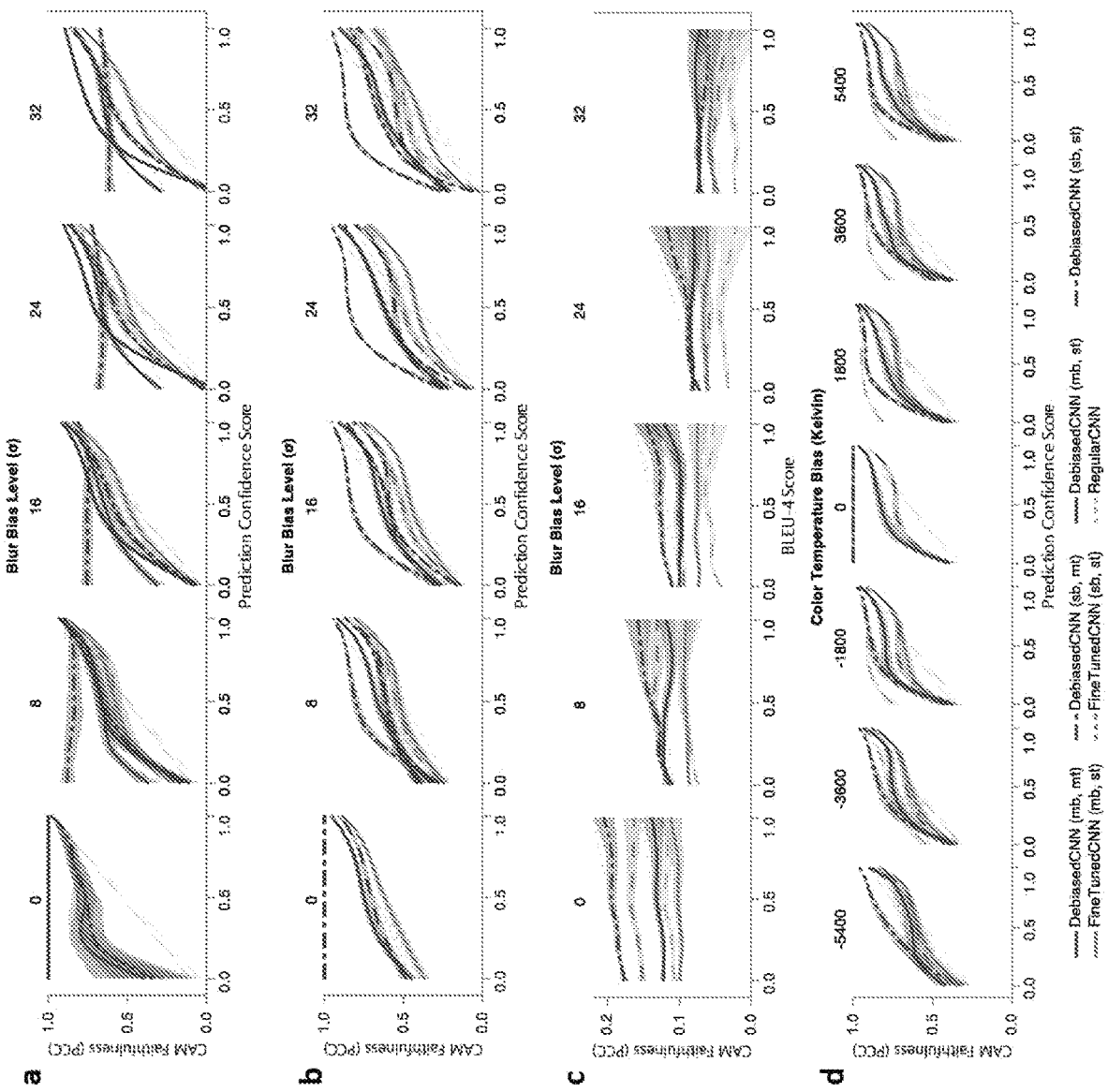
FIG. 17 shows comparison of CAM Faithfulness (PCC) with model Prediction Confidence across the four simulation studies.

In simulation study 1, blur bias is investigated. CAMs are investigated for blur biased images of the object recognition dataset ImageNette (FIG. 11). Images are varied to bias them with three types, blur, color temperature and night vision at different bias levels. Images are blurred by applying a uniform Gaussian blur filter using opencv-python v4.2.0. Images are scaled to a standardized maximum size of 1000×1000 pixels and applied Gaussian blur at various standard deviations σ. Task Performance and CAM Faithfulness are found to decrease with increasing blur level for all CNNs, but DebiasedCNN mitigated these decreases (FIG. 7a). This indicates that model training with additional CAM loss improved model performance rather than trading-off explainability for performance. RegularCNN had the worst Task Performance and the lowest CAM Faithfulness for all blur levels (σ>8). In comparison, trained with differentiable CAM loss, DebiasedCNN (sb, mt) showed marked improvements to both metrics, up to 2.33× and 6.03× over FineTunedCNN's improvements, respectively. Trained with non-differentiable CAM loss, DebiasedCNN (sb, st) improved both metrics to a lesser extent than DebiasedCNN (sb, mt), confirming that separating the CAM task from the classification task in the latter variant enabled better weights update in model training. Trained with an additional bias-level task, multi-bias DebiasedCNN (mb, mt) achieved high Task Performance and CAM Faithfulness for all bias levels that is only marginally lower than single-bias DebiasedCNN (sb, mt), because of the former's good regression performance for bias level prediction (see FIG. 14). Multi-bias DebiasedCNN generalizes across bias levels better than single-bias DebiasedCNN when evaluated at non-specific bias levels (FIG. 16). Finally, all models generated more faithful CAMs when they had a higher Prediction Confidence (FIG. 17).

In simulation study 2, egocentric blur bias is investigated. The impact of blur biasing with a more ecologically valid task—wearable camera activity recognition (NTCIR-12, FIG. 11) is investigated. This task represents a real-world use case where egocentric cameras may capture blurred images accidentally due to motion or defocus, or deliberately for privacy protection. The same trends are found as for the ImageNette classification task with some differences due to the increased task difficulty (FIG. 7b). In particular, the differences between RegularCNN and DebiasedCNN in Task Performance and CAM Faithfulness were amplified, indicating that debiasing is more useful for this application domain. Task Performance and CAM Faithfulness decreased steeply for RegularCNN with increasing blur bias, while DebiasedCNN significantly recovered both metrics, demonstrating marginal decreases with increasing bias. FineTunedCNN marginally increased CAM Faithfulness from RegularCNN (<44%), while DebiasedCNN achieved a much larger improvement by up to 229%. We verified these trends for different base CNN models and found that more accurate models produced more faithful CAMs even for higher blur levels (FIGS. 20a-j). Hence, Debiased-CAM enables privacy-preserving wearable camera activity recognition with improved performance and faithful explanations.

In simulation study 3, blur bias with captioning is investigated. The influence of blur biasing on a different prediction task—image captioning (COCO—FIG. 11) is evaluated. Similar trends in Task Performance and CAM Faithfulness are found as before, though all CNN models performed poorly at all blur levels (FIG. 7c). Furthermore, CAM Faithfulness was low for all models, even for RegularCNN at a very small blur bias ($\sigma=1$). This could be because captioning is much harder than classification, and CAM retraining is weakened by vanishing gradients due to the long LSTM recurrence. Yet, DebiasedCNN improved CAM Faithfulness for all blur levels by up to 224% from RegularCNN.

In simulation study 4, color temperature bias is investigated. The influence of color temperature bias for wearable camera images (NTCIR-12, FIG. 11) is evaluated. This represents another realistic problem for the wearable camera use case, where the white balance may be miscalibrated. The neutral color temperature t is set to 6600K (cloudy/overcast daylight) and the color temperature bias perturbed by applying Charity's color mapping function to map a temperature to RGB values. Color temperature can be bidirectionally biased towards warmer (more orange, lower values) or cooler (more blue, higher values) temperatures from neutral 6600K. Furthermore, image pixel values deviate asymmetrically with larger deviations for orange than for blue biases (details in supplementary material). Consequently, orange bias is found led to a larger decrease in Task Performance and CAM Faithfulness than blue bias (FIG. 7d). More details in paragraph [0122]. Notably, CAM deviation was smaller across all color temperature biases than for blur biases, as indicated by the smaller decrease in CAM Faithfulness (compare FIG. 7b, d); hence, Task Performance also did not decrease as much as blur bias. FineTunedCNN had similar Task Performance but lower CAM Faithfulness than RegularCNN; this suggests that color-biased images were too similar to improve model training with classification fine-tuning, and yet this significantly degraded explanation quality. In contrast, DebiasedCNN improved Task Performance and CAM Faithfulness compared to RegularCNN. Furthermore, due to bidirectional bias, multi-bias training enabled DebiasedCNN (mb, mt) to have significantly higher Task Performance even for unbiased images ($\Delta T=0$).

In simulation study 5, lighting bias is investigated. The influence of lighting bias for outdoor scenes is evaluated for a multi-label scene attribute recognition task (transient attribute database). Outdoor scenes regularly change across hours or seasons due to transient attributes, such as sunlight or weather changes. Hence, models trained on images captured in one lighting condition may predict and explain differently under other conditions. Specifically, for the multi-label prediction task of classifying whether a scene is Snowy, Sunny, Foggy, or Dawn/Dusk, we biased whether the scene was daytime or nighttime. We performed a pixelwise interpolation with ratio ρ to simulate interstitial periods between day and night (details in paragraphs [0123]). This represents a realistic circumstance that scenes change dramatically by hours and seasons, and this can influence the model behavior. Similar trends are found in Task Performance and CAM Faithfulness as with previous blur-biased classification tasks. The image prediction training was biased towards day-time photos, and as photos became darker to represent dusk or night time, all models generated more deviated, but least so for DebiasedCNN. Given the regularity that scenes change attributes, this study demonstrates the prevalence of biasing in model predictions and explanations and emphasizes the need and benefits of Debiased-CAMs.

Having found that DebiasedCNN improves CAM faithfulness, evaluation of how well Debiased-CAM improves human interpretability as compared to Biased-CAM is conducted. User studies are conducted to evaluate the perceived truthfulness of CAMs (User Study 1) and their helpfulness (User Study 2) in an AI verification task for a hypothetical smart camera with privacy blur filters, activity label prediction, and CAM explanations, i.e., the Simulation Study 1 prediction task. The experiment design had two independent variables—Blur Bias level (None $\sigma=0$, Weak $\sigma=16$, Strong $\sigma=32$) and CAM type (Unbiased-CAM, Debiased-CAM, and Biased-CAM). Unbiased-CAM refers to the CAM from RegularCNN predicting on the unbiased image regardless of blur bias level; Debiased-CAM refers to the CAM from DebiasedCNN (mb, mt) and Biased-CAM refers to the CAM from RegularCNN predicting on the unbiased image at corresponding Blur Bias levels. At the None blur level, Biased-CAM is identical to Unbiased-CAM.

Figure 9:
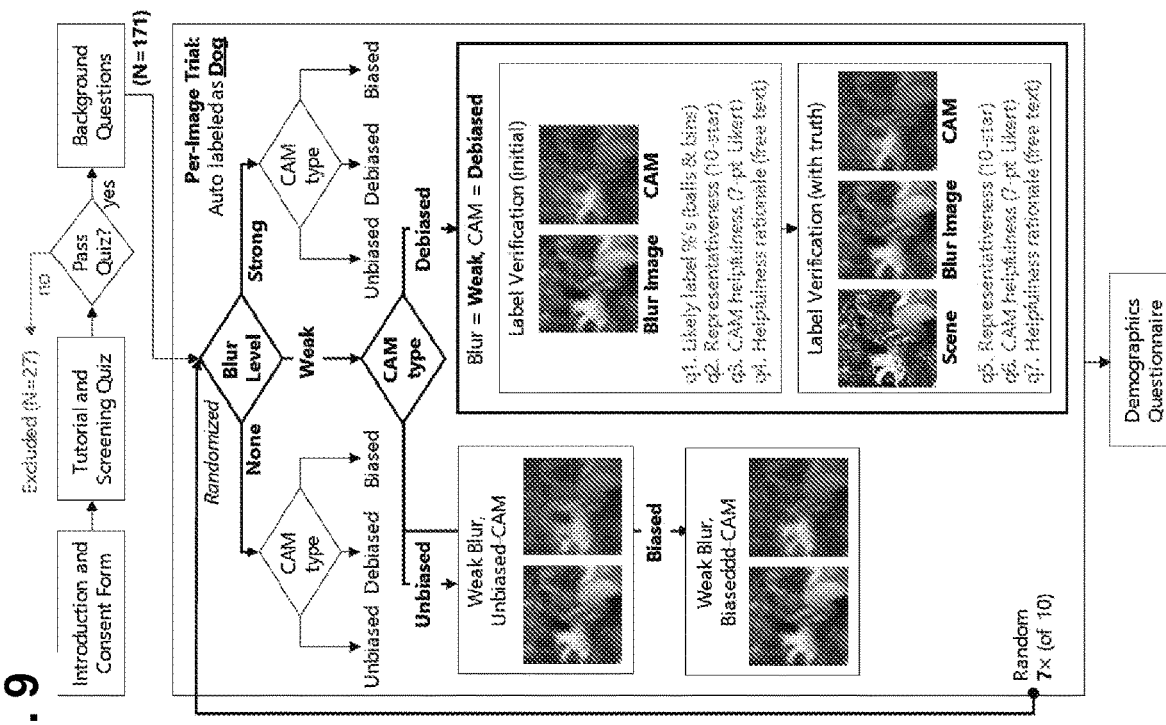
FIGS. 8 and 9 show experiment procedures for user studies.
Figure 8:
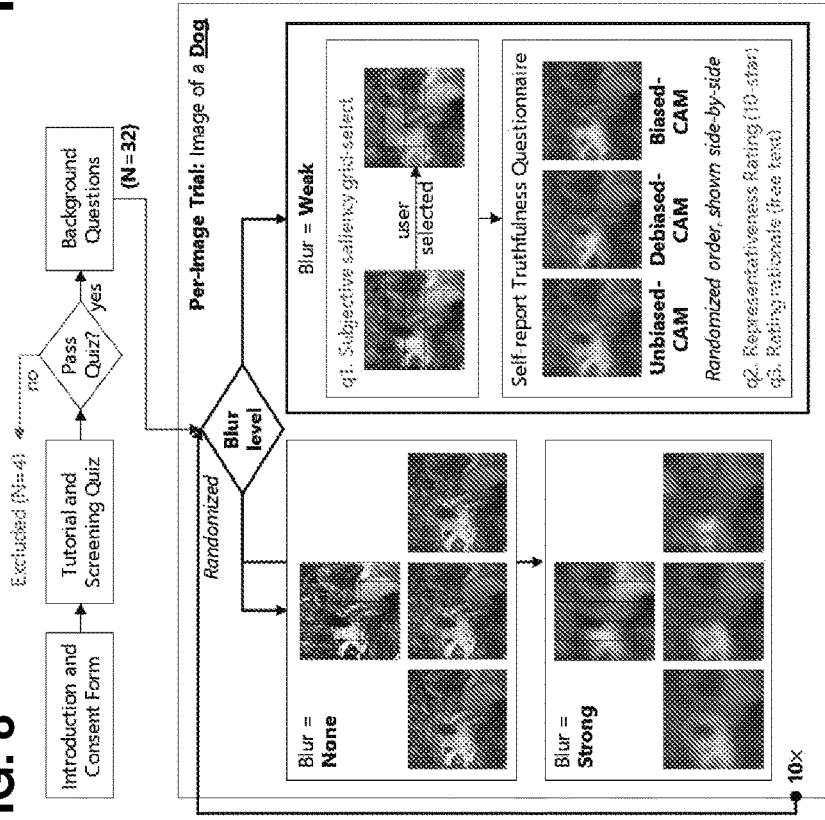

FIGS. 8 and 9 show experiment procedures for User Studies. FIG. 8 shows user study 1 procedure, which has a brief tutorial, screening quiz, main study, and background questions. The main study contains 10 image trials with Blur Bias level within-subjects, randomly assigned per trial, and all 3 CAM types shown side-by-side. Text in blue represent measures from survey questions (q1-3). FIG. 9 shows user study 2 procedure, which is similar to User Study 1 but with different main study experiment design. The main study contains 7 trials with both independent variables Blur Bias level and CAM type within-subjects with random assignment per trial; only one CAM is shown at a time.

User Study 1 (CAM Truthfulness)

User study 1 is discussed. Participants followed the experiment procedure (illustrated in FIG. 8): read an introduction of the study and task, and gave consent; studied a one-page tutorial about automatic image labeling, privacy blurring, heatmap explanations, and how to interpret the survey questions; answered four questions in a screening quiz to test their labeling of an unblurred and a weakly blurred image and their selection of important locations in an image and a CAM (FIG. 22); if screening was passed, answered background questions on technology and image comprehension savviness (FIG. 23), performed the main study with 10 trials (FIG. 24); and ended with demographic questions on gender, age, educational background, and occupation.

In the main study, each participant viewed 10 repeated image trials, where each trial was randomly assigned to one of 3 Blur Bias levels (None, Weak, Strong) in a within-subjects experiment design. All participants viewed the same 10 images (selection criteria described in paragraph [0129]), which were randomly ordered. For each trial, the participant: viewed a labeled unblurred image, indicated the most important locations on the image regarding the label with a "grid selection" UI (q1, FIG. 24a); and in the next page (FIG. 24b), viewed the image blurred by the smart camera, viewed all 3 CAM types generated from the blurred image and randomly-arranged side-by-side, rated on a 10-star scale how well each CAM represented the image label (q2), and wrote the rationale for her rating (q3).

Figure 10:
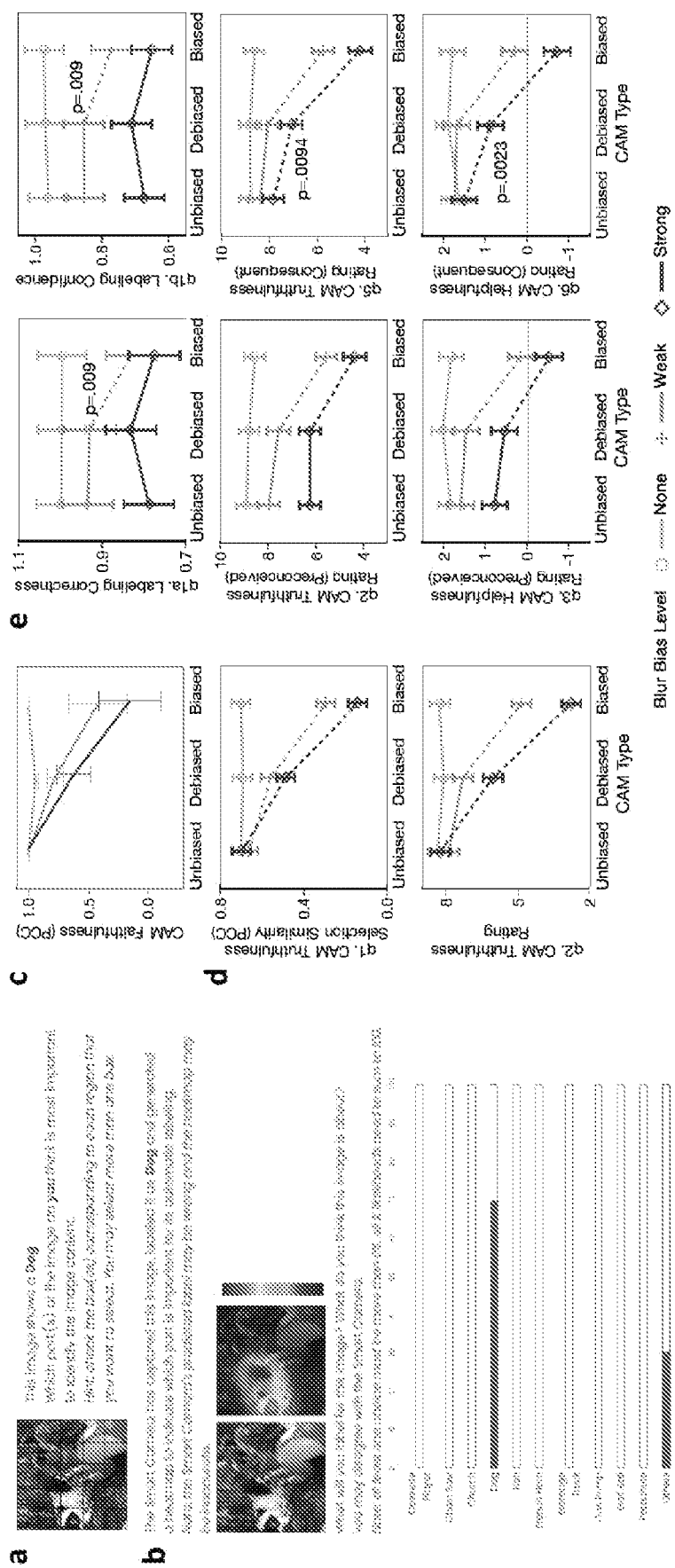
FIGS. 10a and 10b show interface displayed in user studies.
FIG. 10c show distribution of computed CAM Faithfulness (PCC) for different CAM type and Blur Bias levels.
FIGS. 10d-e show results of the statistical analyses from user studies.

Experiment apparatus is discussed. Objective measures of human perception and opinion, where appropriate, is used to mitigate poor estimation of perceptions. Specifically, a "grid selection" user interface (UI) is used to measure objective truthfulness (FIG. 10a), and, in User Study 2 (described later), the "balls and bins" question to elicit user labeling (FIG. 10b). The grid selection UI overlays a clickable grid over the image for participants to select which grid cells are most important regarding the label. For usability, the grid is limited to 5×5 cells that can be selected or unselected (binary values). In the surveys, CAMs are referred to as "heatmaps", which is a more familiar term. User-CAM is defined as the participant's grid selection response, and CAM as the heatmap shown. To compare User-CAM with CAM, CAM is aggregated by averaging the pixel saliency in each cell and calculated CAM Truthfulness Selection Similarity as the Pearson's Correlation Coefficient (PCC) between User-CAM and CAM. The CAM Truthfulness Rating is measured as a subjective, self-reported opinion as a survey question on a uni-polar 10-point star rating scale (1 to 10). The rationale of ratings is collected as open-ended text.

Statistical analysis and quantitative results is discussed. For all response (dependent) variables, a multivariate linear mixed effects model is fitted with Blur Bias Level, CAM Types, and Trial Number sequence as fixed effects, Blur Bias Level×CAM Type as a fixed interaction effect, and Participant as a random effect. FIG. 26a reports the model fit ($R^2$) and significance of ANOVA tests for each fixed effect. Due to a large number of comparisons in our analysis, differences with p<0.001 are considered as significant. This is sufficiently strict for a Bonferroni correction for 50 comparisons (significance level=0.05/50). Furthermore, all results reported were significant at p<0.0001, unless otherwise stated. Post-hoc contrast tests are performed for specific differences described (dotted lines in FIGS. 10d and 10e). All statistical analyses were performed using JMP (v14.1.0).

FIG. 10d shows results of the statistical analyses on 320 trials from 32 participants recruited from Amazon Mechanical Turk (recruitment details in paragraph [0135]) with significant findings at p<0.0001. The distribution of computed CAM Faithfulness (PCC) for different CAM type and Blur Bias levels (FIG. 10c) guided the hypotheses for the results. Unbiased-CAM had the highest CAM Truthfulness Selection Similarity, while Biased-CAM with the most deviation had the lowest CAM Truthfulness Selection Similarity that was only 20.3-44.4% of the truthfulness of Unbiased-CAM. Debiased-CAM had significantly higher CAM Truthfulness Selection Similarity than Biased-CAM at 69.7-84.2% of the truthfulness of Unbiased-CAM. Similarly, for blurred images, participants rated Unbiased-CAM as the most truthful (M=8.17 out of 10), followed by Debiased-CAM (M=6.07 to 7.32), and Biased-CAM as the least truthful (M=2.80 to 4.89). In summary, Debiased-CAM improved CAM truthfulness, despite stronger blur that reduced CAM truthfulness by highlighting wrong or unexpected regions, sizes, and shapes.

Thematic analysis and qualitative findings is discussed. The written rationale of participant ratings is analyzed to better understand how participants interpreted different CAMs as truthful or untruthful, and what visual features they perceived in images and CAMs. A thematic analysis with open coding is performed to identify several themes in what was written. Two authors independently coded the rationales and discussed the coding until themes converged. Next, rationales mentioned for different blur levels are first described, then the themes that spanned across all blur levels are described. Note that all CAM types were shown randomly ordered and given anonymous labels A, B, and C; quoted specifically by type for clarity.

For None blur without image bias, as expected, most participants perceived CAMs as identical, e.g., "all 3 images are the same and mostly representative" (Participant P23, "Fish" image); though some participants could perceive the slight decrease in the CAM truthfulness of Debiased-CAM, e.g., for the "Church" image, P1 wrote that Unbiased-CAM and Biased-CAM "had the most focus on *all* the crosses on the roof of the church and therefore I thought they were the most representative. [Debiased-CAM] gives less importance to the leftmost cross on the roof and therefore was rated lower." For Weak blur, participants felt Unbiased-CAM and Debiased-CAM were very truthful, with Debiased-CAM as slightly less truthful, and Biased-CAM as untruthful; e.g., P29 felt that Biased-CAM "doesn't show anything but blackness, [other CAMs] are much better in the way the heatmap shows details." For Strong blur, participants perceived Debiased-CAM as moderately truthful, but Biased-CAM as very untruthful, e.g., P18 felt that "[Biased-CAM] is totally off, nothing there is a garbage truck. [Unbiased-CAM] shows the best and biggest area, and [Debiased-CAM] is good too but I'm thinking not good enough as [Unbiased-CAM]."

Across blur conditions, participants are found to interpret whether a CAM was truthful based on several criteria—primary object, object parts, irrelevant object, coverage span, and shape. Participants checked whether the primary object in the label was highlighted (e.g., "That heatmap that focuses on the chainsaw itself is the most representative." P20, Chain Saw), and also checked whether specific parts of the primary object were included in the highlights (e.g., "[Unbiased-CAM and Debiased-CAM] correctly identify the fish though [Unbiased-CAM] also gives importance to the fish's rear fin." P1, Fish, Weak blur). P15 noted differences between the CAMs for the "French Horn" image: "[Unbiased-CAM] places the emphasis over the unique body of the French horn, and it places more well-defined, yellow and green emphasis on the mouthpiece and the opening of the horn itself. [Biased-CAM] is too vertical to completely capture the whole horn, and [Debiased-CAM]'s red area is too small to capture the body of the horn, and does not capture the opening of the horn or the mouthpiece." Participants rated a CAM as less truthful if it highlighted irrelevant objects, e.g., "[Debiased-CAM] is quite close to capturing the entire church. (But) [Unbiased-CAM] captures more of the tree." (P26, Church). Much discussion also focused on the coverage of salient pixels. Less truthful CAMs had coverages that were either too wide (e.g., "[Debiased and Biased CAMs] are inaccurate. They are too wide." P22, Garbage Truck), covering the background or other objects to get "less representative when it misleads you into the background or surroundings of the focus. It needs to only emphasize the critical area." (P23, Church); or too narrow, not covering enough of the key object such that it "is very small and does not highlight the important part of the image. It is too narrow." (P30, Fish). Finally, participants appreciated CAMs that highlighted the correct shape of the primary object, e.g., "[Debiased-CAM] perfectly captures the shape of the ball and all of its quadrants. [Unbiased-CAM] is a little more oblong than the golf ball itself, so it's not as perfect. [Biased-CAM] is almost a vertical red spot and does not really capture the shape of the golf ball at all." (P15, Golf Ball).

In summary, these findings explain that Debiased-CAM and Unbiased-CAM were perceived as truthful, because they: 1) highlighted semantically relevant targets while avoiding irrelevant ones, so concept or object-aware CNN models are important; 2) had salient regions that were neither too wide nor narrow for the image domain; and 3) had accurate shape and edge boundaries for salient regions, which can be obtained from gradient explanations.

User Study 2 (CAM Helpfulness)

User study 2 is discussed. Having shown that Debiased-CAM was perceived as more truthful than Biased-CAM, it is investigated how helpful Debiased-CAM was to verify predictions of blur biased images. Participants are recruited to view one of 3 CAM types of images at 3 blur levels in a 3×3 factorial within-subjects experiment.

Procedure of user study 2 is discussed. In user study 2, to carefully investigate the helpfulness of CAMs on blurred images, the survey of User Study 1 is modified to change the sequence of the information shown to participants. User Study 1 focused on CAM Truthfulness to obtain the participant's saliency annotation of the unblurred image before priming the participant by showing CAMs. In User Study 2, showing the unblurred image first will invalidate the use case of verifying predictions on blurred images, since the participant would have foreknowledge of the image. Hence, participants needed to see the blurred image and model prediction first, answer questions about their perceptions, then see the actual, unblurred image. FIG. 9 illustrates the experiment procedure of User Study 2. Participants began with the same procedure as User Study 1, including the same introduction, tutorial, screening quiz, and background and demographics questions, but experienced a different main study section.

Figures 25A, 25B:
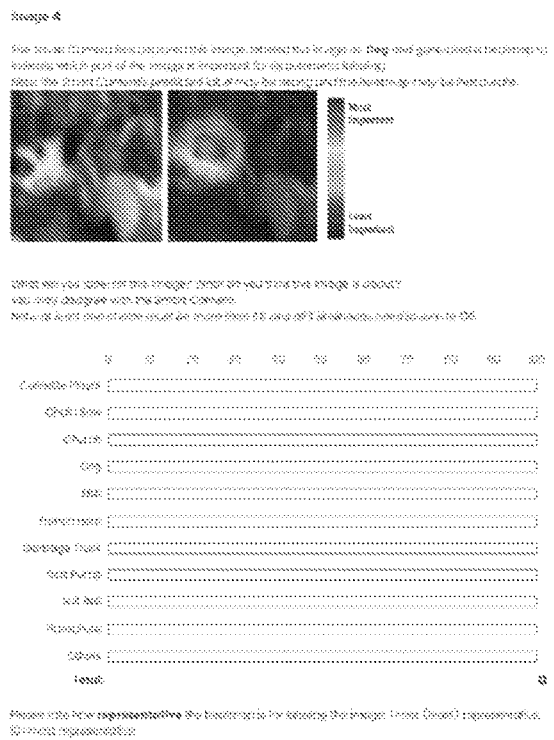
Figure 27:
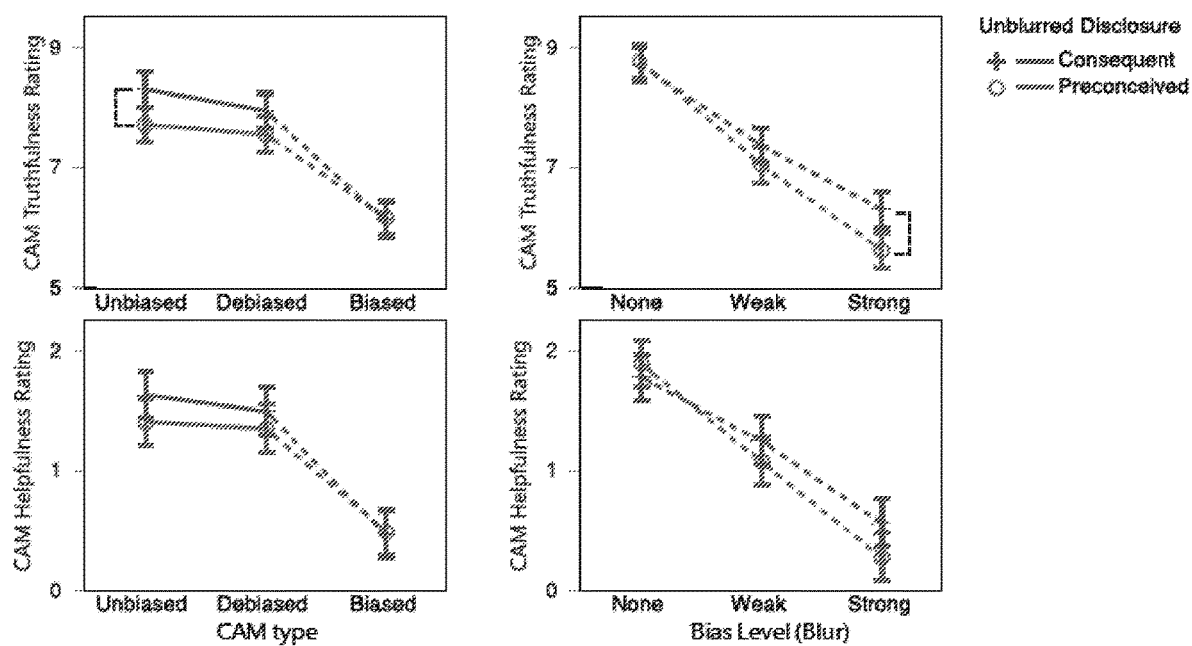
FIG. 27 shows comparisons of perceived CAM Truthfulness and CAM Helpfulness before (preconceived) and after (consequent) disclosing the unblurred image.
Figure 28:
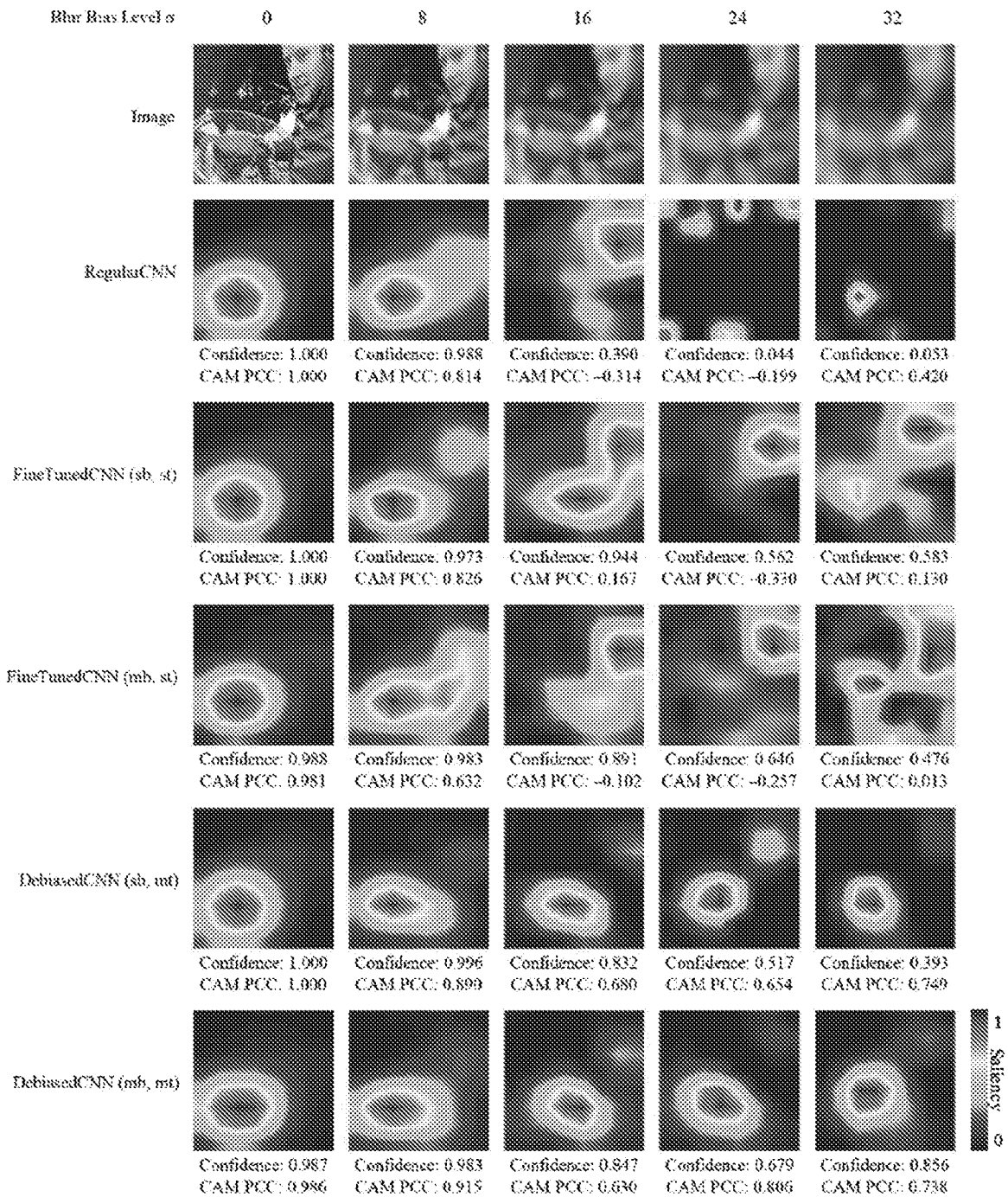
FIG. 28 shows a representative image from ImageNette labeled "Fish" with corresponding CAMs generated by different ablated CNN models under various blur bias levels.
Figure 29:
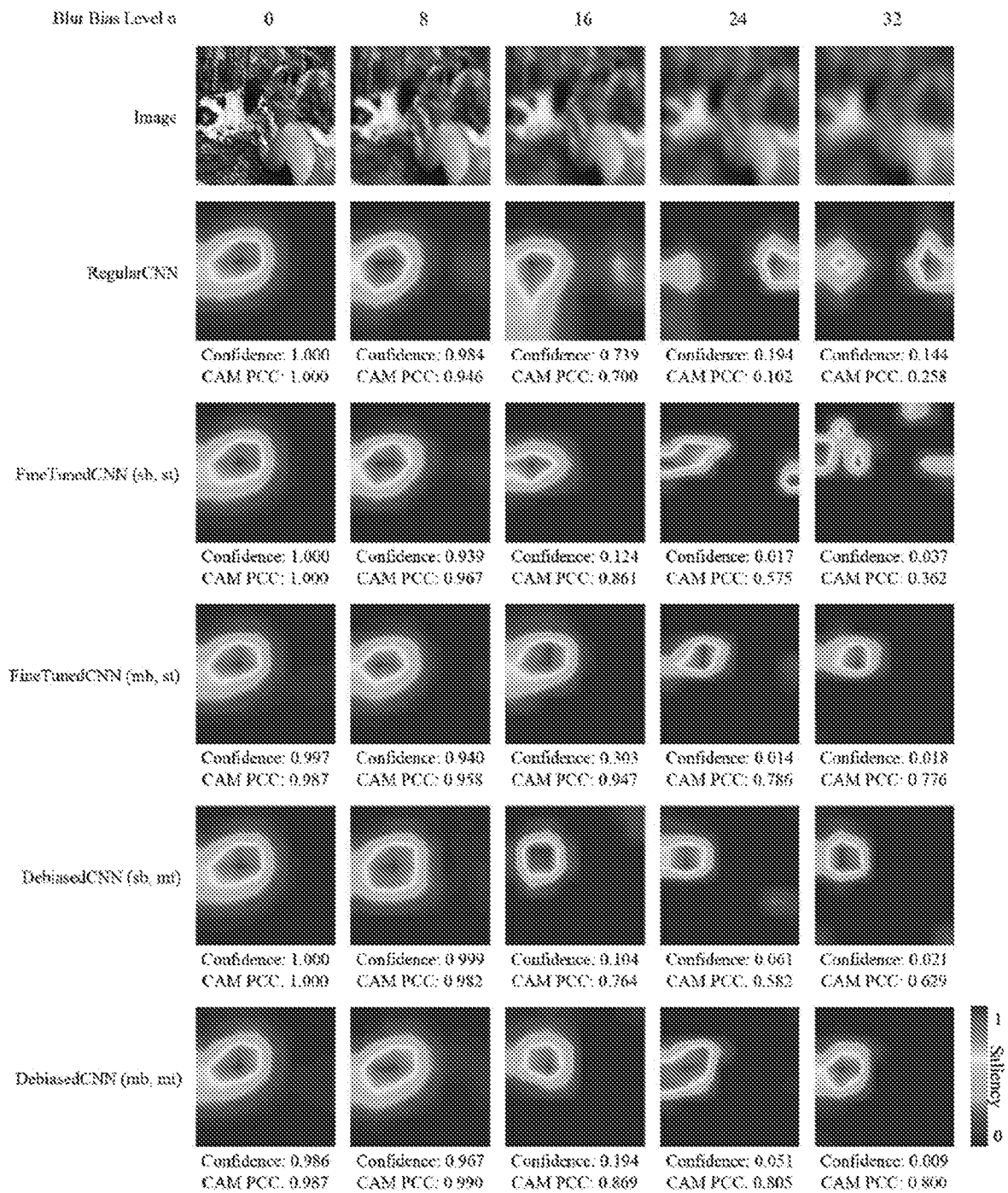
FIG. 29 shows a representative image from ImageNette labeled "Dog" with corresponding CAMs generated by different ablated CNN models under various blur bias levels.
Figure 30:
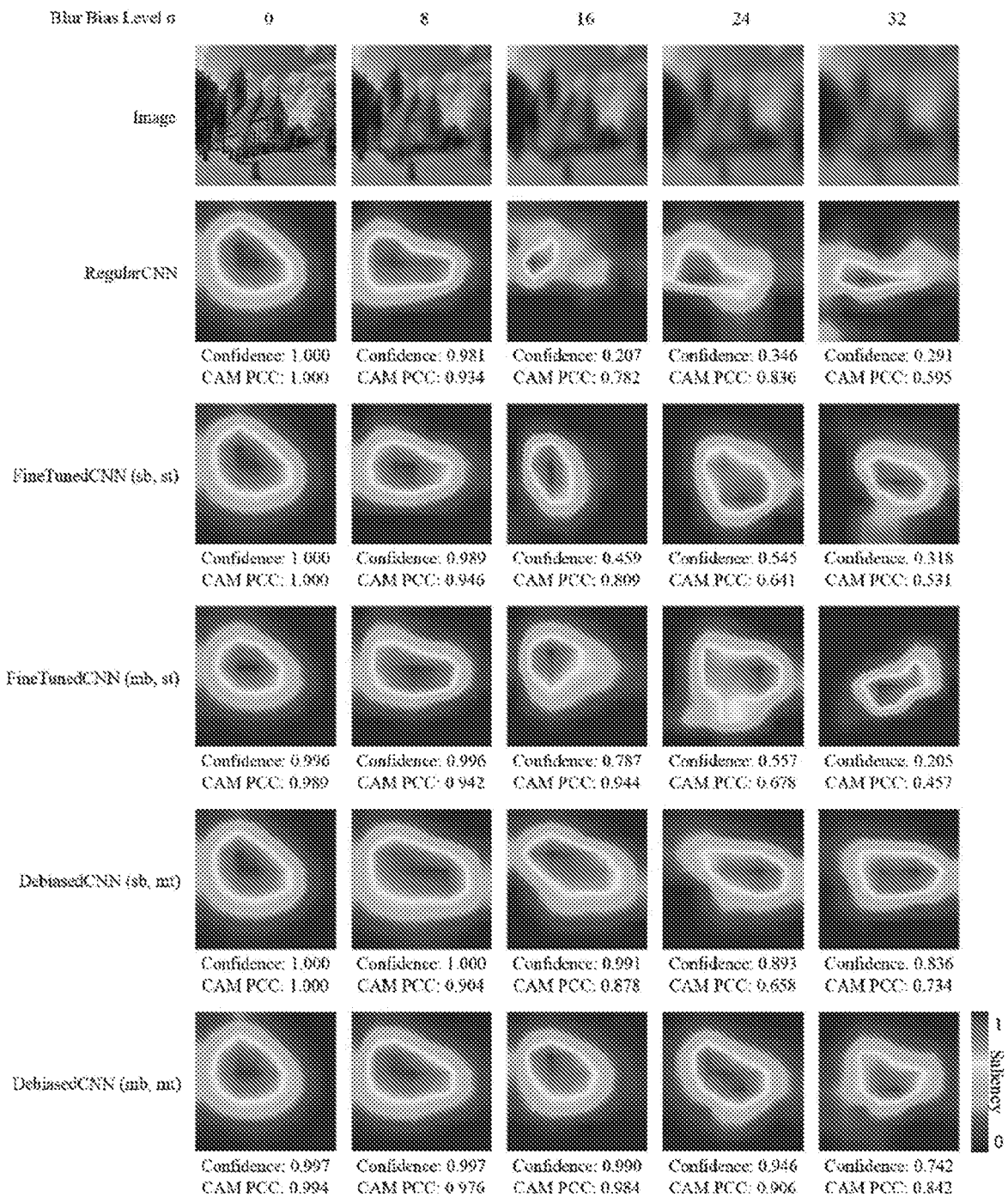
FIG. 30 shows a representative image from ImageNette labeled "Church" with corresponding CAMs generated by different ablated CNN models under various blur bias levels.
Figure 31:
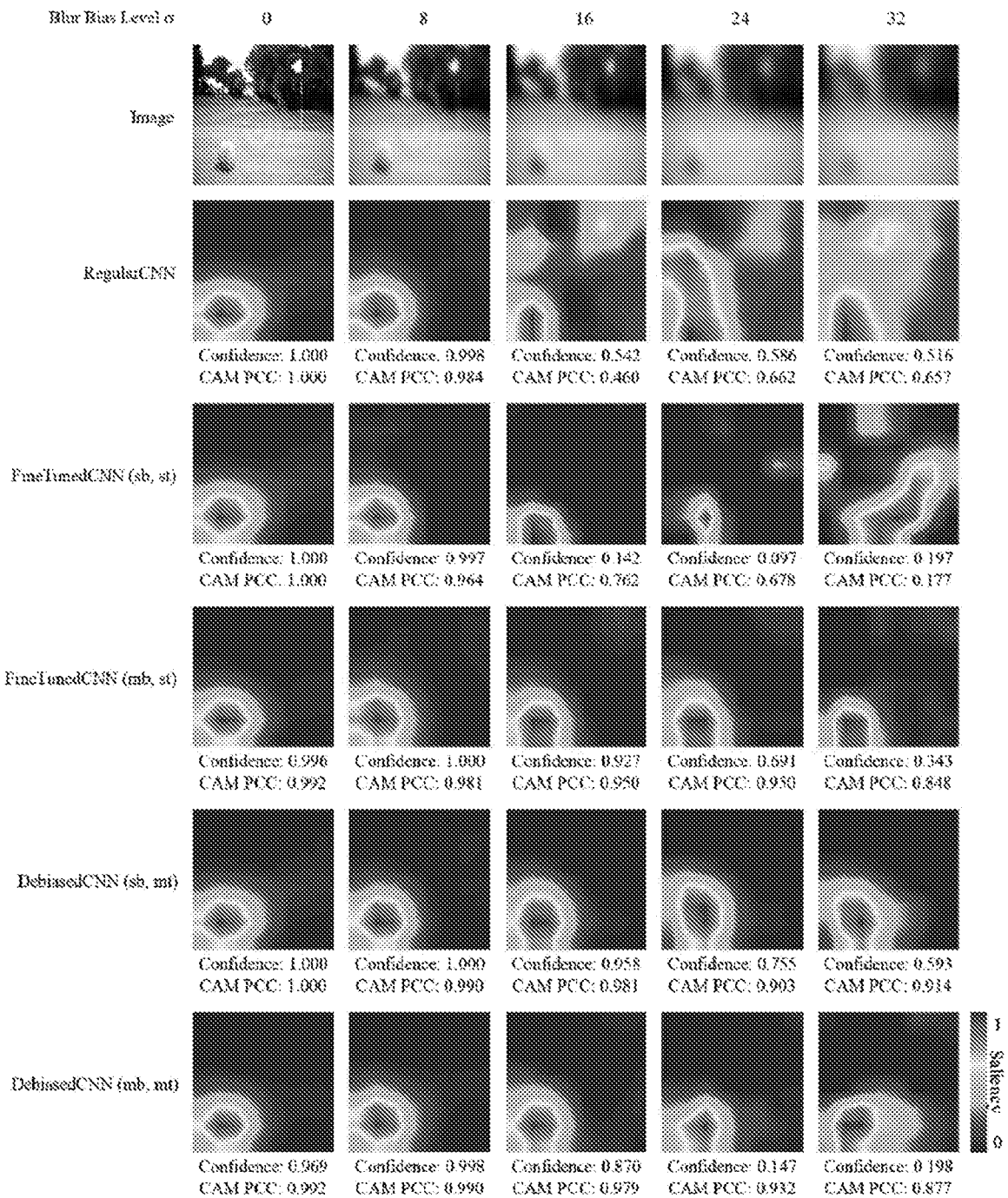
FIG. 31 shows a representative image from ImageNette labeled "Golf Ball" with corresponding CAMs generated by different ablated CNN models under various blur bias levels.
Figure 32:
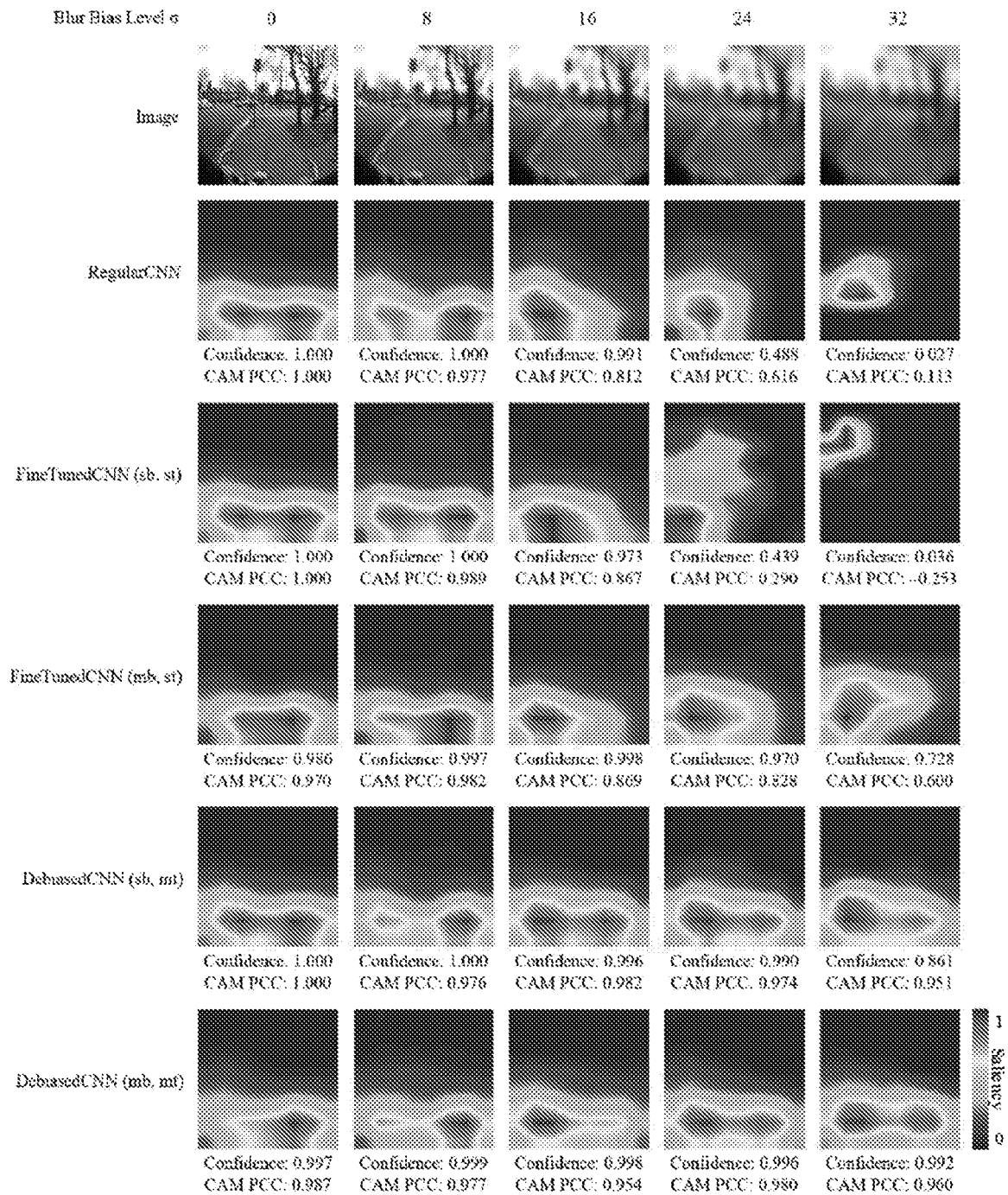
FIG. 32 shows a representative image from NTCIR-12 labeled "Biking" with corresponding CAMs generated by different ablated CNN models under various blur bias levels.
Figure 33:
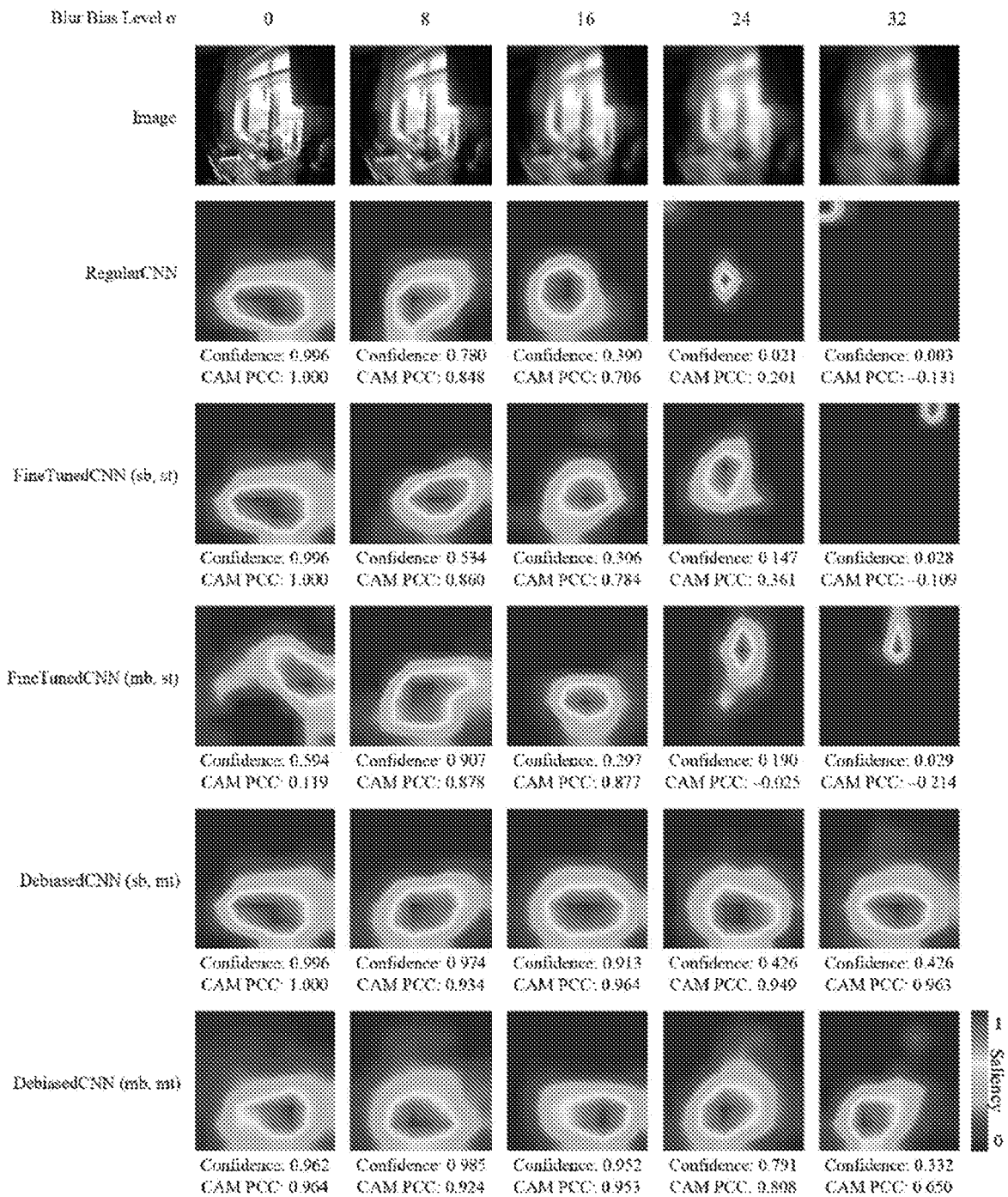
FIG. 33 shows a representative image from NTCIR-12 labeled "Cleaning and Chores" with corresponding CAMs generated by different ablated CNN models under various blur bias levels.
Figure 34:
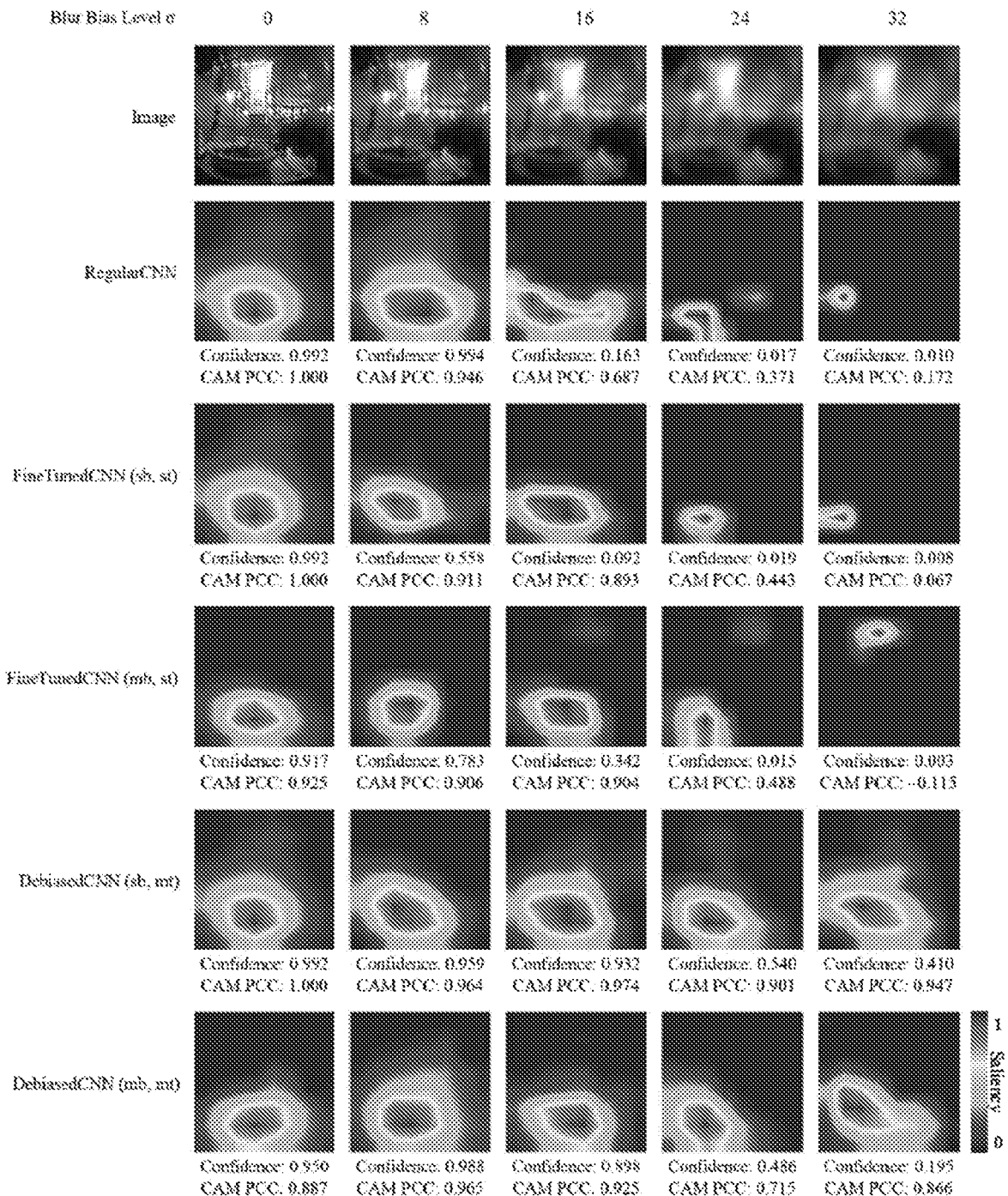
FIG. 34 shows a representative image from NTCIR-12 labeled "Drinking or Eating Alone" with corresponding CAMs generated by different ablated CNN models under various blur bias levels.
Figure 35:
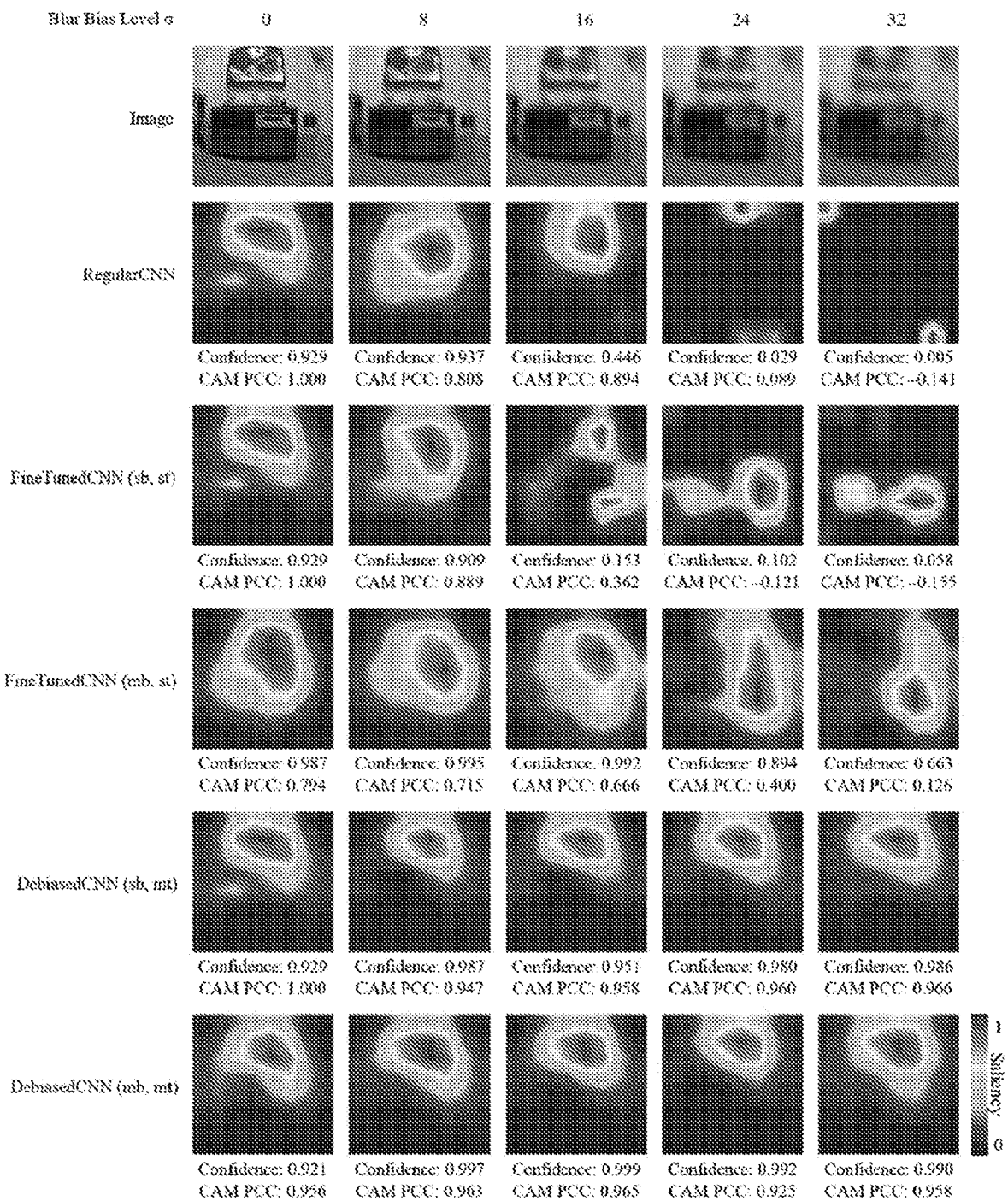
FIG. 35 shows a representative image from NTCIR-12 labeled "Watching TV" with corresponding CAMs generated by different ablated CNN models under various blur bias levels.
Figure 36:
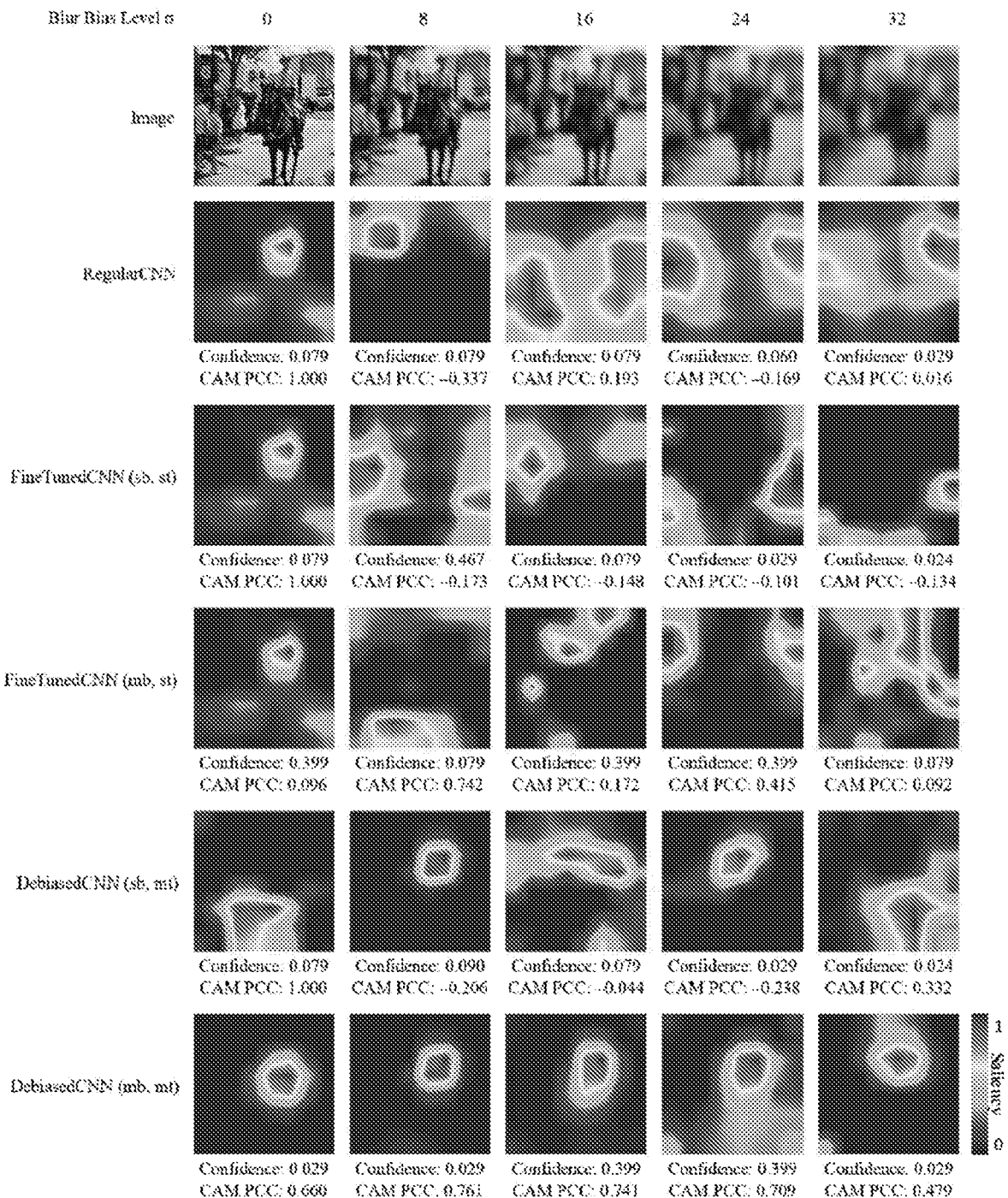
FIG. 36 shows a representative image from COCO captioned "a man on a horse on a street near people walking" with corresponding CAMs generated by different ablated CNN models under various blur bias levels.
Figure 37:
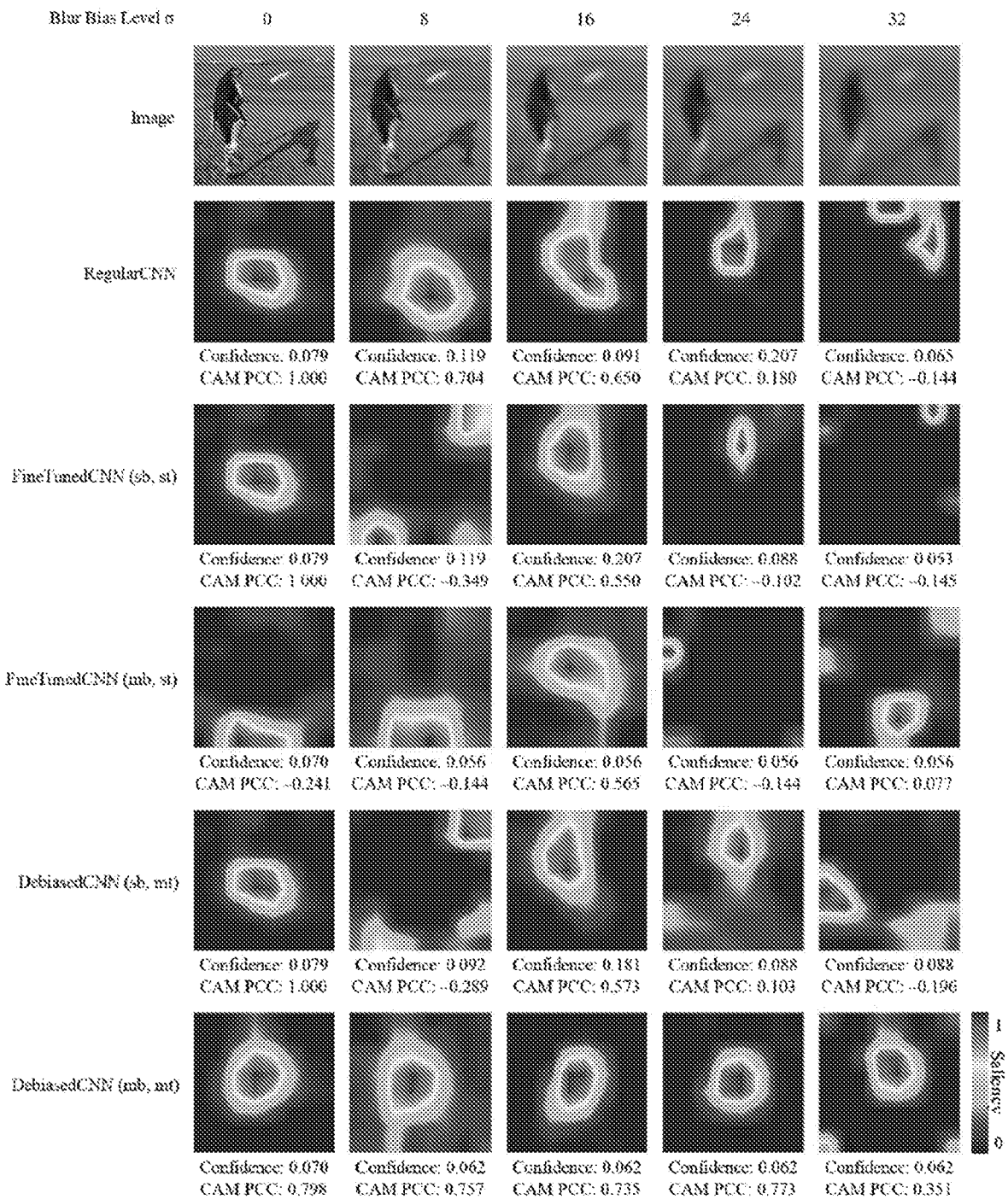
FIG. 37 shows a representative image from COCO captioned "a person throwing a frisbee on the sand of a beach" with corresponding CAMs generated by different ablated CNN models under various blur bias levels.
Figure 38:
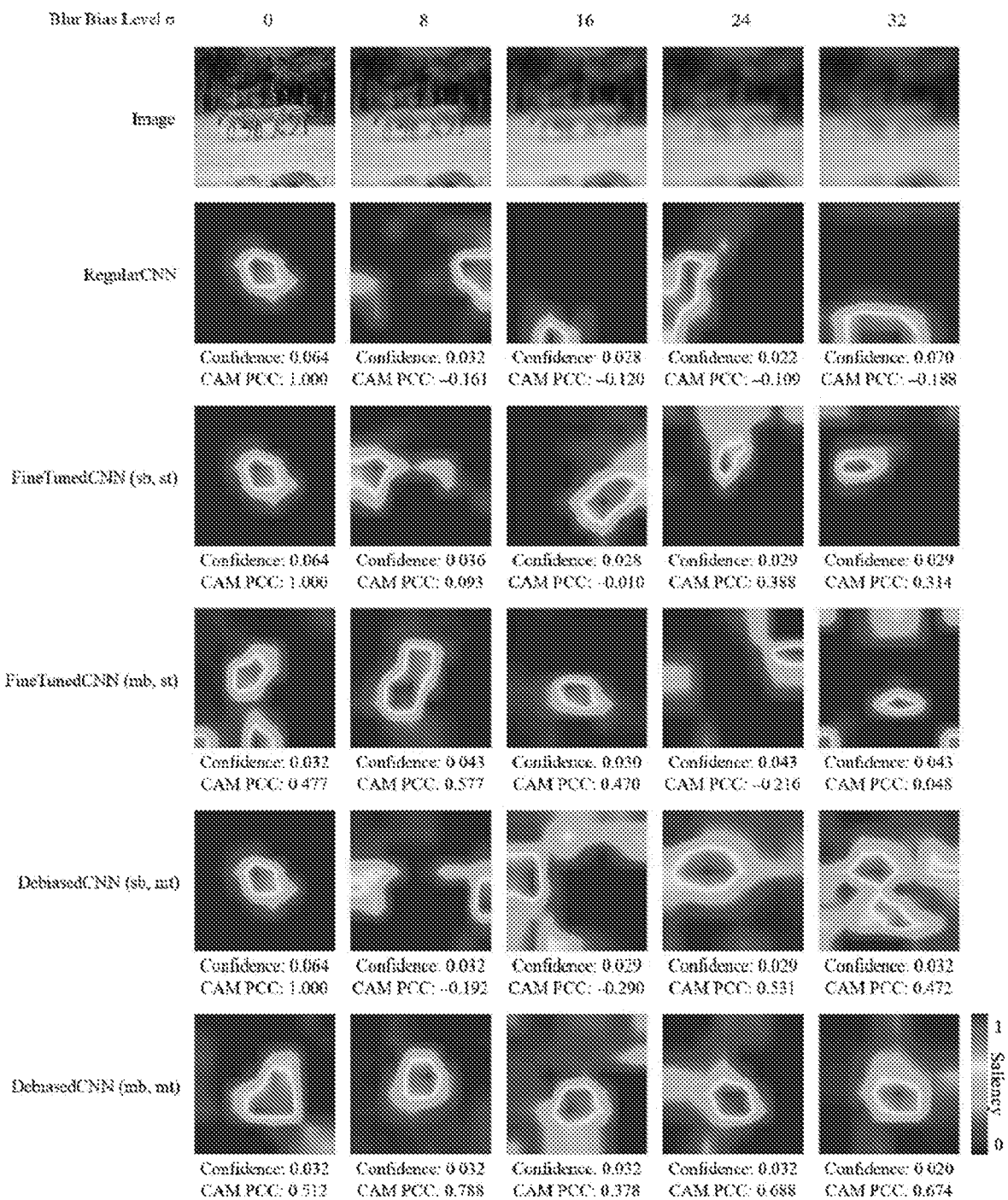
FIG. 38 shows a representative image from COCO captioned "three zebras walking in a dusty field of dirt" with corresponding CAMs generated by different ablated CNN models under various blur bias levels.
Figure 39:
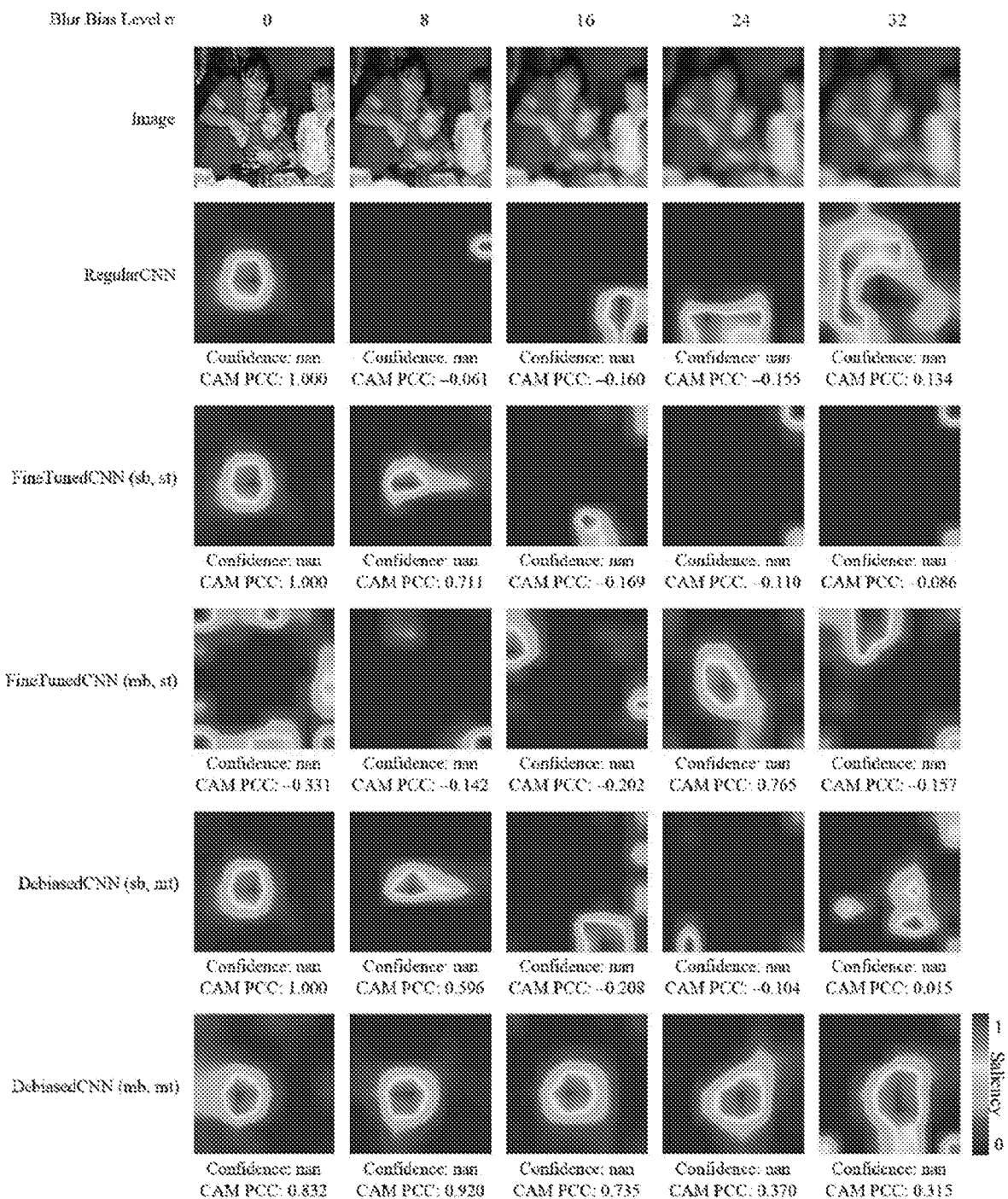
FIG. 39 shows a representative image from COCO captioned "a lady holding a child's hand cutting a cake while she also holds the child with a pacifier in his mouth" with corresponding CAMs generated by different ablated CNN models under various blur bias levels.
Figure 40:
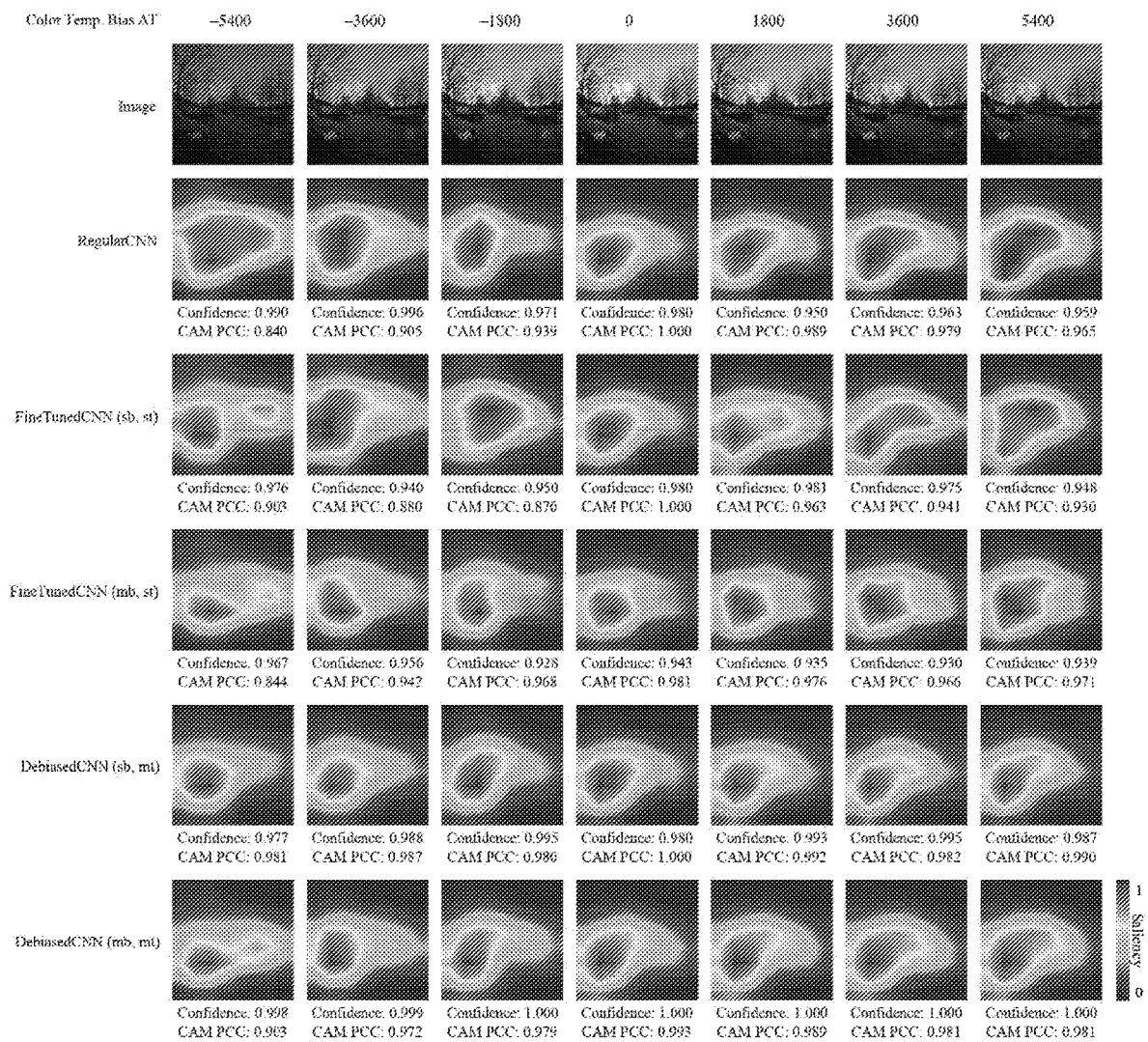
FIG. 40 shows a representative image from NTCIR-12 labeled "Walking Outdoor" with corresponding CAMs generated by different ablated CNN models under various color temperature bias levels.
Figure 41:
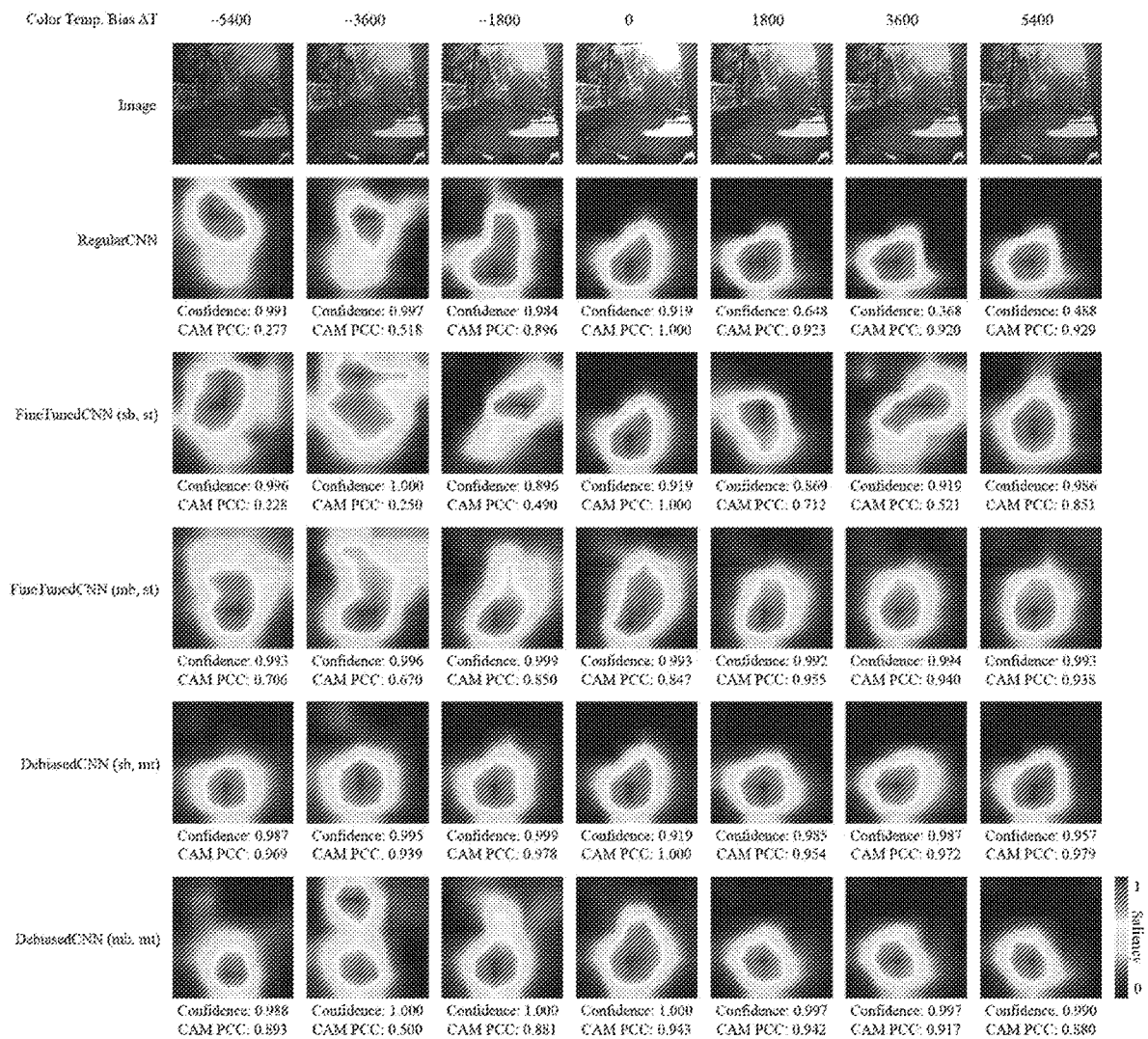
FIG. 41 shows a representative image from NTCIR-12 labeled "Drinking with Others" with corresponding CAMs generated by different ablated CNN models under various color temperature bias levels.
Figure 42:
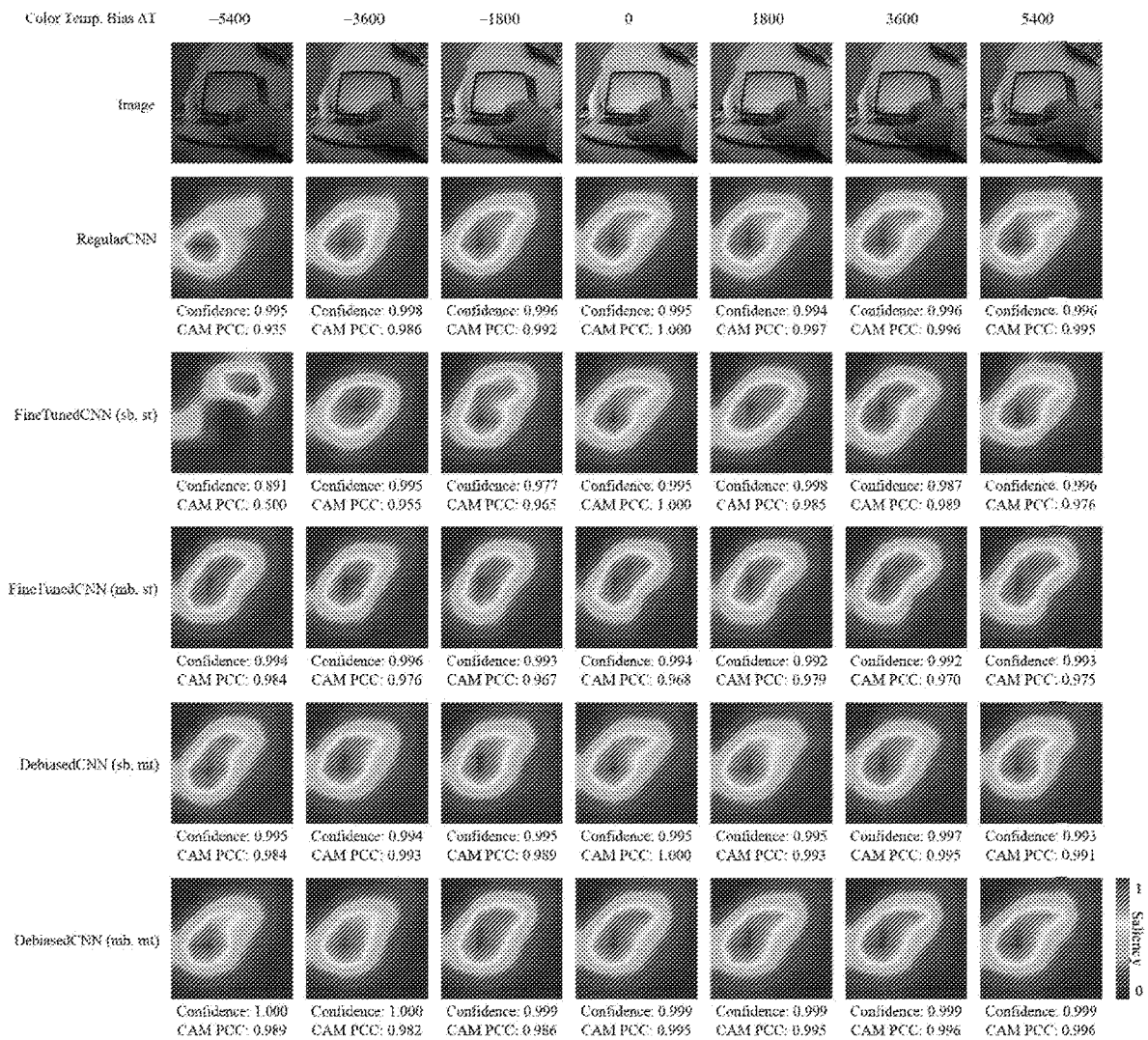
FIG. 42 shows a representative image from NTCIR-12 labeled "Working on Computer" with corresponding CAMs generated by different ablated CNN models under various color temperature bias levels.
Figure 43:
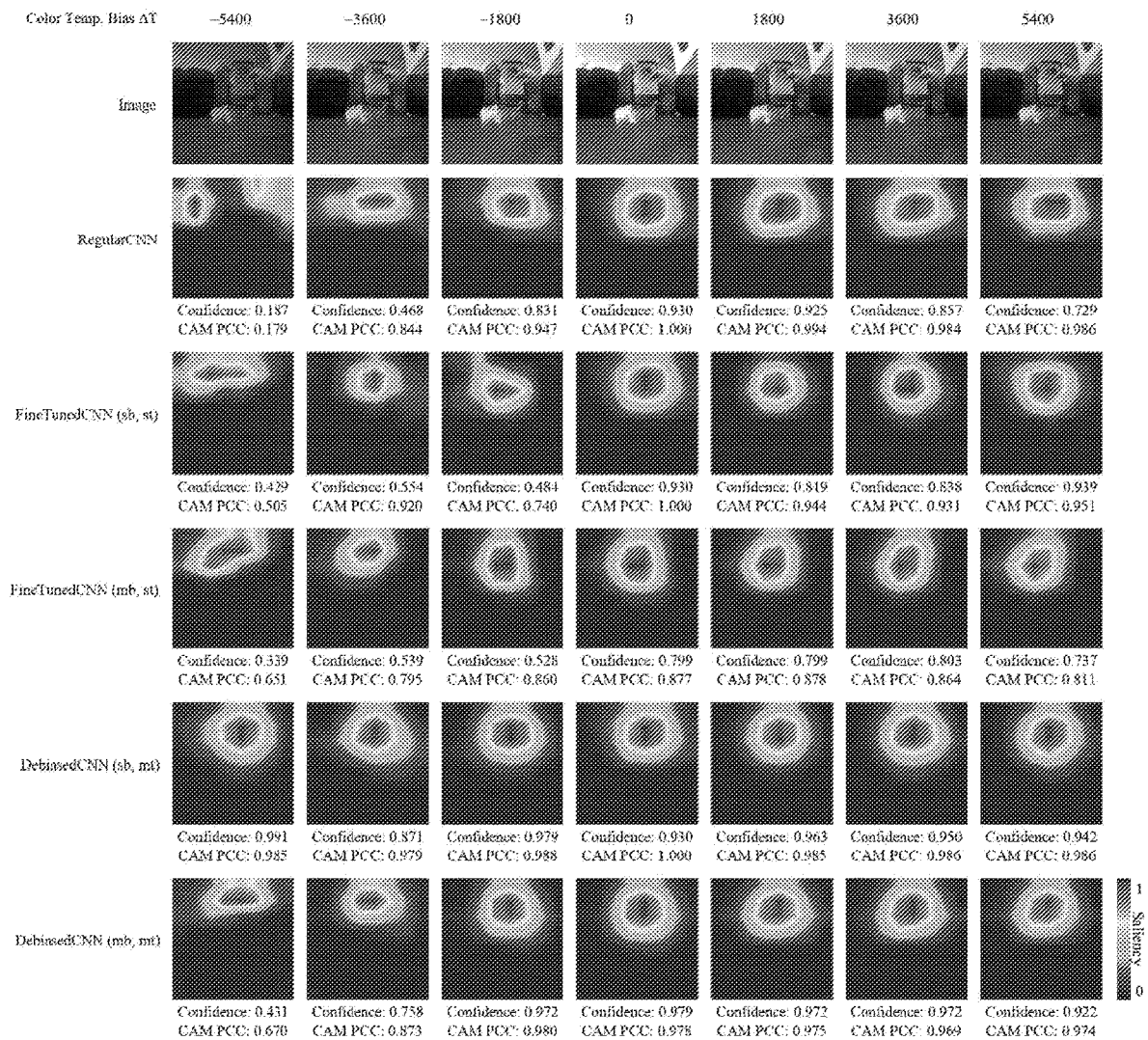
FIG. 43 shows a representative image from NTCIR-12 labeled "Using Mobile Phone" with corresponding CAMs generated by different ablated CNN models under various color temperature bias levels.
Figure 44:
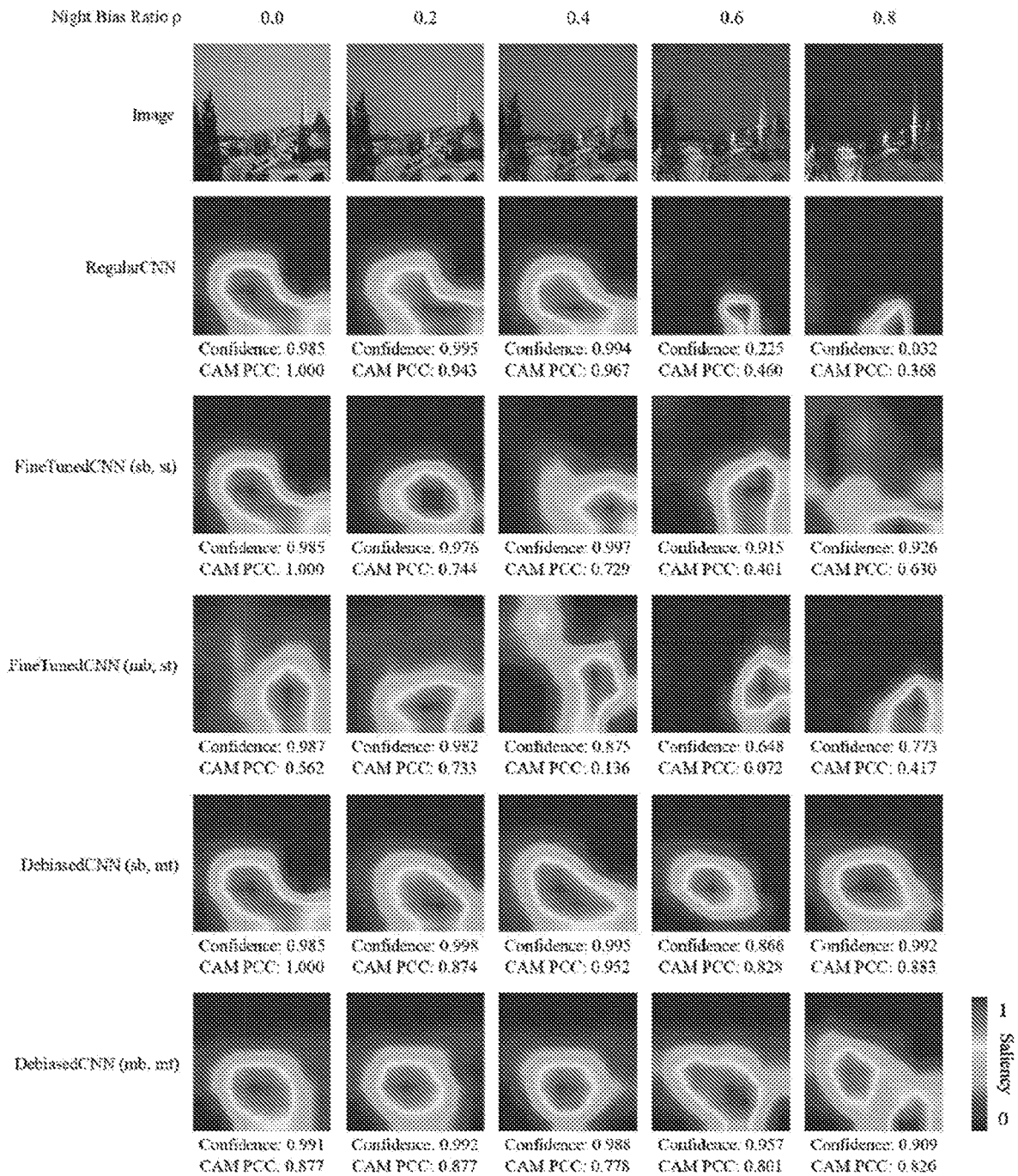
FIG. 44 shows a representative image from TransAttr labeled "Is Snowy, Not Sunny, Not Cloudy, Not Dawn/Dusk" with corresponding CAMs generated by different ablated CNN models under various night/day bias ratios.
Figure 45:
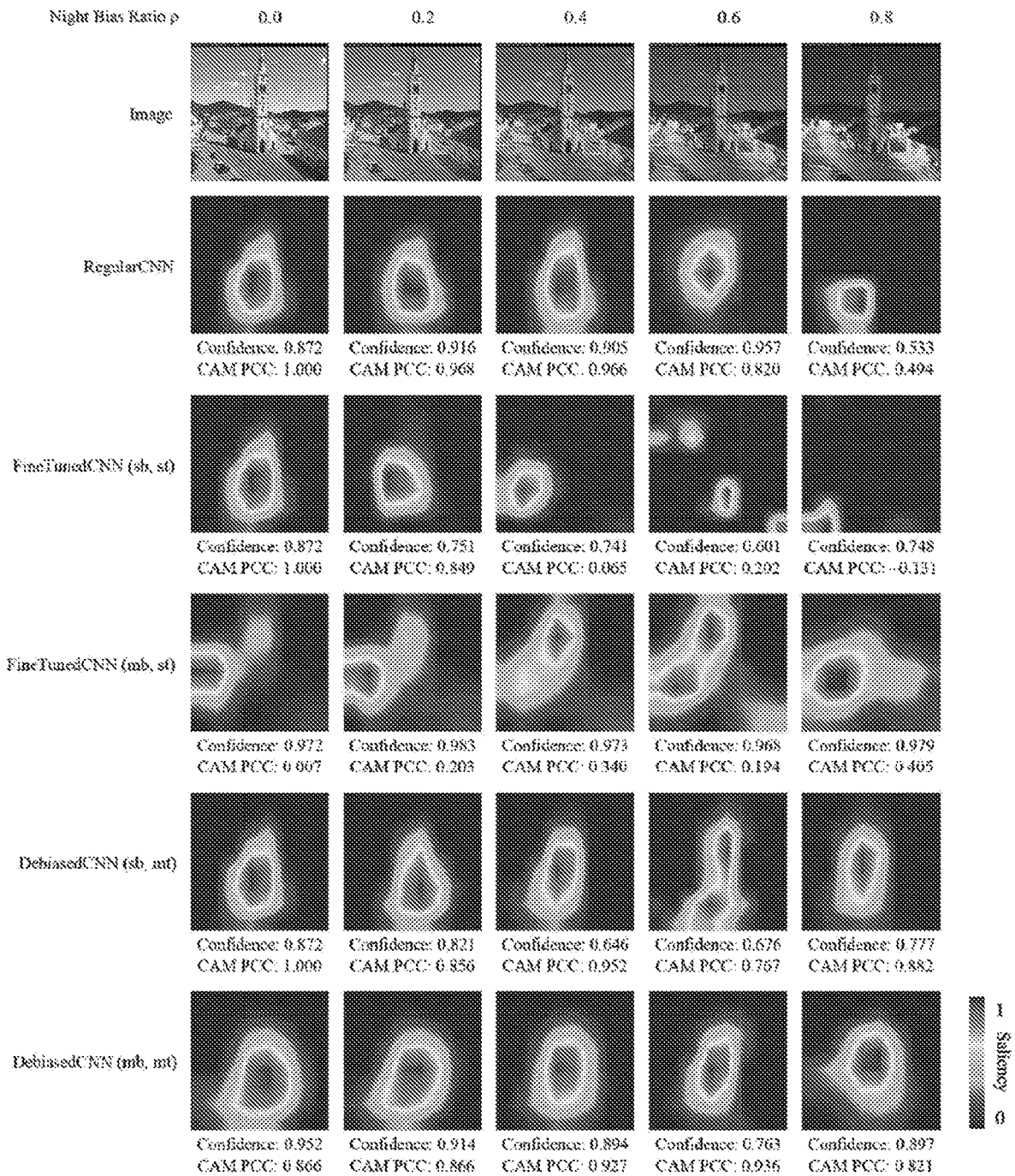
FIG. 45 shows a representative image from TransAttr labeled "Not Snowy, Is Sunny, Not Cloudy, Not Dawn/Dusk" with corresponding CAMs generated by different ablated CNN models under various night/day bias ratios.
Figure 46:
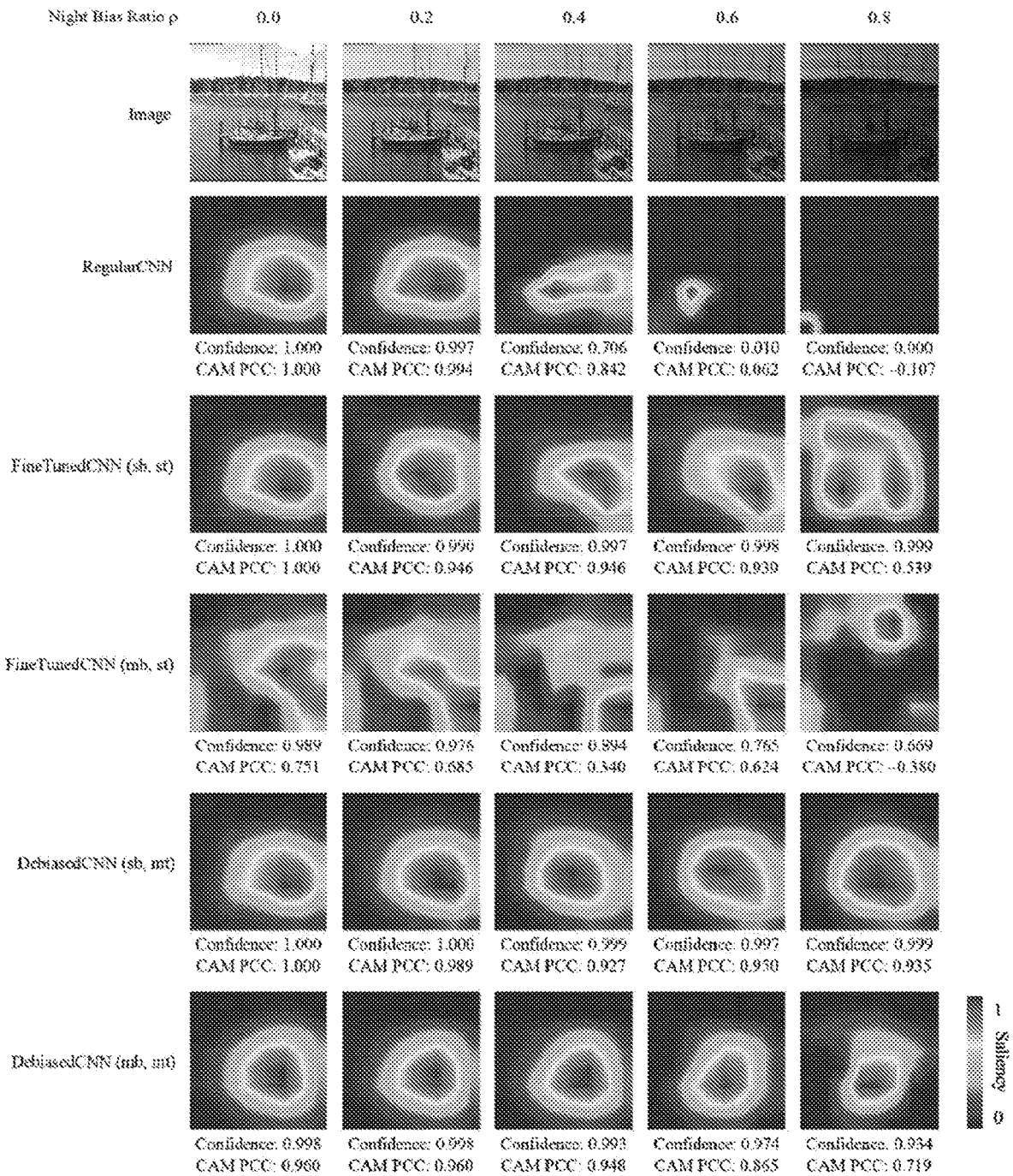
FIG. 46 shows a representative image from TransAttr labeled "Not Snowy, Is Sunny, Not Cloudy, Not Dawn/Dusk" with corresponding CAMs generated by different ablated CNN models under various night/day bias ratios.
Figure 47:
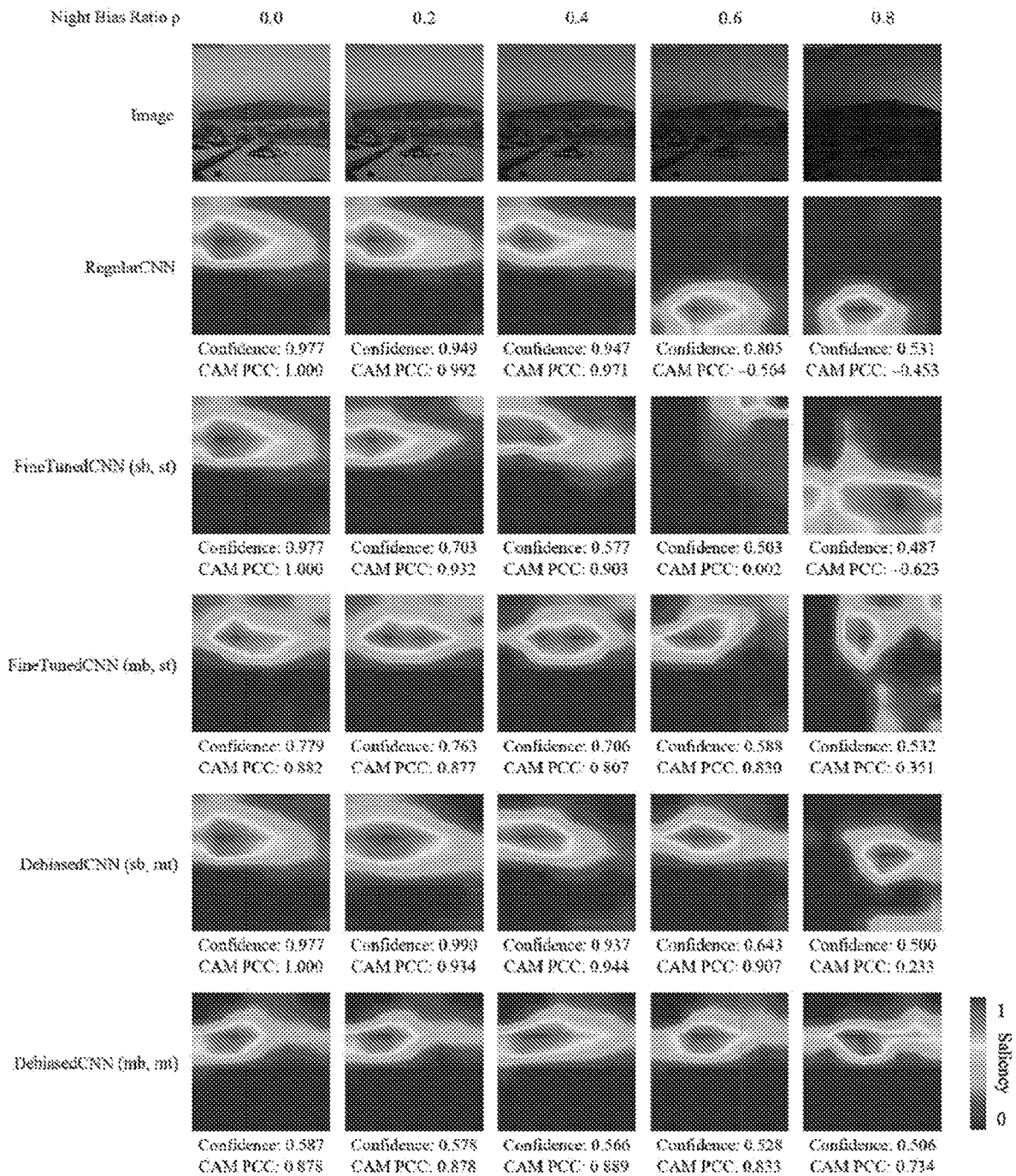
FIG. 47 shows a representative image from TransAttr labeled "Not Snowy, Is Sunny, Not Cloudy, Not Dawn/Dusk" with corresponding CAMs generated by different ablated CNN models under various night/day bias ratios.

In the main study, each participant viewed 7 repeated image trials, each randomly assigned to one of 9 conditions (3 Blur Bias levels×3 CAM types) in a within-subjects experiment design. Participants viewed 7 randomly chosen images from the same 10 images of User Study 1, instead of all 10, so that they could not easily conclude which class was the likely label for the remaining images by eliminating previous classes. For each trial, the participant performed the common explainable AI task to verify the label prediction of the model. The participant viewed a labeled image at the assigned Blur Bias level with corresponding CAM for the assigned CAM type, indicated her likelihood choice(s) for the image label with the "balls and bins" question (q1); rated how well each CAM represented the image label (q2); rated how helpful the CAM was for verifying the label (q3), and wrote the rationale for her rating (q4). FIG. 25a shows the first questionnaire page. On the next page, participants saw the image unblurred and answered questions q2-4 again as questions q5-7 (FIG. 25b). This allows the preconceived and consequent ratings and rationale to be compared (FIG. 27).

Experiment apparatus is discussed. For q1, the participant is asked to indicate the likelihoods of 10 labels to be the actual image label with the "balls and bins" graphical distribution building question to elicit her probability distribution $p=\{p_c\}^T$ over label classes $c \in C$. This question is reliable in eliciting probabilities from lay users and avoids priming participants with the actual label $c_0$, since it asks about all labels. The participant's selected label $\hat{c}$ is calculated as the class with the highest probability, i.e., $\hat{c}=\mathrm{argmax}_c(p_c)$, Labeling Confidence as the indicated likelihood for the actual label $p_{c_0}$, and Label Correctness as $[\hat{c}=c_0]$, where [•] is the Iverson bracket notation.

The perceived CAM Truthfulness and CAM Helpfulness Ratings are measured on a bipolar 7-point Likert scale (−3=Strongly Disagree, −2=Disagree, −1=Somewhat Disagree, 0=Neither Agree nor Disagree, +1=Somewhat Agree, +2=Agree, +3=Strongly Agree). The rationale of ratings are collected as open-ended text. Different formats for CAM Truthfulness and CAM Helpfulness are used to mitigate repetitive or copied responses and to allow for a more precise measurement of CAM Truthfulness.

Statistical analysis and quantitative results of user study 2 are discussed. Similar to User Study 1, for all response variables, a multivariate linear mixed effects model is fitted with the same fixed, interaction, and random effects. CAM Truthfulness and Helpfulness ratings are further analyzed with fixed main and interaction effects regarding whether users rated before or after seeing the unblurred version of the image, i.e., Unblurred Disclosure: preconceived or consequent. FIG. 26b shows the model fit ($R^2$) and ANOVA tests for each fixed effect, and report significant results similarly to User Study 1.

FIG. 10e shows results of the statistical analysis on 1,197 trials from another 171 Amazon Mechanical Turk participants. Differences in decision quality (Labeling Correctness and Labeling Confidence) across CAM types depended on blur bias level. For None blur, the decision quality was high for all CAM types (confidence M=96.7%, correctness M=99.8%) due to the ease of the tasks, while for Strong blur, the decision quality was low for all CAM types (confidence M=67.9%, correctness M=80.0%), suggesting that blurring was too strong even for truthful CAMs to be useful. However, for Weak blur, Debiased-CAM reduced labeling error by 2.44× (1−Correctness: from 16.8% to 6.8%) and improved confidence from 77.2% to 85.4% compared to Biased-CAM. Stronger differences in preconceived ratings of CAM types are found. For Weak blur, participants rated Debiased-CAM as more truthful (M=7.6 vs. 5.6 out of 10) and more helpful (M=1.5 vs. 0.16, on a 7-point Likert scale from −3 to 3) than Biased-CAM. Moreover, for Strong blur, although their decision quality did not improve, participants perceived Debiased-CAM as more truthful (M=6.3 vs. 4.4) and helpful (M=0.55 vs. −0.52) than Biased-CAM. These effects were similar and slightly amplified for consequent ratings (FIG. 10e), indicating that users more strongly appreciated Debiased-CAM and disliked Biased-CAM if they had foreknowledge of the unblurred scenes. In summary, Debiased-CAM recovered the usefulness of deviated CAMs of moderately blurred images, and participants perceived it as helpful even for strong blur.

Thematic analysis and qualitative findings of user study 2 are discussed. To better understand why participants rated the CAMs as helpful or unhelpful, the rationale of both their preconceived ratings when seeing the blurred image and consequent ratings after seeing the unblurred image scene are analyzed. A thematic analysis similar to User Study 1 is performed. These results elucidate the mental model of how truthful and debiased CAMs were useful even for blurred images. Differences in rationale are found to depend much on image Blur Bias level.

For unblurred images (None blur level), participants mostly felt that CAMs were helpful, because CAMs helped to: 1) focus their attention "on the most important part of the image, which helps me to quickly identify and label the image." (Participant P106, Garbage Truck); 2) ignore irrelevant targets to "let me know I can disregard the person in the foreground" (P89, Dog), "It helps hone in on what the content is, and helps to ignore the extra things in the frame." (P14, Chain Saw); and 3) matched their expectations since they "did a solid job of identifying the garbage truck." (P36) and was "highly correlated to where the fish is in this image." (P38). Conversely, as expected, many participants felt that CAMs were unhelpful because "I could easily identify the object in the image without the heatmap" (P32, Church).

For images with Weak blur, a truthful CAM: 4) "helps focus my attention to that area on the blurry picture" (P105, Debiased-CAM), "clearly give hint on what was needed to notice in the photo" (P140, Unbiased-CAM); and 5) helped to confirm image labels, e.g., P3 felt that "the heatmap gives me the idea that the object might be a fish, I could not tell otherwise" and wrote after seeing the unblurred image that "I would not have known what the object was without the heatmap." P118 described how Unbiased-CAM "pointed to the steeple and it helped me realize that it was indeed a picture of a church. I did have trouble recognizing it on my own." Debiased-CAMs helped to locate suspected objects in unexpected images, e.g., P96 felt that "based on what the heatmap is marking, that's the exact spot where someone would hold a french horn", and P67 noted "that is not an area where I would expect to find a fish, so it's helpful to have this guide."

For images with Strong blur, many participants felt that the CAMs were very unhelpful, because 6) the task was too difficult such that they had "NO idea what image is and heatmap doesn't help." (P68, Biased-CAM), felt the task "was very hard, i could not figure it out" (P71, Debiased-CAM), did not have much initial trust as "I feel that the heatmap could be wrong because of the clarity of the image." (P62, Unbiased-CAM). Some participants would 7) blindly trust the CAM due to a lack of other information such that "without the heatmap and the suggestion, I would have no guess for what this is. I am flying a bit blind. So, I concur with the recommendation (french horn) until I see more." (P92, Unbiased-CAM) and due to the trustful expectation that CAM "enables me to know the most useful part in the camera." (P138, Church, Unbiased-CAM). Finally, we found that 8) confirmation bias may cause the CAM correctness to be misjudged. For example, P76 first thought a misleading Biased-CAM "helps make a blurry picture more clear", but later realized "it's in the wrong spot." ("Garbage Truck"); in contrast, P24 wrongly accused that an Unbiased-CAM "was focused on the wrong thing", but changed his opinion after seeing the unblurred image, admitting "Now that I see it's a dog, it is more clear."

In summary, these findings explain why truthful Debiased-CAM and Unbiased-CAM helped participants to verify classifications of unblurred or weakly blurred images. For unblurred images, these CAMs: 1) focused user attention to relevant objects to speed up verification, 2) averted attention from irrelevant targets to simplify decision making, and 3) matched user expectations of the target object shapes. For weakly blurred images, these CAMs: 4) provided hints on which parts to study in blurred images, and 5) supported hypothesis formation and confirmation of suspected or unexpected objects. For strongly blurred images, participants generally rated all CAMs as unhelpful because: 6) verifying the images was too difficult, 7) they felt misguided to blindly trust the CAMs, and 8) they misjudged the CAMs based on preconceived notions, i.e., confirmation bias.

Discussion and Generalization

The results highlighted issues in explanation faithfulness when CNN models explain their predictions on biased images. The challenge is addressed by developing Debiased-CAM to improve the truthfulness and helpfulness of explanations, and consequently the prediction performance. The question of how to handle bias in data for model explanations is investigated. A common interface approach to handle error or uncertainty is to visualize them. While an additional approach to suppress uncertainty is possible since some users are uncertainty adverse, the approach in accordance with embodiments does not maliciously hide information even though it is similar to suppressing, since the biases may be unrelated (orthogonal) to the prediction task (e.g., snow prediction of day or night scene), or meant to be tolerated (e.g., blurring for privacy). Though sensory perceptual bias is primarily discussed, the faithful Debiased-CAM demonstrates that two AI models can be trained to interpret two deviated information in a similar way. This is analogous to two people sharing a common understanding despite their differing perspectives. This presents an opportunity to consider debiasing for other bias cases, such as societal bias, or for models serving different stakeholders. For example, debiased explanations could show how slightly different two stakeholders interpret a decision (e.g., patient and doctor for medical diagnosis).

While prior work exploited explanations or attention from human annotation, teacher models, multiple model layers, these approaches only improved predictions on unblurred images; instead, across different data bias types and levels, the approach in accordance with embodiments which debias explanations improves both the performance and explanation faithfulness across multiple prediction tasks. These improvements can be achieved by ensuring that model parameters were learned based on more important attention as identified by unbiased explanations and on more diverse inputs due to data augmentation across multiple bias levels. More precise training with multiple prediction tasks and differentiable explanation loss are also implemented. Results showed that even when image data were degraded or distorted due to bias, 1) they retained sufficient useful information that DebiasedCNN could learn to recover salient locations of unbiased explanations, and 2) these salient locations were highly relevant to the primary task such that prediction performance could be improved. Furthermore, the multi-bias, multi-task debiasing training approach in accordance with embodiments can significantly improve model robustness; for DebiasedCNN trained for egocentric activity recognition and outdoor scenes, its task performance and CAM faithfulness remained high even for images under strong blur, and its task performance improved when trained on multiple color temperature biases. Generalizations for explanation debiasing are discussed below.

The self-supervised debiasing approach in accordance with embodiments can be applied to other gradient-based attribution explanations by formulating the activation, gradient or propagated terms as network layers in a secondary prediction task. Some saliency explanations, such as Layer-wise Relevance Propagation (LRP) and Integrated Gradients, produce fine-grained "edge detector" heatmaps may be degraded with biasing, such as strong blurring. Beyond gradient-based explanations, model-agnostic explanations such as LIME and Kernel SHAP can be debiased by regularizing on a saliency loss metric. Additionally, CNN explanation techniques such as feature visualizations and neuron attention have higher dimensionality that requires more sensitivity to debias. Performing dimensionality reduction with autoencoders or generative adversarial networks (GANs) can provide latent features and concepts for feasible debiasing. Finally, concept-based explanations such as TCAV can be debiased to increase the similarity of unbiased concept vector activations and generated ones.

Debiased-CAM can be generalized to other obfuscation techniques, types of data bias. Deviations in CAM explanations due to three common image biases (i.e. Gaussian blurring, color shifting, and low lighting) are investigated. Other cases of biasing include images pixelated for privacy protection, noisy images under low light, ultrasound images, and images with motion blur. Training to debias against these can help to generate explanations which are more robust and interpretable for more contexts of use. Other than biases in images, debiasing is also necessary for explaining model predictions of other data types and behaviors, such as audio signals with noise or obfuscation, and human activity recognition with inertial measurement units (IMU) or other wearable sensors. With the prevalence of data bias in real-world and the need for privacy preservation through data obfuscation, Debiased-CAM provides a generalizable framework to train robust performance and faithful explanations for responsible AI.

Accordingly, issues in explanation faithfulness when CNN models explain their predictions on biased images are highlighted and the challenge are addressed by developing Debiased-CAM to improve the truthfulness of explanations. These improvements are achieved by ensuring that model parameters were learned based on more important attention as identified by unbiased explanations and on more diverse inputs due to data augmentation across multiple bias levels. More precise training with multiple prediction tasks and differentiable explanation loss are also implemented. Results showed that even when image data were degraded or distorted due to bias, 1) they retained sufficient useful information that DebiasedCNN could learn to recover salient locations of unbiased explanations, and 2) these salient locations were highly relevant to the primary task such that prediction performance could be improved.

Implementation Details

Datasets and model implementation details are discussed. FIG. 11 shows datasets and model implementation details. In simulation studies, the models on three datasets for two image tasks are evaluated (summarized in FIG. 11). For Simulation Study 1 (Blur Bias), Inception v3 pretrained on ImageNet ILSVRC-2012 was used and fine-tuned on blur biased images of ImageNette, which is a subset of ILSVRC-2012. Only layers from the last two Inception blocks of the Inception v3 model were retrained. For Simulation Studies 2 and 4 (Blur and Color Temperature Bias on egocentric activity images), Inception v3 pretrained on ILSVRC-2012 was also used, and fine-tuned it on the NTCIR-12. For Simulation Study 3 (Blur Bias Captioning), the Neural Image Captioner (NIC) with Inceptionv3-LSTM model was used and fine-tuned on blur biased images from COCO. The last two inception blocks of Inception v3 as well as LSTM blocks were retrained. For Simulation Study 5 (Lighting Bias), the Inception v3 (pretrained on ILSVRC-2012) on the Transient Attribute database (TransAttr) for multi-label classification was fine-tuned. Evaluations were limited to four labels: Snowy, Sunny, Cloudy, Dawn/Dusk. All model hyperparameters were tuned using the Adam optimizer with batch size 64 and learning rate $10^{-5}$.

Simulation Studies Method

Details to calculate different bias for color temperature and lighting biases are discussed. Color temperature refers to the temperature of an ideal blackbody radiator as if illuminating the scene. Color temperature is biased as follows. Each pixel in an unbiased image has color $(r,g,b)^T$, where R, G, B represent the red, green, and blue color values within range 0-255, respectively. Each pixel is biased from neutral temperature t by $\Delta t_b$ at bias level b by multiplying a diagonal correction matrix with its color, i.e., $$(r_b, g_b, b_b)^T = \text{diag}(255/R_b, 255/G_b, 255/B_b)(r,g,b)^T,$$

where $(R_b, G_b, B_b)^T = f_{CT}(t+\Delta t_b)$ are scaling factors obtained from Charity's color mapping function $f_{CT}$ to map a blackbody temperature to RGB values (see FIG. 12). FIG. 12 shows color mapping function to bias color temperature of images in Simulation Study 4. Changes in Red, Green, Blue values are larger for orange biases (lower color temperature) than blue biases (higher temperature). Neutral color temperature is set to represent shaded/overcast skylight at 6600K. The neutral color temperature t is set to 6600K, which represents cloudy/overcast daylight. Color temperature biasing is asymmetric about zero bias, because people are more sensitive to perceiving changes in orange than blue colors (Kruithof Curve); and due to the non-linear monotonic relationship between blackbody temperature and modal color frequency (Wien's Displacement Law). This asymmetry explains why orange biasing led to stronger CAM deviation than blue biasing.

Lighting biases are discussed. Lighting bias occurs when the same scene is lit brightly or dimly. In nature, this occurs as sunlight changes hour-to-hour, or season-to-season. The Transient Attributes database contains photos of scenes from the same camera position taken across different times of the day and year. Attribute changes include whether the scene is daytime or nighttime, snowy, foggy, dusk/dawn or not. While it is sought to generate images with different degrees of darkness, the dataset only contained photos that were very bright or very dark. Thus photos are interpolated to generate scenes with intermediate darkness. For each scene, with a daytime image $I_{day}(x,y)$ and nighttime image $I_{night}(x,y)$, the pixel-wise interpolation are performed as, $$I_{biased}(x,y) = (1-\rho) \times I_{day}(x,y) + \rho \times I_{night}(x,y),$$

where $\rho$ is the night/day ratio. An unbiased image has $\rho=0$ indicating daytime, and the most biased image has $\rho=1$ indicating nighttime.

Figure 13:
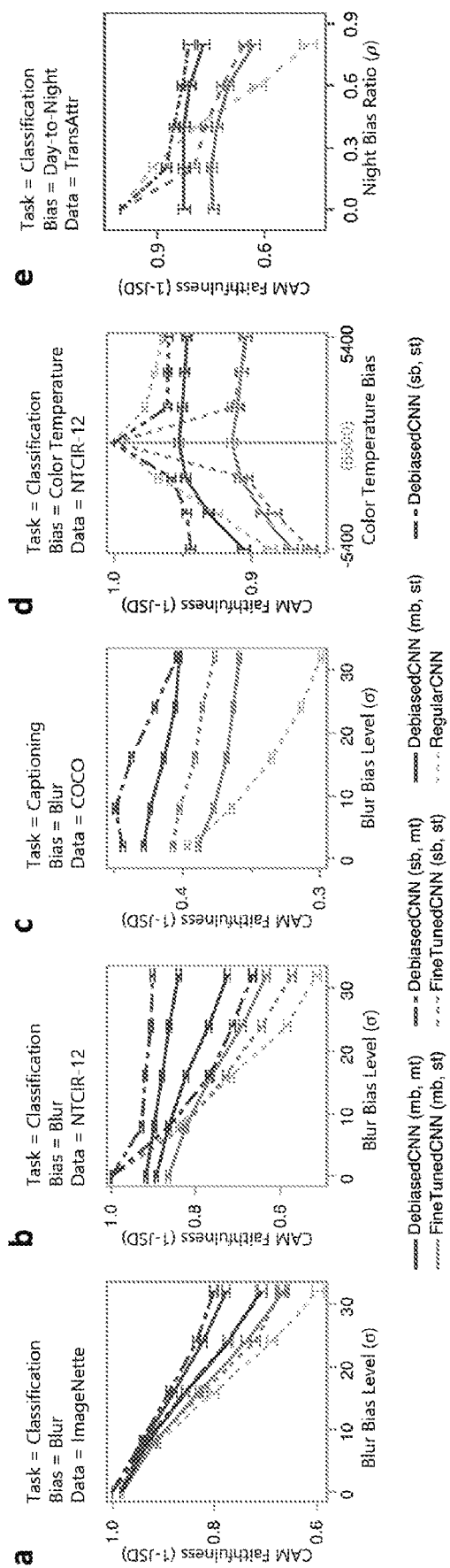
FIG. 13 shows comparisons of CAM Faithfulness calculated with Jensen-Shannon Divergence (JSD) between CAM and Unbiased-CAM for increasing bias with different CNN models across four simulation studies.

Other supplemental metrics on CAM faithfulness are discussed. The other saliency comparison metrics can include: Area under ROC Curve (AUC) of pixel fixations; and Kullback-Leibler Divergence (KLD) between saliency maps, which are appropriate for localization applications. Since CAMs localize pixels that are important for image prediction, CAM Faithfulness is also computed with the Jensen-Shannon Divergence (JSD) that extends KLD to be symmetric and bounded. i.e., $$D_{JS}(\tilde{P},P) = \frac{1}{2} D_{KL}(\tilde{P},\bar{P}) + \frac{1}{2} D_{KL}(P,\bar{P}),$$

where $\bar{P} = (\tilde{P}+P)/2$ is the average of the compared normalized CAM probabilities (e.g., $P = M/\Sigma_{ij} M_{ij}$), and $D_{KL}(\tilde{P},\bar{P}) = \Sigma_{ij} \tilde{P}_{ij} \log(\tilde{P}_{ij}/\bar{P}_{ij})$ is the KLD between normalized CAMs. Hence, CAM Faithfulness can be calculated as $1-D_{JS}$. Results of the JSD-based metric agreed strongly with the PCC metric (compare FIG. 7 with FIG. 13). FIG. 13 shows comparisons of CAM Faithfulness calculated with Jensen-Shannon Divergence (JSD) between CAM and Unbiased-CAM for increasing bias with different CNN models across four simulation studies. Similar to FIG. 7, CAM Faithfulness decreased with increasing bias level. Error bars indicate 90% confidence interval. Model variants annotated as st=single-task, mt=multi-task, sb=single-bias, mb=multi-bias.

Figure 14:
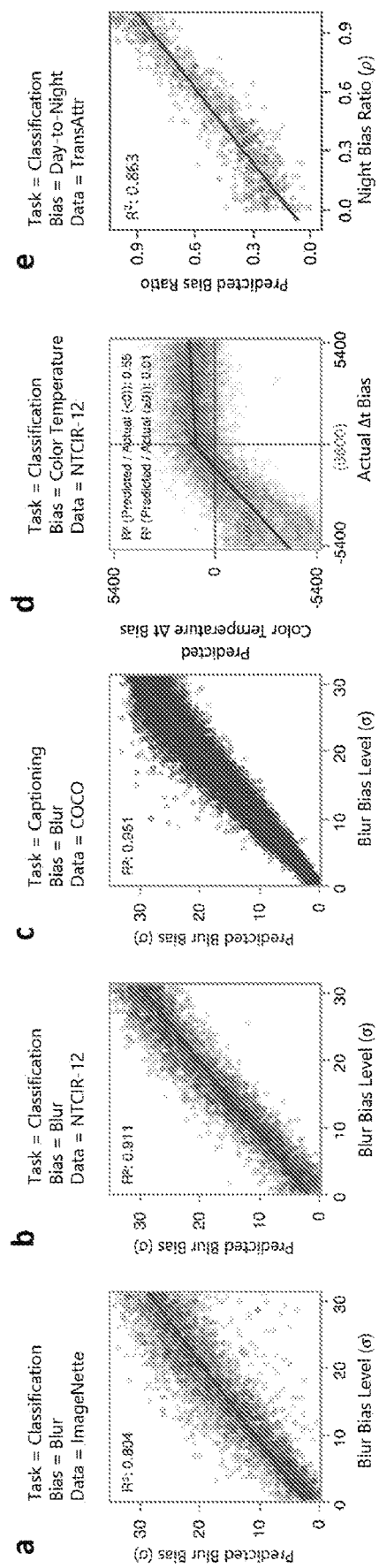
FIG. 14 shows regression performance for DebiasedCNN (mb, mt) measured as $R^2$ for the bias level prediction task for five simulation studies.

FIG. 14 shows regression performance for DebiasedCNN (mb, mt) measured as $R^2$ for the bias level prediction task for four simulation studies. Very high $R^2$ values indicate that models trained for Simulation Studies 1-3 and 5 could predict the respective bias levels well. Color temperature bias level prediction depended on whether bias was towards lower (more orange) or higher (more blue) temperatures. Blue-biased images were less distinguishable. Hence, the model was less well-trained to predict the blue color temperature bias level; it was more able to predict orange bias at a reasonable accuracy.

FIG. 16 shows comparison of model Task Performance and CAM Faithfulness for single-bias (sb) and multi-bias (mb) DebiasedCNN variants evaluated across multiple bias levels. Each single-bias model had the best Task Performance and CAM Faithfulness for the specific bias level at which it was trained: $\sigma=0$ for RegularCNN, $\sigma=8$ for DebiasedCNN (sb=8, mt), $\sigma=16$ for DebiasedCNN (sb=16, mt), $\sigma=24$ for DebiasedCNN (sb=24, mt), $\sigma=32$ for DebiasedCNN (sb=32, mt). However, they were less performant and faithful than multi-bias DebiasedCNN (mb, mt) for other non-specific bias levels.

FIG. 17 shows comparison of CAM Faithfulness (PCC) with model Prediction Confidence across the four simulation studies. In general, CAM Faithfulness increases with model prediction confidence, but decreases with bias level. DebiasedCNN had higher CAM Faithfulness than Fine-TunedCNN and RegularCNN, and had much higher CAM Faithfulness even at moderately low (about 40%) confidences. For image captioning, all models had low CAM Faithfulness that did not vary with Task Performance, and low Task Performance. Smooth trend lines are estimated by fitting cubic splines for each row with $\lambda$ parameter set to $\lambda=15.6$ (a,b,d) and $\lambda=1020$ (c). Confidence areas indicate 90% confidence interval.

Figure 18:
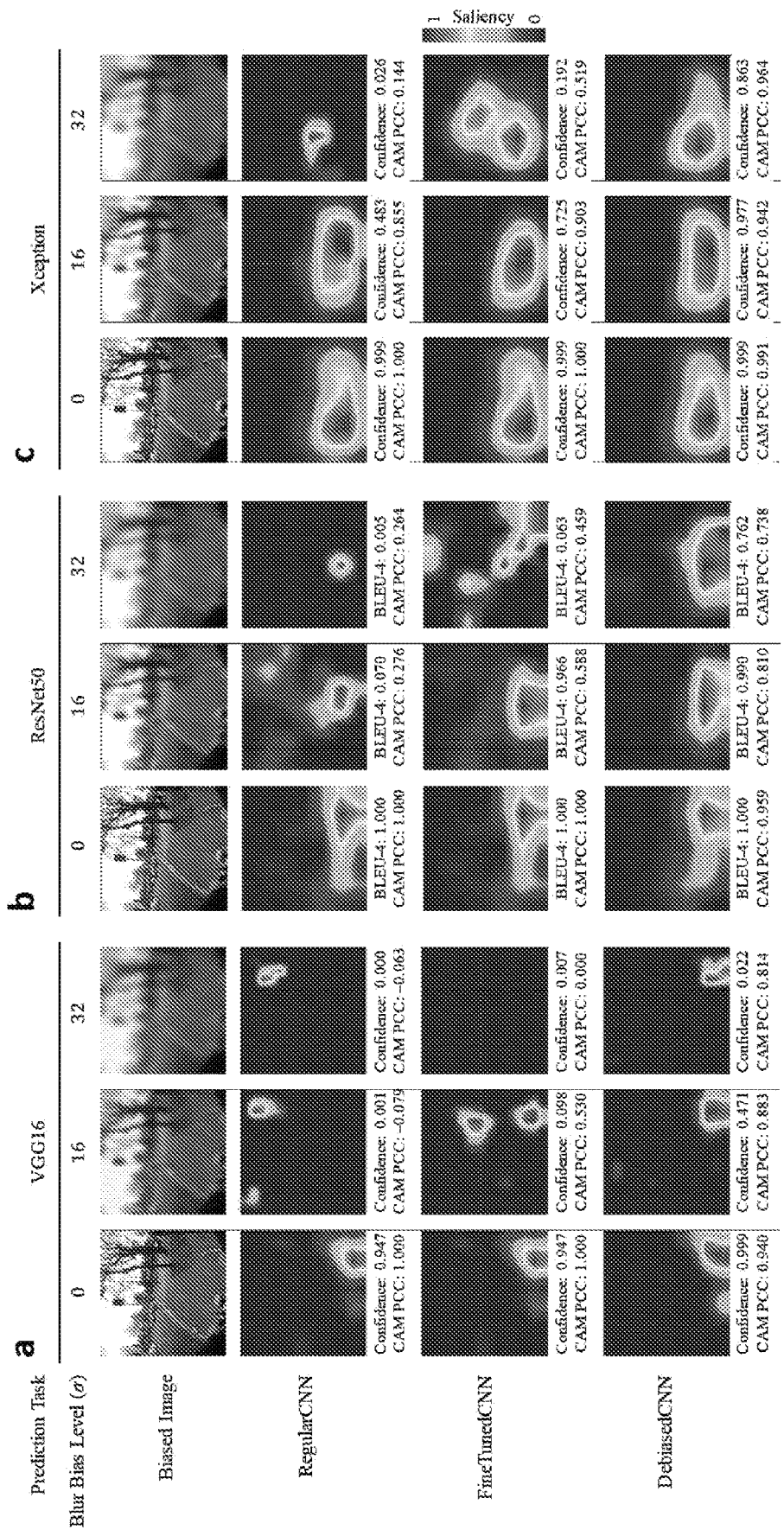
FIG. 18 shows deviated and debiased CAM explanations from various CNN models at varying bias levels of blur biased image from NTCIR-12 labeled as "Biking".
Figure 19:
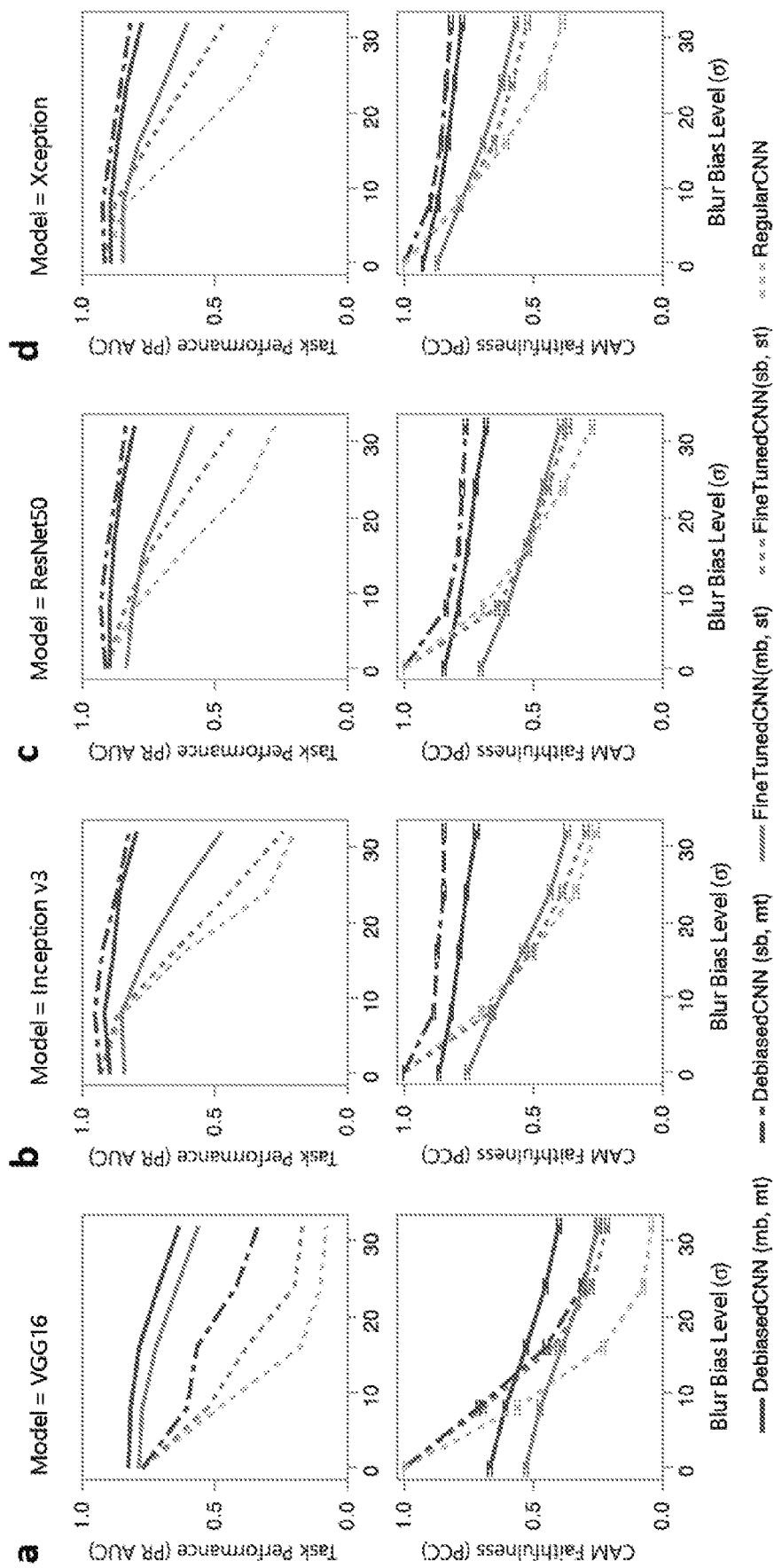
FIG. 19 shows comparisons of model Task Performance and CAM Faithfulness for image classification on NTCIR-12 trained with different CNN models.

FIG. 18 shows deviated and debiased CAM explanations from various CNN models at varying bias levels of blur biased image from NTCIR-12 labeled as "Biking". a VGG16, b ResNet50, c Xception. a-c, Models arranged in increasing CAM Faithfulness (see FIG. 9, second row). CAMs generated from more performant models were more representative of the image label with higher CAM Faithfulness (PCC). FIG. 19 shows comparisons of model Task Performance and CAM Faithfulness for image classification on NTCIR-12 trained with different CNN models. a VGG16, b Inception v3, c ResNet50, d Xception. a-d, Results agreed with FIG. 7 that higher bias led to lower Task Performance and CAM Faithfulness, but debiasing improved both. CNN models are arranged in increasing CAM Faithfulness from left to right. All models were pretrained on ImageNet and fine-tune on NTCIR-12. We set the last two layers of VGG16, and last block of ResNet50 and Xception as retrainable. b-d, Newer base CNN models than VGG16 significantly outperformed it for both Task Performance and CAM Faithfulness. These newer models had similar Task Performance across bias levels, though their CAM Faithfulness differed more notably.

User Studies Method

For both user studies, 10 images are selected to represent one instance per class label for 10 classes of ImageNette, to balance between selecting a variety of images for better external validity, and too much workload for participants due to too many trials. CAMs were generated from specific CNN models in Simulation Study 1. At each blur level, Unbiased-CAM and Biased-CAM were generated from RegularCNN, while Debiased-CAM was generated from DebiasedCNN (mb, mt). A key objective of the user studies was to validate the results of the simulation studies regarding CAM types and image blur bias levels, hence, canonical images that meet the criteria below are selected:
1. Had RegularCNN and DebiasedCNN predict correct labels for unblurred images, since the use of CAMs to debug model errors are not subject of the investigation. CNN predictions on blurred images may be wrong, but the CAM of the correct label is shown.
2. Were easy to recognize when unblurred, so that users can perceive whether a CAM is representative of a recognizable image.
3. Were somewhat difficult but not impossible to recognize with Weak blur, so that participants can feasibly verify image labels with some help from CAMs.
4. Were very difficult to recognize with Strong blur, such that about half of pilot participants were unable to recognize the scene, to investigate the upper limits of CAM helpfulness.
5. Had Unbiased-CAMs that were representative of their labels, to evaluate perceptions with respect to truthful CAMs. Conversely, debiasing towards untruthful CAMs is futile.
6. Had Biased-CAMs for Strong blur that were perceptibly deviated and localized irrelevant objects or pixels; otherwise, no difference between Unbiased-CAM and Biased-CAM will lead to no perceived difference between Unbiased-CAM and Debiased-CAM too.
7. Had Debiased-CAMs that were an approximate interpolation between the Unbiased-CAM and Biased-CAM of each image, to represent the intermediate CAM Faithfulness of Debiased-CAM found in the simulation studies.

These criteria were verified with participants in a pilot study and the selected images had CAM Faithfulness representative of Simulation Study 1 for Debiased-CAM, but with slightly lower CAM Faithfulness for Biased-CAM to represent worse case scenarios. CAMs were different based on CAM type and Blur Bias level. Unbiased-CAMs were the same for all Blur Bias levels, and Unbiased-CAM and Biased-CAM were the same for None blur level. For other conditions, CAMs were deviated and debiased based on CAM type and Blur Bias level. Participants are not tested with images in NTCIR-12 due to quality and recognizability issues. Since images were automatically captured at regular time intervals, many images were transitional (e.g., pointing at ceiling while "Watching TV"), which made them unrepresentative of the label. Furthermore, in pilot testing, participants had great difficulty recognizing some scenes (e.g., "Cleaning and Chores") in images with Strong blur, such that the tasks became too confusing to test. Nevertheless, results can generalize to wearable camera images with Weak blur, for users who are familiar with or can remember their personal recent or likely activities.

FIGS. 20*a-j* show images and CAMs at various Blur Bias levels and CAM types that participants viewed in both User Studies.

Figure 21:
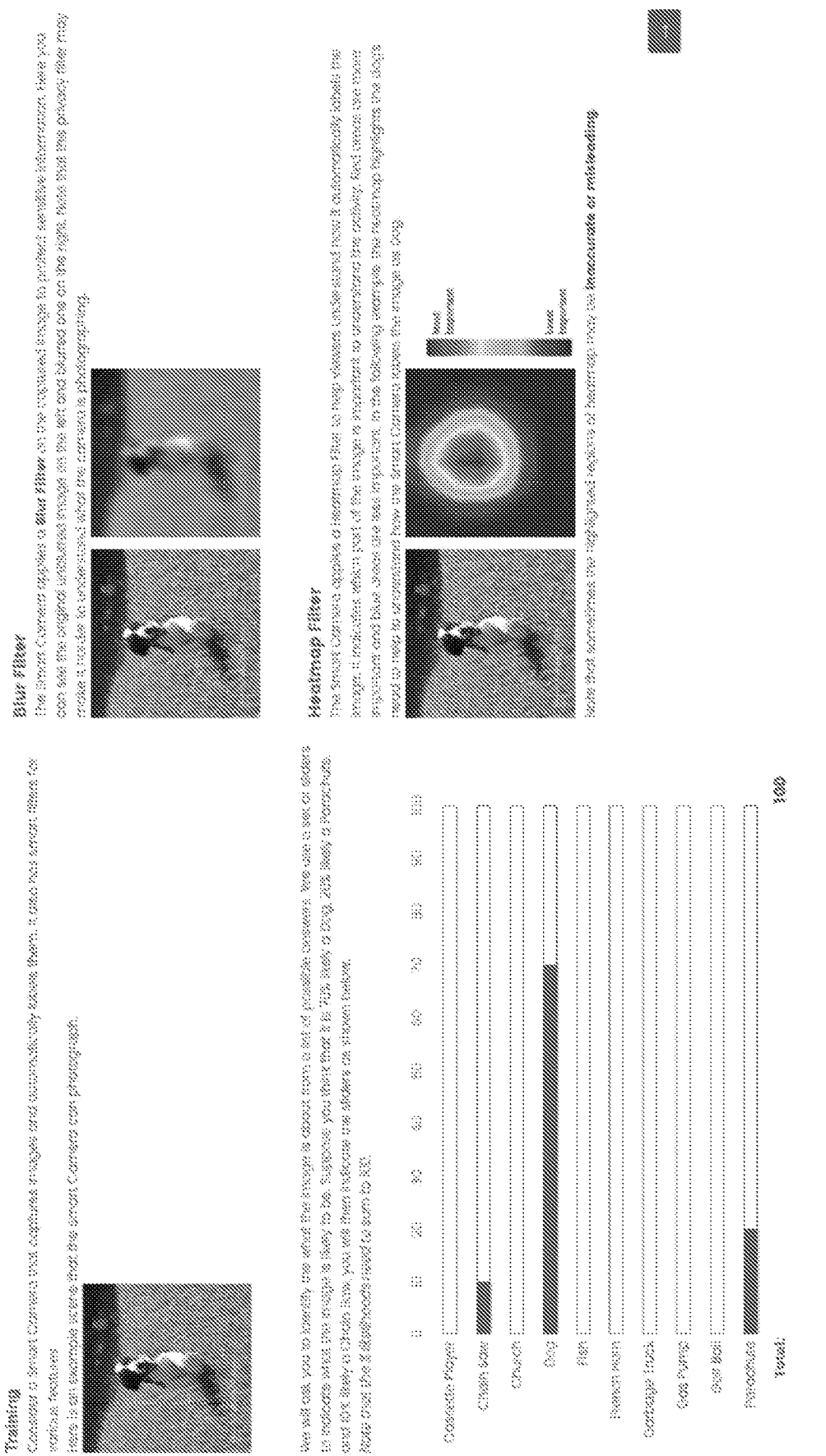

User Study 1 and 2 Questionnaires are discussed. FIGS. 21 to 25 show key sections in the questionnaire for the CAM Truthfulness User Study 1 and CAM Helpfulness User Study 2. Both questionnaires were identical except for the main study section. FIG. 21 shows a tutorial to introduce the scenario background of a smart camera with privacy blur and heatmap (CAM) explanation. It taught the participant to i) interpret the "balls and bins" question ( ), ii) understand why the image may be blurred, and iii) interpret the CAM.

Figure 22:
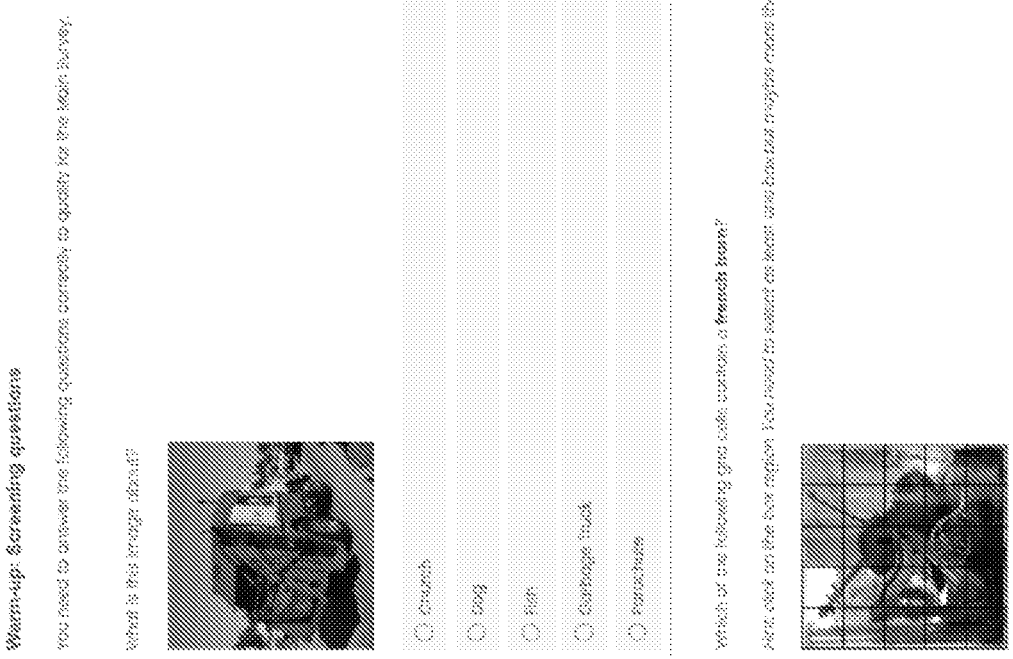

FIG. 22 shows a screening quiz with four questions to test labeling correctness and saliency selection. Questions tested for correct labeling on an unblurred (1) and a weakly blurred (2) photograph image, and correct grid selection of relevant locations in a photograph image (3) and a heatmap (4). The participant is excluded from the study if he answered more than one question wrongly. FIG. 23 shows background questions on participant self-reported technology savviness and photograph comprehension. These questions were posed after passing the screening quiz, and before the main study section to measure the participant's pre-conceived self-assessment which may be biased after repeatedly viewing variously blurred images and variously biased heatmaps.

FIG. 24 shows example main study per-Image Trial for CAM Truthfulness User Study 1. FIG. 24a shows that the first page asked the participant to q1) select on a grid which locations in an unblurred image are important to identify the image as labeled. FIG. 24b shows the second page displaying how the smart camera has captured the image (at a randomly selected Blur Bias level), and asked the participant to q2) rate the Truthfulness of all three CAM types (randomly arranged) along a 10-point scale and to q3) explain her rating rationale.

FIG. 25 shows the example main study per-Image Trial for CAM Helpfulness User Study 2. FIG. 25a shows the first page displaying the smart camera's captured blur biased image, generated heatmap (CAM) explanation, and predicted label; and asking the participant to q1) indicate the label likelihood with a "balls and bins" question; q2) rate the CAM Truthfulness, q3) rate the CAM Helpfulness and q4) explain his rating rationale. The second page (FIG. 25b) showed the image unblurred, redisplayed the blurred image and CAM and repeated the questions for q5) CAM Truthfulness rating, q6) CAM Helpfulness rating and q7) rating rationale; the repeated questions allow the comparison of ratings before (preconceived) and after (consequent) the participant knew about the ground truth image.

User recruitment and exclusion criteria is described. Participants from both user studies had similar demographics, so we combine their descriptions. 32 and 171 participants are recruited from Amazon Mechanical Turk (AMT) with high qualification (>5000 completed HITs with >97% approval rate) for CAM Truthfulness User Study 1 and CAM Helpfulness User Study 2, respectively. They were 44.9% female and between 21 and 74 years old (Median=34). For User Study 1, 32/36 participants passed all four screening questions, continued to complete the survey in a median time of 15.9 minutes and were compensated US$2.00. 40/320 responses are excluded from analysis based on the exclusion criterion of taking >200 seconds to complete each page per trial. For User Study 2, 171/191 participants passed all four screening questions, participants completed the survey in a median time of 18.4 minutes and were compensated US$2.00. These participants were different from those recruited in User Study 1. 7 participants who gave wrong labels for >60% of encountered unblurred images are excluded (i.e., the participant's label with the highest probability was not the actual label; in practice, only 1 mistake allowed), since this indicated poor image recognition ability for the participant. Of the remaining participants, 73/1640 responses are excluded from analysis based on the same timing criterion as in User Study 1. Note that all trials with mislabeled unblurred images also happened to be excluded due to this trial criterion.

FIG. 26 shows statistical analysis of responses due to effects as linear mixed effects models. a, Statistical model for CAM Truthfulness User Study 1. b, Statistical model for CAM Helpfulness User Study 2. a, b, All models had various fixed main and interaction effects (shown as one effect per row) and Participant as a random effect. Rows with grey text indicate non-significant effects. Numbers (i.e. q1, q2, q1a, q1b, q2,3 and q5,6) correspond to numbered charts in FIGS. 10d and 10e for a and b, respectively.

FIG. 27 shows comparisons of perceived CAM Truthfulness and CAM Helpfulness before (preconceived) and after (consequent) disclosing the unblurred image. There was a significant difference across Unblurred Disclosure for CAM Truthfulness Rating ($p=0.0013$) but not for CAM Helpfulness Rating (FIG. 26). Comparing preconceptual to consequent ratings, Unbiased-CAMs were rated as less truthful ($M=7.7$ vs. 8.3, $p=0.0004$), Debiased-CAMs were rated marginally less truthful ($p=0.0212$), Biased-CAMs were rated similarly untruthful, and overall, CAMs of Strongly blurred images were rated as less truthful ($M=5.6$ vs. 6.3, $p<0.0001$). These results suggest that even with the least biased CAM (Unbiased-CAM), the unfamiliarity of unblurred scenes can hurt trust (truthfulness) in the CAM, though there was no change in perceived helpfulness before or after disclosing the unblurred image. CAM Truthfulness Ratings were measured along a 1-10 scale, and CAM Helpfulness Ratings along a 7-point Likert scale ($-3$=Strongly Disagree, $0$=Neither, $+3$=Strongly Agree). Error bars indicate 90% confidence interval. Dotted lines indicate extremely significant $p<0.0001$ comparisons, and solid lines indicate no significance at $p>0.01$.

Figure 48:
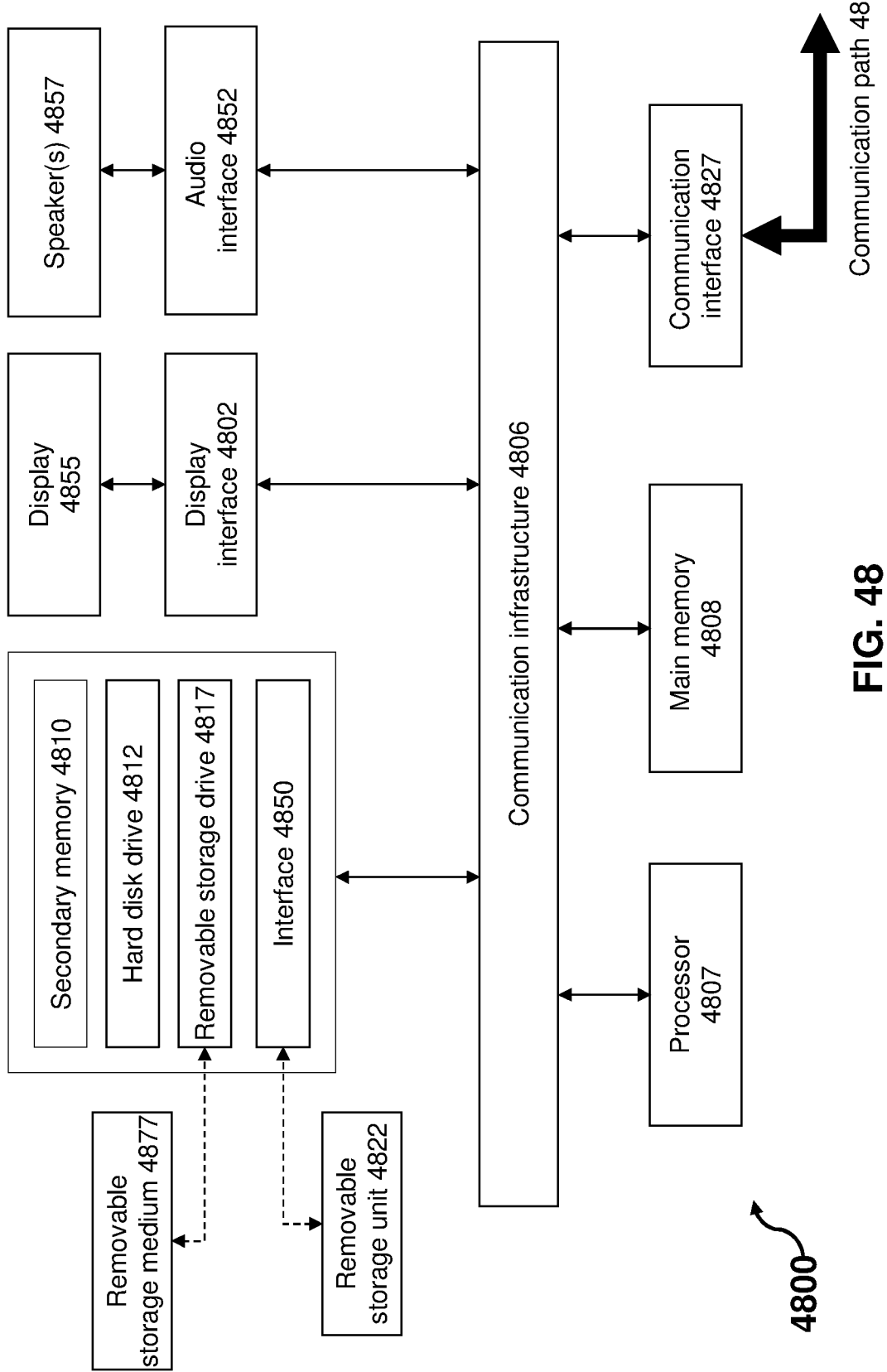
FIG. 48 shows a schematic diagram of an example of a computing device used to realise the system of FIG. 3e.

FIG. 48 depicts an exemplary computing device 4800, hereinafter interchangeably referred to as a computer system 4800, where one or more such computing devices 4800 may be used to execute the method 330 of FIG. 3e. One or more components of the exemplary computing device 4800 can also be used to implement the system 320. The following description of the computing device 4800 is provided by way of example only and is not intended to be limiting.

As shown in FIG. 48, the example computing device 4800 includes a processor 4807 for executing software routines. Although a single processor is shown for the sake of clarity, the computing device 4800 may also include a multi-processor system. The processor 4807 is connected to a communication infrastructure 4806 for communication with other components of the computing device 4800. The communication infrastructure 4806 may include, for example, a communications bus, cross-bar, or network.

The computing device 4800 further includes a main memory 4808, such as a random access memory (RAM), and a secondary memory 4810. The secondary memory 4810 may include, for example, a storage drive 4812, which may be a hard disk drive, a solid state drive or a hybrid drive and/or a removable storage drive 4817, which may include a magnetic tape drive, an optical disk drive, a solid state storage drive (such as a USB flash drive, a flash memory device, a solid state drive or a memory card), or the like. The removable storage drive 4817 reads from and/or writes to a removable storage medium 4877 in a well-known manner. The removable storage medium 4877 may include magnetic tape, optical disk, non-volatile memory storage medium, or the like, which is read by and written to by removable storage drive 4817. As will be appreciated by persons skilled in the relevant art(s), the removable storage medium 4877 includes a computer readable storage medium having stored therein computer executable program code instructions and/or data.

In an alternative implementation, the secondary memory 4810 may additionally or alternatively include other similar means for allowing computer programs or other instructions to be loaded into the computing device 4800. Such means can include, for example, a removable storage unit 4822 and an interface 4850. Examples of a removable storage unit 4822 and interface 4850 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 4822 and interfaces 4850 which allow software and data to be transferred from the removable storage unit 4822 to the computer system 4800.

The computing device 4800 also includes at least one communication interface 4827. The communication interface 4827 allows software and data to be transferred between computing device 4800 and external devices via a communication path 4826. In various embodiments of the inventions, the communication interface 4827 permits data to be transferred between the computing device 4800 and a data communication network, such as a public data or private data communication network. The communication interface 4827 may be used to exchange data between different computing devices 4800 which such computing devices 4800 form part an interconnected computer network. Examples of a communication interface 4827 can include a modem, a network interface (such as an Ethernet card), a communication port (such as a serial, parallel, printer, GPIB, IEEE 1394, RJ45, USB), an antenna with associated circuitry and the like. The communication interface 4827 may be wired or may be wireless. Software and data transferred via the communication interface 4827 are in the form of signals which can be electronic, electromagnetic, optical or other signals capable of being received by communication interface 4827. These signals are provided to the communication interface via the communication path 4826.

As shown in FIG. 48, the computing device 4800 further includes a display interface 4802 which performs operations for rendering images to an associated display 4850 and an audio interface 4852 for performing operations for playing audio content via associated speaker(s) 4857.

As used herein, the term "computer program product" may refer, in part, to removable storage medium 4877, removable storage unit 4822, a hard disk installed in storage drive 4812, or a carrier wave carrying software over communication path 4826 (wireless link or cable) to communication interface 4827. Computer readable storage media refers to any non-transitory, non-volatile tangible storage medium that provides recorded instructions and/or data to the computing device 4800 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 4800. Examples of transitory or non-tangible computer readable transmission media that may also participate in the provision of software, application programs, instructions and/or data to the computing device 4800 include radio or infra-red transmission channels as well as a network connection to another computer or networked device, and the Internet or Intranets including e-mail transmissions and information recorded on Websites and the like.

The computer programs (also called computer program code) are stored in main memory 4808 and/or secondary memory 4810. Computer programs can also be received via the communication interface 4827. Such computer programs, when executed, enable the computing device 4800 to perform one or more features of embodiments discussed herein. In various embodiments, the computer programs, when executed, enable the processor 4807 to perform features of the above-described embodiments. Accordingly, such computer programs represent controllers of the computer system 4800.

Software may be stored in a computer program product and loaded into the computing device 4800 using the removable storage drive 4817, the storage drive 4812, or the interface 4850. The computer program product may be a non-transitory computer readable medium. Alternatively, the computer program product may be downloaded to the computer system 4800 over the communication path 4826. The software, when executed by the processor 4807, causes the computing device 4800 to perform the necessary operations to execute the method 100 as shown in FIG. 1.

It is to be understood that the embodiment of FIG. 48 is presented merely by way of example to explain the operation and structure of the system 4800. Therefore, in some embodiments one or more features of the computing device 4800 may be omitted. Also, in some embodiments, one or more features of the computing device 4800 may be combined together. Additionally, in some embodiments, one or more features of the computing device 4800 may be split into one or more component parts.

It will be appreciated that the elements illustrated in FIG. 48 function to provide means for performing the various functions and operations of the system as described in the above embodiments.

When the computing device 4800 is configured to realise the system 320 to train a neural network, the system 200 will have a non-transitory computer readable medium having stored thereon an application which when executed causes the system 320 to perform steps comprising: (i) receiving, by a processing device, a training image, a reference label and a reference class activation map, the reference label and the reference class activation map associated with a corresponding unbiased image of the training image and (ii) generating, using the processing device, a class label and a class activation map based on the training image using the neural network. The system 200 can also perform the steps comprising (iii) calculating, using the processing device, a classification loss value based on differences between the reference label and the class label, and a class activation map loss value based on differences between the reference class activation map and the class activation map and (iv) updating, using the processing device, the neural network to minimise the classification loss value and the class activation map loss value to improve accuracy of the neural network in generation of the class label and the class activation map.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for training a neural network, the method comprising: receiving, by a processing device, a training image, a reference label and a reference class activation map, the reference label and the reference class activation map associated with a corresponding unbiased image of the training image, the reference class activation map indicating pixel-wise values corresponding to image regions that contributed to predicting the reference label; generating, using the processing device, a class label and a class activation map based on the training image using the neural network; calculating, using the processing device, a classification loss value based on differences between the reference label and the class label, and a class activation map loss value based on differences between the reference class activation map and the class activation map; and updating, using the processing device, the neural network to minimise the classification loss value and the class activation map loss value to improve accuracy of the neural network in generation of the class label and the class activation map.

2. The method as claimed in claim 1, wherein updating the neural network to minimise the classification loss value and the class activation map loss value comprises:
   updating, using the processing device, the neural network to minimise a sum of the classification loss value and the class activation map loss value.

3. The method as claimed in claim 1, further comprising:
   receiving, by the processing device, a reference bias value associated with the training image;
   generating, using the processing device, a bias label based on the training image using the neural network;
   calculating, using the processing device, a bias loss value based on differences between the reference bias value and the bias label; and
   updating, using the processing device, the neural network to minimise the bias loss value.

4. The method as claimed in claim 1, wherein receiving, by the processing device, the training image comprises generating, using the processing device, the training image based on a bias transformation of the corresponding unbiased image.

5. The method as claimed in claim 4, wherein the bias transformation comprises one or more of a change in blur level, color temperature and day-night lighting of the unbiased image.

6. The method as claimed in claim 1, wherein receiving the reference label and the reference class activation map comprises:
   receiving, by the processing device, the corresponding unbiased image; and
   generating, using the processing device, the reference class activation map based on the corresponding unbiased image using a pre-trained neural network.

7. A system for training a neural network, the system comprising: a processing device configured to: receive a training image, a reference label and a reference class activation map, the reference label and the reference class activation map associated with a corresponding unbiased image of the training image, the reference class activation map indicating pixel-wise values corresponding to image regions that contributed to predicting the reference label; generate a class label and a class activation map based on the training image using the neural network; calculate a classification loss value based on differences between the reference label and the class label, and a class activation map loss value based on differences between the reference class activation map and the class activation map; and update the neural network to minimise the classification loss value and the class activation map loss value to improve accuracy of the neural network in generation of the class label and the class activation map.

8. The system as claimed in claim 7, wherein the processing device is configured to:
   update the neural network to minimise a sum of the classification loss value and the class activation map loss value.

9. The system as claimed in claim 7, wherein the processing device is further configured to:
   receive a reference bias value associated with the training image;
   generate a bias label based on the training image using the neural network;
   calculate a bias loss value based on differences between the reference bias value and the bias label; and
   update the neural network to minimise the bias loss value.

10. The system as claimed in claim 7, wherein the processing device is configured to generate the training image based on a bias transformation of the corresponding unbiased image.

11. The system as claimed in claim 10, wherein the bias transformation comprises one or more of a change in blur level, color temperature and day-night lighting of the unbiased image.

12. The system as claimed in claim 7, wherein the processing device is configured to:
   receive the corresponding unbiased image; and
   generate the reference class activation map based on the corresponding unbiased image using a pre-trained neural network.

* * * * *